US012709665B2

(12) United States Patent
He et al.

(10) Patent No.: US 12,709,665 B2
(45) Date of Patent: Aug. 18, 2026

(54) HIERARCHICALLY STRUCTURED HYDROGEL WITH TUNABLE MECHANICAL PROPERTIES

(71) Applicant: The Regents of the University of California, Oakland, CA (US)

(72) Inventors: Ximin He, Los Angeles, CA (US); Mutian Hua, Los Angeles, CA (US); Shuwang Wu, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 724 days.

(21) Appl. No.: 18/165,684

(22) Filed: Feb. 7, 2023

(65) Prior Publication Data

US 2023/0331937 A1 Oct. 19, 2023

Related U.S. Application Data

(60) Provisional application No. 63/267,654, filed on Feb. 7, 2022.

(51) Int. Cl.
*C08J 3/075* (2006.01)

(52) U.S. Cl.
CPC .......... *C08J 3/075* (2013.01); *C08J 2329/04* (2013.01)

(58) Field of Classification Search
CPC .... C08J 3/075; C08J 2329/04; C08J 2301/02; C08J 2305/04; C08J 2333/08; C08J 2389/00
See application file for complete search history.

(56) References Cited

FOREIGN PATENT DOCUMENTS

WO 2024159050 A1 8/2024

OTHER PUBLICATIONS

He et al ("Strong tough hydrogels via the synergy of freeze-casting and salting out", Nature, vol. 590, Feb. 25, 2021, 595). (Year: 2021).*
International Preliminary Report on Patentability for International Application No. PCT/US2024/013006, Report issued Jul. 22, 2025, Mailed Aug. 7, 2025, 10 pgs.
International Search Report and Written Opinion for International Application No. PCT/US2024/013006, Search completed Apr. 6, 2024, Mailed May 28, 2024, 13 pgs.
Adu et al., "Structural packaging foams prepared by uni-directional freezing of paper sludge cellulose nanofibres and poly (vinyl alcohol)", Materials Letters, vol. 253, Oct. 15, 2019, pp. 242-245, doi: 10.1016/j.matlet.2019.06.050.
Alsaid et al., "Tunable Sponge-Like Hierarchically Porous Hydrogels with Simultaneously Enhanced Diffusivity and Mechanical Properties", Advanced Materials, vol. 33, No. 20, Article 2008235, Apr. 8, 2021, pp. 1-9, doi: 10.1002/adma.202008235.

(Continued)

*Primary Examiner* — Jiangtian Xu
(74) *Attorney, Agent, or Firm* — KPPB LLP

(57) ABSTRACT

Many embodiments provide methods to produce hydrogels with water content of at least 70% with multi-length-scale hierarchical architecture. The hydrogels have high mechanical stress, high strain, and high toughness. The method includes a pre-concentrating step and a salting-out treatment. The produced hydrogels are anisotropic, comprising micro-sized honeycomb-like pore walls, which in turn comprise interconnected nanofibrils meshes.

13 Claims, 46 Drawing Sheets

(56) References Cited

OTHER PUBLICATIONS

Amiya et al., "Reentrant phase transition of N-isopropylacrylamide gels in mixed solvents", The Journal of Chemical Physics, vol. 86, No. 4, Feb. 15, 1987, pp. 2375-2379, doi: 10.1063/1.452740.
Anseth et al., "Mechanical properties of hydrogels and their experimental determination", Biomaterials, vol. 17, No. 17, Sep. 1996, pp. 1647-1657, doi: 10.1016/0142-9612(96)87644-7.
Aubin et al., "Electrolytic vascular systems for energy-dense robots", Nature, vol. 571, No. 7763, Jul. 2019, pp. 51-57, doi: 10.1038/s41586-019-1313-1.
Aubin et al., "Towards enduring autonomous robots via embodied energy", Nature, vol. 602, No. 7897, Feb. 16, 2022, pp. 393-402, doi: 10.1038/s41586-021-04138-2.
Bai et al., "Flaw-Insensitive Hydrogels under Static and Cyclic Loads", Macromolecular Rapid Communications, vol. 40, No. 8, Article e1800883, Feb. 10, 2019, pp. 1-8, doi: 10.1002/marc.201800883.
Baldwin et al., "Battery Separator Characterization and Evaluation Procedures for NASA's Advanced Lithium-Ion Batteries", NTRS—NASA Technical Reports Server, Article 216099, May 2010, 70 pgs., Retrieved from: https://ntrs.nasa.gov/api/citations/20100021170/downloads/20100021170.pdf.
Bao et al., "An anti-freezing hydrogel based stretchable triboelectric nanogenerator for biomechanical energy harvesting at sub-zero temperature", Journal of Materials Chemistry A, vol. 8, No. 27, Jun. 2020, pp. 13787-13794, doi: 10.1039/DOTA03215H.
Bell et al., "An Ambidextrous STarfish-Inspired Exploration and Reconnaissance Robot (The ASTER-bot)", Soft Robot, vol. 9, No. 5, Dec. 31, 2021, pp. 991-1000, doi: 10.1089/soro.2021.0053.
Bharadwaj et al., "Does Preferential Adsorption Drive Cononsolvency? ", Macromolecules, vol. 52, No. 11, May 23, 2019, pp. 4131-4138, doi: 10.1021/acs.macromol.9b00575.
Blacklock et al., "Tuning the mechanical properties of bioreducible multilayer films for improved cell adhesion and transfection activity", Biomaterials, vol. 31, No. 27, 2010, pp. 7167-7174, doi: 10.1016/j.biomaterials.2010.06.002.
Blanc et al., "Scientific Challenges for the Implementation of Zn-Ion Batteries", Joule, vol. 4, No. 4, 2020, pp. 771-799, doi: 10.1016/j.joule.2020.03.002.
Cannarella et al., "Mechanical Properties of a Battery Separator under Compression and Tension", Journal of The Electrochemical Society, vol. 161, No. 11, Sep. 26, 2014, pp. F3117-F3122, doi: 10.1149/2.0191411jes.
Cao et al., "Highly Reversible Aqueous Zinc Batteries enabled by Zincophilic-Zincophobic Interfacial Layers and Interrupted Hydrogen-Bond Electrolytes", Angewandte Chemie International Edition, vol. 60, No. 34, Aug. 16, 2021, pp. 18845-18851, doi: 10.1002/anie.202107378.
Capadona et al., "Stimuli-Responsive Polymer Nanocomposites Inspired by the Sea Cucumber Dermis", Science, vol. 319, No. 5868, Mar. 7, 2008, pp. 1370-1374, doi: 10.1126/science.1153307.
Carnegie et al., "Anion Complexation and the Hofmeister Effect", Angewandte Chemie International Edition, vol. 53, No. 43, Sep. 5, 2014, pp. 11498-11500, doi: 10.1002/anie.201405796.
Chang et al., "An Aqueous Hybrid Electrolyte for Low-Temperature Zinc-Based Energy Storage Devices", Energy & Environmental Science, vol. 13, No. 10, Aug. 12, 2020, pp. 3527-3535, doi: 10.1039/D0EE01538E.
Chang et al., "Multi-scale characterization of surface-crosslinked superabsorbent polymer hydrogel spheres", Polymer, vol. 145, Jun. 6, 2018, pp. 174-183, doi: 10.1016/j.polymer.2018.04.073.
Charlton et al., "Polyaniline Electrode Activation in Li Cells", Journal of the Electrochemical Society, vol. 167, No. 080501, Apr. 17, 2020, 5 pgs., doi: 10.1149/1945-7111/ab8822.
Chaudhuri et al., "Hydrogels with tunable stress relaxation regulate stem cell fate and activity", Nature Materials, vol. 15, Nov. 30, 2015, pp. 326-334, doi: 10.1038/nmat4489.
Chen et al., "A Flexible and Safe Aqueous Zinc-Air Battery with a Wide Operating Temperature Range from −20 to 70° C.", ACS Sustainable Chemistry & Engineering, vol. 8, No. 31, Jul. 17, 2020, pp. 11501-11511, doi: 10.1021/acssuschemeng.0c01111.
Chen et al., "A Novel Design Strategy for Fully Physically Linked Double Network Hydrogels with Tough, Fatigue Resistant, and Self-Healing Properties", Advanced Functional Materials, vol. 25, No. 10, Feb. 3, 2015, pp. 1598-1607, doi: 10.1002/adfm.201404357.
Chen et al., "Anti-freezing flexible aqueous Zn—MnO2 batteries working at −35° C. enabled by a borax-crosslinked polyvinyl alcohol/glycerol gel electrolyte", Journal of Materials Chemistry A, vol. 8, No. 14, Mar. 11, 2020, pp. 6828-6841, doi: 10.1039/DOTA01553A.
Chen et al., "Design of strong and tough methylcellulose-based hydrogels using kosmotropic Hofmeister salts", Cellulose, vol. 27, Nov. 22, 2019, pp. 1113-1126, doi: 10.1007/s10570-019-02871-6.
Chen et al., "Quasi-Solid-State Zinc Ion Rechargeable Batteries for Subzero Temperature Applications", ACS Applied Energy Materials, vol. 3, No. 9, Aug. 20, 2020, pp. 9058-9065, doi: 10.1021/acsaem.0c01452.
Chen et al., "Realizing an All-Round Hydrogel Electrolyte toward Environmentally Adaptive Dendrite-Free Aqueous Zn—MnO2 Batteries", Advanced Materials, vol. 33, No. 9, Article e2007559, Jan. 29, 2021, pp. 1-11, doi: 10.1002/adma.202007559.
Chen et al., "Recent Advances and Prospects of Cathode Materials for Rechargeable Aqueous Zinc-Ion Batteries", Advanced Materials Interfaces, vol. 6, No. 17, Article 1900387, Sep. 6, 2019, 24 pgs., doi: 10.1002/admi.201900387.
Chen et al., "Salt-concentrated acetate electrolytes for a high voltage aqueous Zn/ MnO2 battery", Energy Storage Materials, vol. 28, Jun. 2020, pp. 205-215, doi: 10.1016/j.ensm.2020.03.011.
Chi et al., "Lithiophilic Zn Sites in Porous CuZn Alloy Induced Uniform Li Nucleation and Dendrite-free Li Metal Deposition", Nano Letters, vol. 20, No. 4, Mar. 9, 2020, pp. 2724-2732, doi: 10.1021/acs.nanolett.0c00352.
Choi et al., "Hydrocipher: Bioinspired Dynamic Structural Color-Based Cryptographic Surface", Advanced Optical Materials, vol. 8, No. 1, Article 901259, Nov. 6, 2019, pp. 1-8, doi: 10.1002/adom.201901259.
Cong et al., "Ultra-stable and highly reversible aqueous zinc metal anodes with high preferred orientation deposition achieved by a polyanionic hydrogel electrolyte", Energy Storage Materials, vol. 35, Mar. 2021, pp. 586-594, doi: 10.1016/j.ensm.2020.11.041.
Costa et al., "Phase behavior of poly(N-isopropylacrylamide) in binary aqueous solutions", Polymer, vol. 43, No. 22, 2002, pp. 5879-5885, doi: 10.1016/S0032-3861(02)00507-4.
Dalnoki-Veress et al., "Phase Separation Morphology of Spin-Coated Polymer Blend Thin Films", Physica A: Statistical Mechanics and its Applications, vol. 239, No. 1-3, May 2, 1997, pp. 87-94, doi: 10.1016/S0378-4371(96)00471-2.
Dong et al., "Insights on Flexible Zinc-Ion Batteries from Lab Researchto Commercialization", Advanced Materials, vol. 33, No. 20, May 2021, 35 pgs., doi: 10.1002/adma.202007548.
Du et al., "Specific ion effects directed noble metal aerogels: Versatile manipulation for electrocatalysis and beyond", Sciences Advances, vol. 5, No. 5, Article eaaw4590, May 24, 2019, pp. 1-9, doi: 10.1126/sciadv.aaw4590.
Duan et al., "Tendon-inspired anti-freezing tough gels", iScience, vol. 24, No. 9102989, Sep. 24, 2021, 14 pgs., doi: 10.1016/j.isci.2021.102989.
Dutta et al., "Morphology Matters: Tuning the Product Distribution of CO2 Electroreduction on Oxide-Derived (OD) Cu Foam Catalysts", ACS Catalysis, vol. 6, No. 6, May 5, 2016, pp. 3804-3814, doi: 10.1021/acscatal.6b00770.
Ebner et al., "Tortuosity Anisotropy in Lithium-Ion Battery Electrodes", Advanced Energy Materials, vol. 4, No. 5, Article 1301278, 2014, pp. 1-6, doi: 10.1002/aenm.201301278.
Ebrahimi et al., "Silk—its mysteries, how it's made, and how it's used", ACS Biomaterials Science & Engineering, vol. 1, No. 10, Aug. 24, 2025, pp. 864-876, doi: 10.1021/acsbiomaterials.5b00152.
Fan et al., "Fabrication of Bioinspired Hydrogels: Challenges and Opportunities", Macromolecules, vol. 53, No. 8, Apr. 1, 2020, pp. 2769-2782, doi: 10.1021/acs.macromol.0c00238.

(56) References Cited

OTHER PUBLICATIONS

Fang et al., "Forced protein unfolding leads to highly elastic and tough protein hydrogels", Nature Communications, vol. 4, No. 2974, Dec. 19, 2013, pp. 1-10, doi: 10.1038/ncomms3974.
Feng et al., "Immunizing Aqueous Zn Batteries against Dendrite Formation and Side Reactions at Various Temperatures via Electrolyte Additives", Small, vol. 17, No. 42, Article 2103195, Oct. 21, 2021, pp. 1-11, doi: 10.1002/smll.202103195.
Floreano et al., "Science, Technology and the Future of Small Autonomous Drones", Nature, vol. 521, May 27, 2015, pp. 460-466, doi: 10.1038/nature14542.
Forney et al., "Improved stimuli-response and mechanical properties of nanostructured poly(N-isopropylacrylamide-co-dimethylsiloxane) hydrogels generated through photopolymerization in lyotropic liquid crystal templates", Soft Matter, vol. 9, No. 31, Jun. 17, 2013, pp. 7458-7467, doi: 10.1039/C3SM50556A.
Gancheva et al., "Enhancing and Tuning the Response of Environmentally Sensitive Hydrogels With Embedded and Interconnected Pore Networks", Macromolecules, vol. 49, No. 16, Aug. 12, 2016, pp. 5866-5876, doi: 10.1021/acs.macromol.6b01411.
Gemeinhart et al., "Pore Structure of Superporous Hydrogels", Polymers for Advanced Technologies, vol. 11, No. 8-12, Aug. 2000, pp. 617-625, doi: 10.1002/1099-1581(200008/12)11:8/12<617::AID-PAT12>3.0.CO;2-L.
Gong et al., "Double-Network Hydrogels with Extremely High Mechanical Strength", Advanced Materials, vol. 15, No. 14, Jul. 21, 2003, pp. 1155-1158, doi: 10.1002/adma.200304907.
Gong et al., "Zinc-Ion Storage Mechanism of Polyaniline for Rechargeable Aqueous Zinc-Ion Batteries", Nanomaterials, vol. 12, No. 9, Article 1438, Apr. 23, 2022, 12 pgs., doi: 10.3390/nano12091438.
Gu et al., "Graded Porous Inorganic Materials Derived from Self-assembled Block Copolymer Templates", Nanoscale, vol. 7, No. 13, Mar. 5, 2015, pp. 5826-5834, doi: 10.1039/C4NR07492K.
Gu et al., "Scalable Spider-Silk-Like Supertough Fibers using a Pseudoprotein Polymer", Advanced Materials, vol. 31, No. 48, Article 1904311, Sep. 6, 2019, pp. 1-6, doi: 10.1002/adma.201904311.
Gupta et al., "A combined effect of freeze-thaw cycles and polymer concentration on the structure and mechanical properties of transparent PVA gels", Biomedical Materials, vol. 7, No. 1, Article 015006, Jan. 27, 2012, pp. 1-8, doi: 10.1088/1748-6041/7/1/015006.
Hadden et al., "Stem cell migration and mechanotransduction on linear stiffness gradient hydrogels", PNAS, vol. 114, No. 22, May 30, 2017, pp. 5647-5652, doi: 10.1073/pnas.1618239114.
Han et al., "Green and low-cost acetate-based electrolytes for the highly reversible zinc anode", Journal of Power Sources, vol. 485, Article 229329, Feb. 15, 2021, 8 pgs., doi: 10.1016/j.jpowsour.2020.229329.
Han et al., "Mussel-Inspired Adhesive and Tough Hydrogel Based on Nanoclay Confined Dopamine Polymerization", ACS Nano, vol. 11, No. 3, Feb. 28, 2017, pp. 2561-2574, doi: 10.1021/acsnano.6b05318.
Handorf et al., "Tissue Stiffness Dictates Development, Homeostasis, and Disease Progression", Organogenesis, vol. 11, No. 1, Apr. 27, 2015, pp. 1-15, doi: 10.1080/15476278.2015.1019687.
Hao et al., "Gel Electrolyte Constructing Zn (002) Deposition Crystal Plane Toward Highly Stable Zn Anode", Advanced Science, vol. 9, No. 7, Article 2104832, Mar. 4, 2022, 10 pgs., doi: 10.1002/advs.202104832.
Harry et al., "Influence of Electrolyte Modulus on the Local Current Density at a Dendrite Tip on a Lithium Metal Electrode", Journal of the Electrochemical Society, vol. 163, No. 10, Aug. 10, 2016, pp. A2216-A2224, doi: 10.1149/2.0191610jes.
He et al., "Hoffmeister Effect-Assisted One Step Fabrication of Ductile and Strong Gelatin Hydrogels", Advanced Functional Materials, vol. 28, No. 5, Jan. 31, 2018, pp. 1-10, doi: 10.1002/adfm.201705069.
Hong et al., "3D Printing of Highly Stretchable and Tough Hydrogels into Complex, Cellularized Structures", Advanced Materials, vol. 27, No. 27, Jun. 1, 2015, pp. 4035-4040, doi: 10.1002/adma.201501099.
Hopp et al., "The influence of substrate stiffness gradients on primary human dermal fibroblasts", Biomaterials, vol. 34, No. 21, Jul. 2013, pp. 5070-5077, doi: 10.1016/j.biomaterials.2013.03.075.
Hoshino et al., "Gelation of poly(vinyl alcohol) in dimethyl sulfoxide/water solvent", Polymer Bulletin, vol. 37, 1996, pp. 237-244, doi: 10.1007/BF00294127.
Hu et al., "Weak Hydrogen Bonding Enables Hard, Strong, Tough, and Elastic Hydrogels", Advanced Materials, vol. 27, No. 43, Oct. 5, 2015, pp. 6899-6905, doi: 10.1002/adma.201503724.
Hua et al., "Strong tough hydrogels via the synergy of freeze-casting and salting out", Nature, vol. 590, No. 7847, Feb. 24, 2021, pp. 594-599, doi: 10.1038/s41586-021-03212-z.
Huang et al., "A Self-Healing Integrated All-in-One Zinc-Ion Battery", Angewandte Chemie International Edition, vol. 58, No. 13, Mar. 22, 2019, pp. 4313-4317, doi: 10.1002/anie.201814653.
Huang et al., "An Intrinsically Stretchable and Compressible Supercapacitor Containing a Polyacrylamide Hydrogel Electrolyte", Angewandte Chemie International Edition English, vol. 56, No. 31, Jul. 24, 2017, pp. 9141-9145, doi: 10.1002/anie.201705212.
Huang et al., "Antifreezing Hydrogel Electrolyte with Ternary Hydrogen Bonding for High-Performance Zinc-Ion Batteries", Advanced Materials, vol. 34, No. 14, Article 2110140, Feb. 4, 2022, 10 pgs., doi: 10.1002/adma.202110140.
Huang et al., "Energy-Dissipative Matrices Enable Synergistic Toughening in Fiber Reinforced Soft Composites", Advanced Functional Materials, vol. 27, No. 9, Article 1605350, Jan. 13, 2017, pp. 1-10, doi: 10.1002/adfm.201605350.
Huang et al., "High-water-content graphene oxide/polyvinyl alcohol hydrogel with excellent mechanical properties", Journal of Materials Chemistry A, vol. 2, No. 27, May 9, 2014, pp. 10508-10515, doi: 10.1039/C4TA01464B.
Huang et al., "Realizing high-performance Zn-ion batteries by a reduced graphene oxide block layer at room and low temperatures", Journal of Energy Chemistry, vol. 43, No. 23, Apr. 2020, pp. 1-7, doi: 10.1016/j.jechem.2019.07.011.
Hyon et al., "Preparation of transparent poly(vinyl alcohol) hydrogel", Polymer Bulletin, vol. 22, 1989, pp. 119-122, doi: 10.1007/BF00255200.
Illeperuma et al., "Fiber-reinforced tough hydrogels", Extreme Mechanics Letters, vol. 1, No. 18, Dec. 2014, pp. 90-96, doi: 10.1016/j.eml.2014.11.001.
Iwaseya et al., "High performance films obtained from PVA/Na2SO4/H2O and PVA/CH3COONa/H2O systems", Journal of Materials Science, vol. 40, No. 21, Sep. 8, 2005, pp. 5695-5698, doi: 10.1007/s10853-005-1429-6.
Jaspers et al., "Tuning Hydrogel Mechanics Using the Hofmeister Effect", Advanced Functional Materials, vol. 25, No. 41, Sep. 11, 2015, pp. 6503-6510, doi: 10.1002/adfm.201502241.
Javadi et al., "Polyvinyl Alcohol-Cellulose Nanofibrils-Graphene Oxide Hybrid Organic Aerogels", ACS Applied Materials & Interfaces, vol. 5, No. 13, Jun. 24, 2013, pp. 5969-5975, doi: 10.1021/am400171y.
Javidi et al., "Tendons from kangaroo rats are exceptionally strong and tough", Scientific Reports, vol. 9, No. 1, Article 8196, Jun. 3, 2019, 9 pgs., doi: 10.1038/s41598-019-44671-9.
Ji et al., "Enhancing cell penetration and proliferation in chitosan hydrogels for tissue engineering applications", Biomaterials, vol. 32, No. 36, Sep. 20, 2011, pp. 9719-9729, doi: 10.1016/j.biomaterials.2011.09.003.
Jia et al., "Active Materials for Aqueous Zinc Ion Batteries: Synthesis, Crystal Structure, Morphology, and Electrochemistry", Chemical Reviews, vol. 120, No. 15, Jul. 27, 2020, pp. 7795-7866, doi: 10.1021/acs.chemrev.9b00628.
Jia et al., "Layer-by-layer assembly of TiO2 colloids onto diatomite to build hierarchical porous materials", Journal of Colloid and Interface Science, vol. 323, No. 2, Jul. 15, 2008, pp. 326-331, doi: 10.1016/j.jcis.2008.04.020.
Jiang, "GIXSGUI: a MATLAB toolbox for grazing-incidence X-ray scattering data visualization and reduction, and indexing of buried

(56) References Cited

OTHER PUBLICATIONS three-dimensional periodic nanostructured films", Journal of Applied Crystallography, vol. 48, No. 3, 2015, pp. 917-926, doi: 10.1107/S1600576715004434.
Johnston et al., "Mechanical characterization of bulk Sylgard 184 for microfluidics and microengineering", Journal of Micromechanics and Microengineering, vol. 24, No. 3, Article 035017, Feb. 28, 2014, pp. 1-7, doi: 10.1088/0960-1317/24/3/035017.
Jones et al., "Batteries for robotic spacecraft", Joule, vol. 6, No. 5, May 18, 2022, pp. 923-928, doi: 10.1016/j.joule.2022.04.004.
Jones et al., "Hierarchical porous materials for tissue engineering", Philosophical Transactions of the Royal Society A, vol. 364, No. 1838, Dec. 2, 2005, pp. 263-281, doi: 10.1098/rsta.2005.1689.
Jungwirth et al., "Beyond Hofmeister", Nature Chemistry, vol. 6, No. 4, Apr. 2014, pp. 261-263, doi: 10.1038/nchem.1899.
Kanaya et al., "Structure and dynamics of poly(vinyl alcohol) gels in mixtures of dimethyl sulfoxide and water", Polymer Journal, vol. 44, No. 1, Oct. 19, 2012, pp. 83-94, doi: 10.1038/pj.2011.88.
Khodambashi et al., "Heterogeneous Hydrogel Structures with Spatiotemporal Reconfigurability using Addressable and Tunable Voxels", Advanced Materials, vol. 33, No. 10, Article 2005906, Jan. 25, 2021, pp. 1-9, doi: 10.1002/adma.202005906.
Khurana et al., "Suppression of Lithium Dendrite Growth Using Cross-Linked Polyethylene/Poly(ethylene oxide) Electrolytes: A New Approach for Practical Lithium-Metal Polymer Batteries", Journal of the American Chemical Society, vol. 136, No. 20, Apr. 22, 2014, pp. 7395-7402, doi: 10.1021/ja502133j.
Kim et al., "Fracture, fatigue, and friction of polymers in which entanglements greatly outnumber cross-links", Science, vol. 374, No. 6564, Oct. 8, 2021, pp. 212-216, doi: 10.1126/science.abg6320.
King et al., "Macroscale Double Networks: Design Criteria for Optimizing Strength and Toughness", ACS Applied Materials & Interfaces, vol. 11, No. 38, Sep. 2, 2019, pp. 35343-35353, doi: 10.1021/acsami.9b12935.
Kinloch et al., "Fracture Behaviour of Polymers", Springer Science & Business Media, Composite Structures, vol. 2, 1984, pp. 373-375.
Kojima et al., "Temperature Dependent Phase Behavior of PNIPAM Microgels in Mixed Water/Methanol Solvents", Journal of Polymer Science, Part B: Polymer Physics, vol. 51, No. 14, Oct. 19, 2012, pp. 1100-1111, doi: 10.1002/polb.23194.
Kokabi et al., "PVA-clay nanocomposite hydrogels for wound dressing", European Polymer Journal, vol. 43, No. 3, Mar. 2007, pp. 773-781, doi: 10.1016/j.eurpolymj.2006.11.030.
Korde et al., "Naturally biomimicked smart shape memory hydrogels for biomedical functions", Chemical Engineering Journal, vol. 379, Article 122430, Jan. 1, 2020, 18 pgs., doi: 10.1016/j.cej.2019.122430.
Kovacik, "Correlation between Young's Modulus and Porosity in Porous Materials", Journal of Materials Science Letters, vol. 18, No. 13, Jul. 1999, pp. 1007-1010, doi: 10.1023/A:1006669914946.
Wood, "Uniaxial Extension and Compression in Stress-Strain Relations of Rubber", Rubber Chemistry & Technology, vol. 51, No. 4, 1978, pp. 840-851, doi: 10.5254/1.3535767.
Wu et al., "Ion-specific ice recrystallization provides a facile approach for the fabrication of porous materials", Nature Communications, vol. 8, Article 15154, May 2, 2017, 8 pgs., doi: 10.1038/ncomms15154.
Wu et al., "Poly(vinyl alcohol) Hydrogels with Broad-Range Tunable Mechanical Properties via the Hofmeister Effect", Advanced Materials, vol. 33, No. 11, 2007829, Feb. 8, 2021, pp. 1-9, doi: 10.1002/adma.202007829.
Wu et al., "Rapid and scalable fabrication of ultra-stretchable, anti-freezing conductive gels by cononsolvency effect", EcoMat, vol. 3, Feb. 14, 2021, 9 pgs., doi: 10.1002/eom2.12085.
Xiang et al., "Stretchable and fatigue-resistant materials", Materials Today, vol. 34, Apr. 2020, pp. 7-16, doi: 10.1016/j.mattod.2019.08.009.
Xiao et al., "An ultrathin rechargeable solid-state zinc ion fiber battery for electronic textiles", Science Advances, vol. 7, No. 49, Dec. 1, 2021, 11 pgs., doi: 10.1126/sciadv.abl3742.
Xie et al., "Controlled Mechanical and Swelling Properties of Poly(vinyl alcohol)/Sodium Alginate Blend Hydrogels Prepared by Freeze-Thaw Followed by Ca2+ Crosslinking", Journal of Applied Polymer Science, vol. 124, No. 1, Apr. 5, 2012, pp. 823-831, doi: 10.1002/app.35083.
Xie et al., "Issues and solutions toward zinc anode in aqueous zinc-ion batteries: A mini review", Carbon Energy, vol. 2, No. 4, Dec. 2020, pp. 540-560, doi: 10.1002/cey2.67.
Xie et al., "Recent Progress in Multivalent Metal (Mg, Zn, Ca, and Al) and Metal-Ion Rechargeable Batteries with Organic Materials as Promising Electrodes", Small, vol. 15, No. 15, Article 1805061, Apr. 12, 2019, 20 pgs., doi: 10.1002/smll.201805061.
Xu et al., "A Mineralized High Strength and Tough Hydrogel for Skull Bone Regeneration", Advanced Functional Materials, vol. 27, No. 4, Article 1604327, Jan. 26, 2017, 9 pgs., doi: 10.1002/adfm.201604327.
Xu et al., "Anti-Freezing Multiphase Gel Materials: Bioinspired Design Strategies and Applications", Giant, vol. 2, Article 100014, 2020, 21 pgs., doi: 10.1016/j.giant.2020.100014.
Xu et al., "High-Flexibility, High-Toughness Double-Cross-Linked Chitin Hydrogels by Sequential Chemical and Physical Cross-Linkings", Advanced Materials, 2016, pp. 1-6, doi: 10.1002/adma.201600448.
Xue et al., "Orientation of Steel Fibers in Magnetically Driven Concrete and Mortar", Materials, vol. 11, No. 1, 170, Jan. 22, 2018, pp. 1-12, doi: 10.3390/ma11010170.
Yamauchi et al., "LCST and UCST Behavior of Poly(N-isopropylacrylamide) in DMSO/Water Mixed Solvents Studied by IR and Micro-Raman Spectroscopy", The Journal of Physical Chemistry B, vol. 111, No. 45, Oct. 20, 2007, pp. 12964-12968, doi: 10.1021/jp072438s.
Yang et al., "A Universal Soaking Strategy to Convert Composite Hydrogels into Extremely Tough and Rapidly Recoverable Double-Network Hydrogels", Advanced Materials, vol. 28, No. 33, Sep. 7, 2016, pp. 7178-7184, doi: 10.1002/adma.201601742.
Yang et al., "An aqueous zinc-ion battery working at −50° C. enabled by low-concentration perchlorate-based chaotropic salt electrolyte", EcoMat, Functional Materials for Green Energy and Environments, vol. 4, No. 2, Article e12165, Mar. 2022, pp. 1-11, doi: 10.1002/eom2.12165.
Yao et al., "Hydrogel Ionotronics with Ultra-Low Impedance and High Signal Fidelity across Broad Frequency and Temperature Ranges", Advanced Functional Materials, vol. 32, No. 10, Article 2109506, 2021, 10 pgs., doi: 10.1002/adfm.202109506.
Yao et al., "Hydrogel Paint", Advanced Materials, vol. 31, No. 39, Article 1903062, Aug. 4, 2019, pp. 1-8, doi: 10.1002/adma.201903062.
Yao et al., "Scalable Assembly of Flexible Ultrathin All-in-One Zinc Ion Batteries with Highly Stretchable, Editable, and Customizable Functions", Advanced Materials, vol. 33, No. 10, Article 2008140, Mar. 11, 2021, 9 pgs., doi: 10.1002/adma.202008140.
Yi et al., "Strategies for the Stabilization of Zn Metal Anodes for Zn-Ion Batteries", Advanced Energy Materials, vol. 11, No. 1, Article 2003065, Jan. 7, 2021, pp. 1-31, doi: 10.1002/aenm.202003065.
Yoo et al., "Hierarchical multiscale hyperporous block copolymer membranes via tunable dual-phase separation", Science Advances, vol. 1, No. 6, Jul. 24, 2015, 7 pgs., doi: 10.1126/sciadv.1500101.
Yu et al., "Flexible Zn-Ion Batteries: Recent Progresses and Challenges", Small, vol. 15, No. 7, Article 1804760, Feb. 15, 2019, pp. 1-27, doi: 10.1002/smll.201804760.
Yuk et al., "Hydraulic hydrogel actuators and robots optically and sonically camouflaged in water", Nature Communications, vol. 8, Article 14230, Feb. 1, 2017, 12 pgs., doi: 10.1038/ncomms14230.
Yuk et al., "Tough bonding of hydrogels to diverse non-porous surfaces", Nature Materials, vol. 15, 2016, pp. 190-196, doi: 10.1038/nmat4463.
Zeng et al., "Achieving Ultrahigh Energy Density and Long Durability in a Flexible Rechargeable Quasi-Solid-State Zn—Mn2 Battery", Advanced Materials, vol. 29, No. 26, Article 1700274, Jul. 12, 2017, 7 pgs., doi: 10.1002/adma.201700274.

(56) References Cited

OTHER PUBLICATIONS

Zhang, "Ice Templating and Freeze-Drying for Porous Materials and Their Applications", Wiley-VCH Verlag Gmbh & Co. KGaA, May 18, 2018, 367 pgs., doi: 10.1002/9783527807390.
Zhang et al., "A unified understanding of the cononsolvency of polymers in binary solvent mixtures", Soft Matter, vol. 16, No. 33, Aug. 2020, pp. 7789-7796, doi: 10.1039/DOSM00811G.
Zhang et al., "Aligned two- and three-dimensional structures by directional freezing of polymers and nanoparticles", Nature Materials, vol. 4, Oct. 2005, pp. 787-793, doi: 10.1038/nmat1487.
Zhang et al., "Anisotropic tough poly(vinyl alcohol) hydrogels", Soft Matter, vol. 8, No. 40, Aug. 29, 2012, pp. 10439-10447, doi: 10.1039/C2SM26102B.
Zhang et al., "Challenges and Strategies for High-Energy Aqueous Electrolyte Rechargeable Batteries", Angewandte Chemie International Edition, vol. 60, 2021, pp. 598-616, doi: 10.1002/anie.202004433.
Zhang et al., "Dendrites in Lithium Metal Anodes: Suppression, Regulation, and Elimination", Accounts of Chemical Research, vol. 52, No. 11, Oct. 28, 2019, pp. 3223-3232, doi: 10.1021/acs.accounts.9b00437.
Zhang et al., "Flexible Zinc-Ion Hybrid Fiber Capacitors with Ultrahigh Energy Density and Long Cycling Life for Wearable Electronics", Small, vol. 15, No. 47, Article 1903817, Nov. 20, 2019, 9 pgs., doi: 10.1002/smll.201903817.
Zhang et al., "Inorganic Salts Induce Thermally Reversible and Anti-Freezing Cellulose Hydrogels", Angewandte Chemie International Edition, vol. 58, No. 22, May 27, 2019, pp. 7366-7370, doi: 10.1002/anie.201902578.
Zhang et al., "Interactions between macromolecules and ions: the Hofmeister series", Current Opinion in Chemical Biology, vol. 10, No. 6, Dec. 2006, pp. 658-663, doi: 10.1016/j.cbpa.2006.09.020.
Zhang et al., "Ion-Specific Effects on the Growth of Single Ice Crystals", The Journal of Physical Chemistry Letters, vol. 12, No. 36, Sep. 3, 2021, pp. 8726-8731, doi: 10.1021/acs.jpclett.1c02601.
Zhang et al., "Materials chemistry for rechargeable zinc-ion batteries", Chemical Society Reviews, vol. 49, No. 13, Jun. 1, 2020, pp. 4203-4219, doi: 10.1039/C9CS00349E.
Zhang et al., "Modulating Electrolyte Structure for Ultralow Temperature Aqueous Zinc Batteries", Nature Communications, vol. 11, No. 4463, Sep. 8, 2020, pp. 1-10, doi: 10.1038/s41467-020-18284-0.
Zhang et al., "Observations of Water Monomers in Supersaturated NaClO4, LiClO4, and Mg(ClO4)2 Droplets Using Raman Spectroscopy", The Journal of Physical Chemistry A, vol. 107, No. 31, 2003, pp. 5956-5962, doi: 10.1021/jp0271256.
Zhang et al., "Reaction modifier system enable double-network hydrogel electrolyte for flexible zinc-air batteries with tolerance to extreme cold conditions", Energy Storage Materials, vol. 42, No. 23, Nov. 2021, pp. 88-96, doi: 10.1016/j.ensm.2021.07.026.
Zhang et al., "Rechargeable Aqueous Zn—V2O5 Battery with High Energy Density and Long Cycle Life", ACS Energy Letters, vol. 3, No. 6, May 16, 2018, pp. 1366-1372, doi: 10.1021/acsenergylett.8b00565.
Zhang et al., "Specific Ion Effects on the Water Solubility of Macromolecules: PNIPAM and the Hofmeister Series", Journal of the American Chemical Society, vol. 127, No. 41, Sep. 22, 2005, pp. 14505-14510, doi: 10.1021/ja0546424.
Zhao, "Multi-scale multi-mechanism design of tough hydrogels: building dissipation into stretchy networks", Soft Matter, 2014, vol. 10, No. 5, 2014, pp. 672-687, doi: 10.1039/C3SM52272E.
Zhao et al., "Aqueous Rechargeable Metal-Ion Batteries Working at Subzero Temperatures", Advanced Science, vol. 8, No. 1, Article 2002590, Nov. 23, 2020, pp. 1-13, doi: 10.1002/advs.202002590.
Zhao et al., "High-Strength and High-Toughness Double-Cross-Linked Cellulose Hydrogels: A New Strategy Using Sequential Chemical and Physical Cross-Linking", Advanced Functional Materials, vol. 26, No. 34, Sep. 13, 2016, pp. 6279-6287, doi: 10.1002/adfm.201601645.
Zhao et al., "Layered nanocomposites by shear-flow-induced alignment of nanosheets", Nature, vol. 580, Apr. 9, 2020, pp. 210-215, doi: 10.1038/s41586-020-2161-8.
Zhao et al., "Multi-functional hydrogels for flexible zinc-based batteries working under extreme conditions", Advanced Energy Materials, vol. 11, No. 34, Article 2101749, Sep. 9, 2021, 71 pgs., doi: 10.1002/aenm.202101749.
Zhao et al., "Somatosensory actuator based on stretchable conductive photothermally responsive hydrogel", Science Robotics, vol. 6, No. 53, eabd5483, Apr. 7, 2021, pp. 1-11, doi: 10.1126/scirobotics.abd5483.
Zheng et al., "Polyvinyl alcohol (PVA)-cellulose nanofibril (CNF)-multiwalled carbon nanotube (MWCNT) hybrid organic aerogels with superior mechanical properties", RSC Advances, vol. 3, Aug. 27, 2013, pp. 20816-20823, doi: 10.1039/C3RA42321B.
Zhu et al., "Antifreezing Hydrogel with High Zinc Reversibility for Flexible and Durable Aqueous Batteries by Cooperative Hydrated Cations", Advanced Functional Materials, vol. 30, No. 6, Article 1907218, Nov. 14, 2019, pp. 1-10, doi: 10.1002/adfm.201907218.
Zhu et al., "High strength hydrogels enable dendrite free Zn metal anodes and high-capacity Zn—MnO2 batteries via a modified mechanical suppression effect", Journal of Materials Chemistry A, vol. 10, No. 6, 2022, pp. 3122-3133, doi: 10.1039/d1ta10079c.
Kumar et al., "PVA-based hydrogels for tissue engineering: A review", International Journal of Polymeric Materials and Polymeric Biomaterials, vol. 66, No. 4, 2017, pp. 159-182, doi: 10.1080/00914037.2016.1190930.
Lake et al., "The Strength of Highly Elastic Materials", Proceedings of the Royal Society of London. A. Mathematical and Physical Sciences, vol. 300, No. 1460, Aug. 1967, pp. 108-119, doi: 10.1098/rspa.1967.0160.
Lanasa et al., "Presence of pores and hydrogel composition influence tensile properties of scaffolds fabricated from well-defined sphere templates", Journal of Biomedical Materials Research Part B: Applied Biomaterials, vol. 96B, No. 2, Feb. 2011, pp. 294-302, doi: 10.1002/jbm.b.31765.
Lee et al., "A fully roll-to-roll gravure-printed carbon nanotube-based active matrix for multi-touch sensors", Scientific Reports, vol. 5, No. 17707, Dec. 4, 2015, pp. 1-10, doi: 10.1038/srep17707.
Lee et al., "Combinatorial screening of biochemical and physical signals for phenotypic regulation of stem cell-based cartilage tissue engineering", Science Advances, vol. 6, No. 21, Article eaaz5913, May 22, 2020, pp. 1-13, doi: 10.1126/sciadv.aaz5913.
Lee et al., "Hydrogels for Tissue Engineering", Chemical Reviews, vol. 101, No. 7, Jul. 2001, pp. 1869-1879, doi: 10.1021/cr000108x.
Leng et al., "A Safe Polyzwitterionic Hydrogel Electrolyte for Long-Life Quasi-Solid State Zinc Metal Batteries", Advanced Functional Materials, vol. 30, No. 23, Article 2001317, Jun. 4, 2020, 10 pgs., doi: 10.1002/adfm.202001317.
Li et al., "Designing hydrogels for controlled drug delivery", Nature Reviews Materials, vol. 1, Article 16071, Oct. 18, 2016, 17 pgs., doi: 10.1038/natrevmats.2016.71.
Li et al., "High-performance dual-ion Zn batteries enabled by a polyzwitterionic hydrogel electrolyte with regulated anion/cation transport and suppressed Zn dendrite growth", Journal of Materials Chemistry A, vol. 9, No. 43, 2021, pp. 24325-24335, doi: 10.1039/D1TA08127F.
Li et al., "Kinetic behaviour of the cells touching substrate: the interfacial stiffness guides cell spreading", Scientific Reports, vol. 4, Article 3910, Jan. 28, 2014, 10 pgs., doi: 10.1038/srep03910.
Li et al., "Mesoscale bicontinuous networks in self-healing hydrogels delay fatigue fracture", PNAS, vol. 117, No. 14, Apr. 7, 2020, pp. 7606-7612, doi: 10.1073/pnas.2000189117.
Lin et al., "Anti-fatigue-fracture hydrogels", Science Advances, vol. 5, Article eaau8528, Jan. 25, 2019, pp. 1-9, doi: 10.1126/sciadv.aau8528.
Lin et al., "Design of stiff, tough and stretchy hydrogel composites via nanoscale hybrid crosslinking and macroscale fiber reinforcement", Soft Matter, vol. 10, No. 38, 2014, pp. 7519-7527, doi: 10.1039/C4SM01039F.

(56) References Cited

OTHER PUBLICATIONS

Lin et al., "Freezing Molecular Orientation under Stretch for High Mechanical Strength but Anisotropic Hydrogels", Small, vol. 12, No. 32, Aug. 24, 2016, pp. 4386-4392, doi: 10.1002/smll.201601893.
Lin et al., "High-Rate, Large Capacity, and Long Life Dendrite-Free Zn Metal Anode Enabled by Trifunctional Electrolyte Additive with a Wide Temperature Range", Advanced Science, vol. 9, No. 21, Article 2201433, Jul. 25, 2022, 10 pgs., doi: 10.1002/advs.202201433.
Lin et al., "Molecularly Engineered Dual-Crosslinked Hydrogel with Ultrahigh Mechanical Strength, Toughness, and Good Self-Recovery", Advanced Materials, vol. 27, No. 12, Mar. 25, 2015, pp. 2054-2059, doi: 10.1002/adma.201405022.
Lin et al., "Muscle-like fatigue-resistant hydrogels by mechanical training", PNAS, vol. 116, No. 21, May 21, 2019, pp. 10244-10249, doi: 10.1073/pnas.1903019116.
Liu et al., "A mechanically durable and device-level tough Zn—MnO2 battery with high flexibility", Energy Storage Materials, vol. 23, Dec. 2019, pp. 636-645, doi: 10.1016/j.ensm.2019.03.007.
Liu et al., "Engineering integrated structure for high-performance flexible zinc-ion batteries", Chemical Engineering Journal, vol. 417, No. 127955, Aug. 1, 2021, pp. 1-8, doi: 10.1016/j.cej.2020.127955.
Liu et al., "Flexible Antifreeze Zn-Ion Hybrid Supercapacitor Based on Gel Electrolyte with Graphene Electrode", ACS Applied Materials & Interfaces, vol. 13, No. 14, Apr. 1, 2021, pp. 16454-16468, doi: 10.1021/acsami.1c02242.
Liu et al., "From room temperature to harsh temperature applications: Fundamentals and perspectives on electrolytes in zinc metal batteries", Science Advances, vol. 8, No. 12, Article eabn5097, Mar. 23, 2022, pp. 1-24, doi: 10.1126/sciadv.abn5097.
Liu et al., "Hydrogels for Engineering of Perfusable Vascular Networks", International Journal of Molecular Sciences, vol. 16, No. 7, Jul. 14, 2015, pp. 15997-16016, doi: 10.3390/ijms160715997.
Liu et al., "Nanocomposite Smart Hydrogels with Improved Responsiveness and Mechanical Properties: A Mini Review", Journal of Polymer Science, Part B: Polymer Physics, vol. 56, No. 19, Oct. 1, 2018, pp. 1306-1313, doi: 10.1002/polb.24723.
Liu et al., "Physically Crosslinked Composite Hydrogels of PVA With Natural Macromolecules: Structure, Mechanical Properties, and Endothelial Cell Compatibility", Journal of Biomedical Materials Research Part B: Applied Biomaterials, vol. 90B, No. 2, Aug. 2009, pp. 492-502, doi: 10.1002/jbm.b.31310.
Liu et al., "Poly(ionic liquid) hydrogel-based anti-freezing ionic skin for a soft robotic gripper", Materials Horizons, vol. 7, No. 3, Dec. 5, 2019, pp. 919-927, doi: 10.1039/C9MH01688K.
Liu et al., "Soft and elastic hydrogel-based microelectronics for localized low-voltage neuromodulation", Nature Biomedical Engineering, vol. 3, Jan. 2019, pp. 58-68, doi: 10.1038/s41551-018-0335-6.
Liu et al., "Sulfonic-Group-Grafted Ti3C2Tx MXene: A Silver Bullet to Settle the Instability of Polyaniline toward High-Performance Zn-Ion Batteries", ACS Nano, vol. 15, No. 5, Apr. 29, 2021, pp. 9065-9075, doi: 10.1021/acsnano.1c02215.
Liu et al., "Thermal behavior and mechanical properties of physically crosslinked PVA/Gelatin hydrogels", Journal of the Mechanical Behavior of Biomedical Materials, vol. 3, 2010, pp. 203-209, doi: 10.1016/j.jmbbm.2009.07.001.
Lo Nostro et al., "Hofmeister Phenomena: An Update on Ion Specificity in Biology", Chemical Reviews, vol. 112, No. 4, Jan. 17, 2012, pp. 2286-2322, doi: 10.1021/cr200271j.
Long et al., "Fracture toughness of hydrogels: measurement and interpretation", Soft Matter, vol. 12, Sep. 12, 2016, pp. 8069-8086, doi: 10.1039/C6SM01694D.
Lu et al., "Pure PEDOT:PSS hydrogels", Nature Communications, vol. 10, No. 1043, Mar. 5, 2019, 10 pgs., doi: 10.1038/s41467-019-09003-5.
Luo et al., "Oppositely Charged Polyelectrolytes Form Tough, Self-Healing, and Rebuildable Hydrogels", Advanced Materials, vol. 27, No. 17, May 6, 2015, pp. 2722-2727, doi: 10.1002/adma.201500140.
Ma et al., "Hydrogen-Free and Dendrite-Free All-Solid-State Zn-Ion Batteries", Advanced Materials, vol. 32, No. 14, Article 1908121, Apr. 9, 2020, 10 pgs., doi: 10.1002/adma.201908121.
MacCarrone et al., "Cononsolvency Effects on the Structure and Dynamics of Microgels", Macromolecules, vol. 47, No. 17, Aug. 20, 2014, pp. 5982-5988, doi: 10.1021/ma500954t.
Maganaris et al., "In vivo human tendon mechanical properties", The Journal of Physiology, vol. 521, No. 1, 1999, pp. 307-313, doi: 10.1111/j.1469-7793.1999.00307.x.
Mao et al., "Effects of substrate stiffness and cell-cell contact on mesenchymal stem cell differentiation", Biomaterials, vol. 98, Aug. 2016, pp. 184-191, doi: 10.1016/j.biomaterials.2016.05.004.
Mardles, "Transactions", Journal of the Society of Chemical Industry, vol. 42, No. 13, Mar. 29, 1923, pp. T127-T142, doi: 10.1002/jctb.5000421326.
Mo et al., "A flexible rechargeable aqueous zinc manganese-dioxide battery working at −20° C.", Energy & Environmental Science, vol. 12, No. 2, Jan. 10, 2019, pp. 706-715, doi: 10.1039/C8EE02892C.
Mo et al., "Biomimetic organohydrogel electrolytes for high-environmental adaptive energy storage devices", EcoMat, Functional Materials for Green Energy and Environments, vol. 1, Article e12008, 2019, pp. 1-12, doi: 10.1002/eom2.12008.
Mo et al., "Zwitterionic Sulfobetaine Hydrogel Electrolyte Building Separated Positive/Negative Ion Migration Channels for Aqueous Zn—MnO2 Batteries with Superior Rate Capabilities", Advanced Energy Materials, vol. 10, No. 16, Article 2000035, Apr. 28, 2020, 12 pgs., doi: 10.1002/aenm.202000035.
Monroe et al., "The Impact of Elastic Deformation on Deposition Kinetics at Lithium/Polymer Interfaces", Journal of the Electrochemical Society, vol. 152, No. 2, 2005, pp. A396-A404, doi: 10.1149/1.1850854.
Morelle et al., "Highly Stretchable and Tough Hydrogels below Water Freezing Temperature", Advanced Materials, vol. 30, No. 35, Article 1801541, Aug. 29, 2018, pp. 1-8, doi: 10.1002/adma.201801541.
Mredha et al., "A Facile Method to Fabricate Anisotropic Hydrogels with Perfectly Aligned Hierarchical Fibrous Structures", Advanced Materials, vol. 30, No. 9, Article 1704937, Jan. 17, 2018, pp. 1-8, doi: 10.1002/adma.201704937.
Mredha et al., "Anisotropic tough multilayer hydrogels with programmable orientation", Materials Horizons, vol. 6, No. 7, 2019, pp. 1504-1511, doi: 10.1039/C9MH00320G.
Mukae et al., "Swelling of Poly(N-isopropylacrylamide) Gels in Water-Alcohol (C1—C4) Mixed Solvents", The Journal of Physical Chemistry, vol. 97, No. 3, Jan. 1, 1993, pp. 737-741, doi: 10.1021/j100105a034.
Mukherji et al., "Polymer collapse in miscible good solvents is a generic phenomenon driven by preferential adsorption", Nature Communications, vol. 5, No. 4882, Sep. 12, 2014, pp. 1-6, doi: 10.1038/ncomms5882.
Muta et al., "Ion-specific swelling of hydrophilic polymer gels", Polymer, vol. 42, No. 14, Jun. 2001, pp. 6313-6316, doi: 10.1016/S0032-3861(01)00098-2.
Nian et al., "Aqueous Batteries Operated at −50° C.", Angewandte Chemie International Edition, vol. 58, No. 47, Nov. 18, 2019, pp. 16994-16999, doi: 10.1002/anie.201908913.
Nian et al., "Issues and opportunities on low-temperature aqueous batteries", Chemical Engineering Journal, vol. 423, Article 130253, Nov. 1, 2021, 10 pgs., doi: 10.1016/j.cej.2021.130253.
Parlett et al., "Hierarchical porous materials: Catalytic applications", Chemical Society Reviews, vol. 42, No. 9, 2013, pp. 3876-3893, doi: 10.1039/c2cs35378d.
Patachia et al., "Tailoring of poly(vinyl alcohol) cryogels properties by salts addition", eXPRESS Polymer Letters, vol. 3, No. 5, 2009, pp. 320-331, doi: 10.3144/expresspolymlett.2009.40.
Patil et al., "An Ultrahigh Performance Zinc-Organic Battery using Poly(catechol) Cathode in Zn(TFSI)2-Based Concentrated Aqueous Electrolytes", Advanced Energy Materials, vol. 11, No. 26, Article 2100939, Jul. 15, 2021, pp. 1-14, doi: 10.1002/aenm.202100939.

(56) References Cited

OTHER PUBLICATIONS

Pegram et al., "Hofmeister Salt Effects on Surface Tension Arise from Partitioning of Anions and Cations between Bulk Water and the Air-Water Interface", The Journal of Physical Chemistry B, vol. 111, No. 19, Apr. 14, 2007, pp. 5411-5417, doi: 10.1021/jp070245z.
Pei et al., "A Flexible Rechargeable Zinc-Air Battery with Excellent Low-Temperature Adaptability", Angewandte Chemie International Edition, vol. 59, No. 12, Mar. 16, 2020, pp. 4793-4799, doi: 10.1002/anie.201915836.
Peppas et al., "Differential Scanning Calorimetry of Crystallized PVA Hydrogels", Journal of Applied Polymer Science, vol. 20, Jun. 1976, pp. 1457-1465, doi: 10.1002/app.1976.070200604.
Qin et al., "Anisotropic and self-healing hydrogels with multi-responsive actuating capability", Nature Communications, vol. 10, No. 2202, 2019, 11 pgs., doi: 10.1038/s41467-019-10243-8.
Qin et al., "Bioinspired Hydrogel Interferometer for Adaptive Coloration and Chemical Sensing", Advanced Materials, vol. 30, No. 21, Article 1800468, May 24, 2018, 7 pgs., doi: 10.1002/adma.201800468.
Qiu et al., "Dual-Stimuli-Responsive Polymer Composite with Ultrawide Tunable Stiffness Range Triggered by Water and Temperature", ACS Applied Polymer Materials, vol. 2, No. 5, Apr. 13, 2020, pp. 2008-2015, doi: 10.1021/acsapm.0c00181.
Qu et al., "Spontaneously Regenerative Tough Hydrogels", Angewandte Chemie International Edition, vol. 58, No. 32, Aug. 5, 2019, pp. 10951-10955, doi: 10.1002/anie.201904932.
Quan et al., "High-Performance Anti-freezing Flexible Zn—MnO2 Battery Based on Polyacrylamide/Graphene Oxide/Ethylene Glycol Gel Electrolyte", Frontiers in Chemistry, vol. 8, Article 603, Jul. 31, 2020, pp. 1-9, doi: 10.3389/fchem.2020.00603.
Ray et al., "Bio-Integrated Wearable Systems: A Comprehensive Review", Chemical Reviews, vol. 119, No. 8, Jan. 28, 2019, pp. 5461-5533, doi: 10.1021/acs.chemrev.8b00573.
Ricciardi et al., "Short Time Dynamics of Solvent Molecules and Supramolecular Organization of Poly (vinyl alcohol) Hydrogels Obtained by Freeze/Thaw Techniques", Macromolecules, vol. 38, No. 15, Jun. 18, 2005, pp. 6629-6639, doi: 10.1021/ma0506031.
Ricciardi et al., "Structure and Properties of Poly(vinyl alcohol) Hydrogels Obtained by Freeze/Thaw Techniques", Macromolecular Symposia, vol. 222, No. 1, Mar. 2005, pp. 49-63, doi: 10.1002/masy.200550405.
Rich et al., "Untethered soft robotics", Nature Electronics, vol. 1, No. 2, Feb. 2018, pp. 102-112, doi: 10.1038/s41928-018-0024-1.
Rong et al., "Low Temperature Tolerant Organohydrogel Electrolytes for Flexible Solid-State Supercapacitors", Advanced Energy Materials, vol. 8, No. 31, Article 1801967, Nov. 5, 2018, pp. 1-7, doi: 10.1002/aenm.201801967.
Rothemund et al., "Shaping the future of robotics through materials innovation", Nature Materials, vol. 20, No. 12, Dec. 2021, pp. 1582-1587, doi: 10.1038/s41563-021-01158-1.
Schild et al., "Cononsolvency in mixed aqueous solutions of poly(N-isopropylacrylamide)", Macromolecules, vol. 24, No. 4, Feb. 1, 1991, pp. 948-952, doi: 10.1021/ma00004a022.
Seidlits et al., "The effects of hyaluronic acid hydrogels with tunable mechanical properties on neural progenitor cell differentiation", Biomaterials, vol. 31, No. 14, May 2010, pp. 3930-3940, doi: 10.1016/j.biomaterials.2010.01.125.
Serizawa et al., "Rapid Deswelling of Porous Poly(N-isopropylacrylamide) Hydrogels Prepared by Incorporation of Silica Particles", Macromolecules, vol. 35, No. 1, 2002, pp. 10-12, doi: 10.1021/ma011362+.
Shi et al., "A Long Cycle-Life Self-Doped Polyaniline Cathode for Rechargeable Aqueous Zinc Batteries", Angewandte Chemie, vol. 57, No. 50, Nov. 14, 2018, pp. 16359-16363, doi: 10.1002/anie.201808886.
Shi et al., "A Long-Cycle-Life Self-Doped Polyaniline Cathode for Rechargeable Aqueous Zinc Batteries", Angewandte Chemie, vol. 130, No. 50, Dec. 10, 2018, pp. 16597-16601, doi: 10.1002/ange.201808886.
Sornkamnerd et al., "Tough and Porous Hydrogels Prepared by Simple Lyophilization of LC Gels", ACS Omega, vol. 2, No. 8, Aug. 31, 2017, pp. 5304-5314, doi: 10.1021/acsomega.7b00602.
Sun et al., "Alkaline Double-Network Hydrogels with High Conductivities, Superior Mechanical Performances, and Antifreezing Properties for Solid-State Zinc-Air Batteries", ACS Applied Materials & Interfaces, vol. 12, No. 10, Feb. 19, 2020, pp. 11778-11788, doi: 10.1021/acsami.0c00325.
Sun et al., "Highly stretchable and tough hydrogels", Nature, vol. 489, Sep. 6, 2012, pp. 133-136, doi: 10.1038/nature11409.
Sunwoo et al., "Wearable and Implantable Soft Bioelectronics: Device Designs and Material Strategies", Annual Review of Chemical and Biomolecular Engineering, vol. 12, Jun. 2021, pp. 359-391, doi: 10.1146/annurev-chembioeng-101420-024336.
Tang et al., "Engineering the interplanar spacing of ammonium vanadates as a high-performance aqueous zinc-ion battery cathode", Journal of Materials Chemistry A, vol. 7, 2019, pp. 940-945, doi: 10.1039/C8TA09338E.
Tang et al., "Ion-confinement effect enabled by gel electrolyte for highly reversible dendrite-free zinc metal anode", Energy Storage Materials, vol. 27, May 2020, pp. 109-116, doi: 10.1016/j.ensm.2020.01.023.
Tang et al., "Issues and opportunities facing aqueous zinc-ion batteries", Energy & Environmental Science, vol. 12, No. 11, Sep. 30, 2019, pp. 3288-3304, doi: 10.1039/C9EE02526J.
Tanigami et al., "Ageing of poly(vinyl alcohol) gels prepared from dimethylsulfoxide/water solutions", Polymer (Guildf), vol. 35, No. 12, 1994, pp. 2573-2578, doi: 10.1016/0032-3861(94)90381-6.
Tarascon et al., "Issues and challenges facing rechargeable lithium batteries", Nature, vol. 414, No. 6861, Nov. 15, 2001, pp. 359-367, doi: 10.1038/35104644.
Tokuyama et al., "Porous poly(N-isopropylacrylamide) gels polymerized in mixed solvents of water and N,N-dimethylformamide", Polymer Bulletin, vol. 61, Jun. 27, 2008, pp. 399-405, doi: 10.1007/s00289-008-0961-3.
Tomaszewska et al., "Lithium-ion battery fast charging: A review", eTransportation, vol. 1, Article 100011, Aug. 2019, pp. 1-28, doi: 10.1016/j.etran.2019.100011.
Trensz et al., "Increased microenvironment stiffness in damaged myofibers promotes myogenic progenitor cell proliferation", Skeletal Muscle, vol. 5, Article 5, Feb. 2015, pp. 1-16, doi: 10.1186/s13395-015-0030-1.
Van De Witte et al., "Phase separation processes in polymer solutions in relation to membrane formation", Journal of Membrane Science, vol. 117, No. 1-2, Aug. 21, 1996, pp. 1-31, doi: 10.1016/0376-7388(96)00088-9.
Mswanathan et al., "The challenges and opportunities of battery-powered flight", Nature, vol. 601, Jan. 27, 2022, pp. 519-525, doi: 10.1038/s41586-021-04139-1.
Voges et al., "Ice-Templated Poly(vinyl alcohol): Enhanced Strength and Low Thermal Conductivity", Macromolecular Materials and Engineering, vol. 303, No. 9, Article 1800198, Sep. 2018, pp. 1-5, doi: 10.1002/mame.201800198.
Wan et al., "An Aqueous Rechargeable Zinc-Organic Battery with Hybrid Mechanism", Advanced Functional Materials, vol. 28, No. 45, Article 1804975, Nov. 7, 2018, 8 pgs., doi: 10.1002/adfm.201804975.
Wang, "Tough, Dendrite-Suppressing and Anti-Freezing Hydrogels Electrolyte for Zinc-Ion Batteries Operating in Harsh Conditions", University of California, Los Angeles ProQuest Dissertations Publishing, 2022, 17 pgs.
Wang et al., "A Concentrated Hydrogel Electrolyte-enabled Aqueous Rechargeable NiCo//Zn Battery Working from −20° C. to 50° C.", ACS Applied Materials & Interfaces, vol. 11, No. 1, 2019, pp. 49-55, doi: 10.1021/acsami.8b18003.
Wang et al., "A flexible zinc-ion battery based on the optimized concentrated hydrogel electrolyte for enhanced performance at subzero temperature", Electrochimica Acta, vol. 395, No. 139178, Nov. 1, 2021, pp. 1-34, doi: 10.1016/j.electacta.2021.139178.
Wang et al., "Biomorphic structural batteries for robotics", Science Robotics, vol. 5, No. 45, Article eaba1912, Aug. 19, 2020, pp. 1-9, doi: 10.1126/scirobotics.aba1912.

(56) References Cited

OTHER PUBLICATIONS

Wang et al., "Flexible and anti-freezing zinc-ion batteries using a guar-gum/sodium-alginate/ethylene-glycol hydrogel electrolyte", Energy Storage Materials, vol. 41, Oct. 2021, pp. 599-605, doi: 10.1016/j.ensm.2021.06.034.
Wang et al., "Novel PVA-based polymers showing an anti-Hofmeister Series property", Polymer, vol. 50, No. 15, Jul. 17, 2009, pp. 3680-3685, doi: 10.1016/j.polymer.2009.05.050.
Wang et al., "Stretchable materials of high toughness and low hysteresis", PNAS, vol. 116, No. 13, Mar. 8, 2019, pp. 5967-5972, doi: 10.1073/pnas.1821420116.
Wegst et al., "Bioinspired structural materials", Nature Materials, vol. 14, Jan. 2015, pp. 23-36, doi: 10.1038/nmat4089.
Wei et al., "Bonding interaction regulation in hydrogel electrolyte enable dendrite-free aqueous zinc-ion batteries from −20 to 60° C.", Chemical Engineering Journal, vol. 434, Article 134646, Apr. 15, 2022, 8 pgs., doi: 10.1016/j.cej.2022.134646.
Wei et al., "Hofmeister Effect-Aided Assembly of Enhanced Hydrogel Supercapacitor with Excellent Interfacial Contact and Reliability", Small Methods, vol. 3, No. 11, Article 1900558, Sep. 26, 2019, pp. 1-9, doi: 10.1002/smtd.201900558.
Winnik et al., "Methanol-water as a co-nonsolvent system for poly(N-isopropylacrylamide)", Macromolecules, vol. 23, No. 8, Apr. 1, 1990, pp. 2415-2416, doi: 10.1021/ma00210a048.

* cited by examiner

| | Range |
| --- | --- |
| Modulus | ~ 0 — 2500 kPa |
| Strength | ~ 0 — 23.5 MPa |
| Toughness | ~ 0 — 210 MJ/m$^3$ |
| Elongation | ~ 0 — 2900% |
| Fatigue threshold | ~ 0 — 10.5 kJ/m$^2$ |

Stretching
Strain (%)

Crack deflection
Fiber pull-out
Fiber bridging
Fibril fracture
Fibril bridging
Crack pinning
High functionality crosslinking
Strain (%)

a DF + Salting out
50μm
1μm
Γ = 131.14 KJ/m²
ε_c=21
Stress (MPa)
Strain (mm/mm)

b F + Salting out
Γ = 26.71 KJ/m²
ε_c=13.7
Stress (MPa)
Strain (mm/mm)

c DFT-3 cycles
Γ = 1.98 KJ/m²
ε_c=9.1
Stress (MPa)
Strain (mm/mm)
FIG. 5D d
Stretching
ε = 0%
ε = 200%
ε = 500%

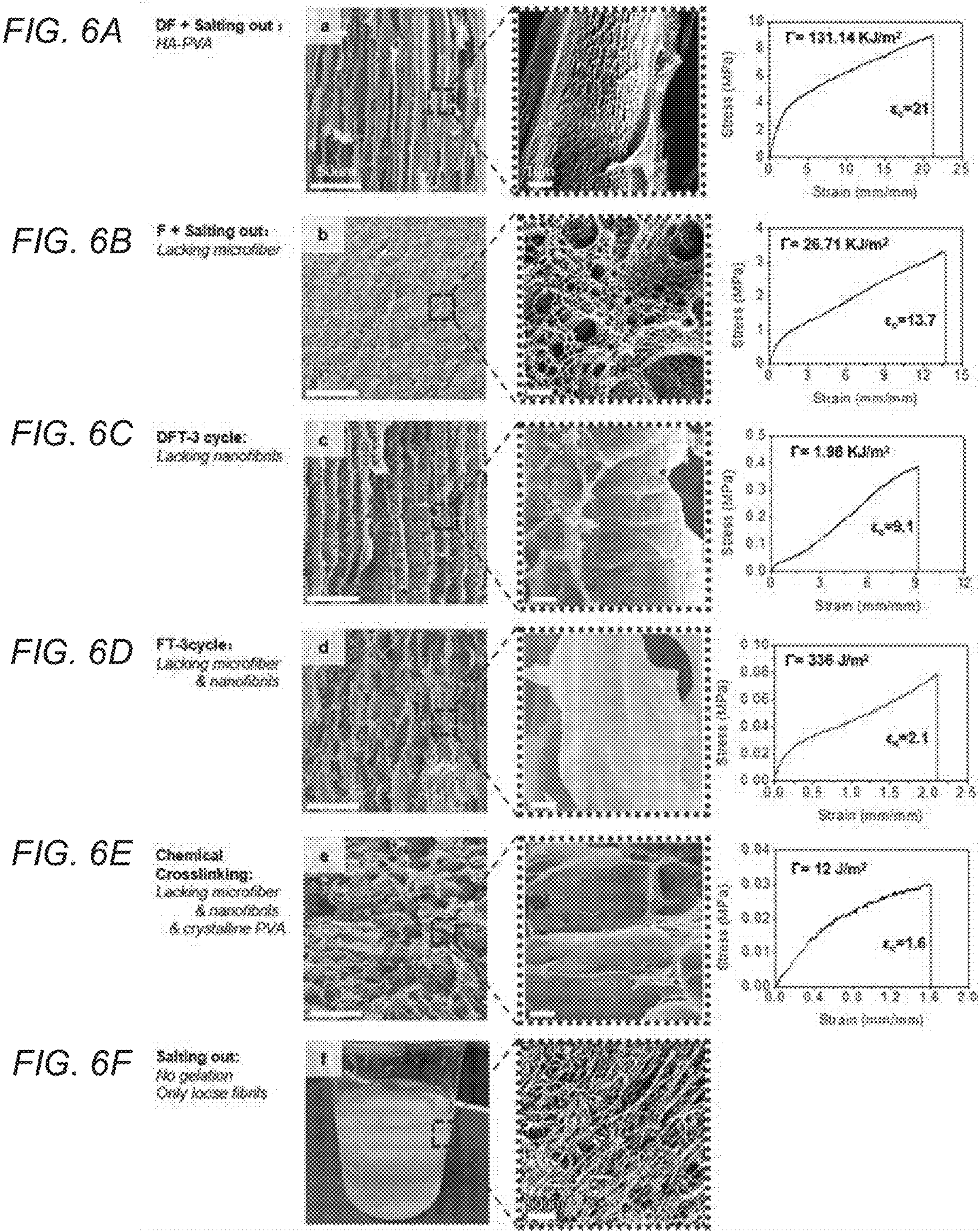
FIG. 6A
DF + Salting out :
HA-PVA
a
Γ= 131.14 KJ/m²
$\varepsilon_c$=21
Stress (MPa)
Strain (mm/mm)
FIG. 6B
F + Salting out:
Lacking microfiber
b
Γ= 26.71 KJ/m²
$\varepsilon_c$=13.7
Stress (MPa)
Strain (mm/mm)
FIG. 6C
DFT-3 cycle:
Lacking nanofibrils
c
Γ= 1.98 KJ/m²
$\varepsilon_c$=9.1
Stress (MPa)
Strain (mm/mm)
FIG. 6D
FT-3cycle:
Lacking microfiber
& nanofibrils
d
Γ= 336 J/m²
$\varepsilon_c$=2.1
Stress (MPa)
Strain (mm/mm)
FIG. 6E
Chemical
Crosslinking:
Lacking microfiber
& nanofibrils
& crystaline PVA
e
Γ= 12 J/m²
$\varepsilon_c$=1.6
Stress (MPa)
Strain (mm/mm)
FIG. 6F
Salting out:
No gelation
Only loose fibrils
f Bulk Micron Alignment Nano-fibril Network Molecular Crystalline Domains Atomic Hydrogen Bonding Achieved simultaneous high strength and toughness Toughening: Improved stretchability Strengthening & Toughening: Improved fracture resistance Strengthening: Increased modulus and fibril strength Basic interaction for structural evolution

FIG. 9

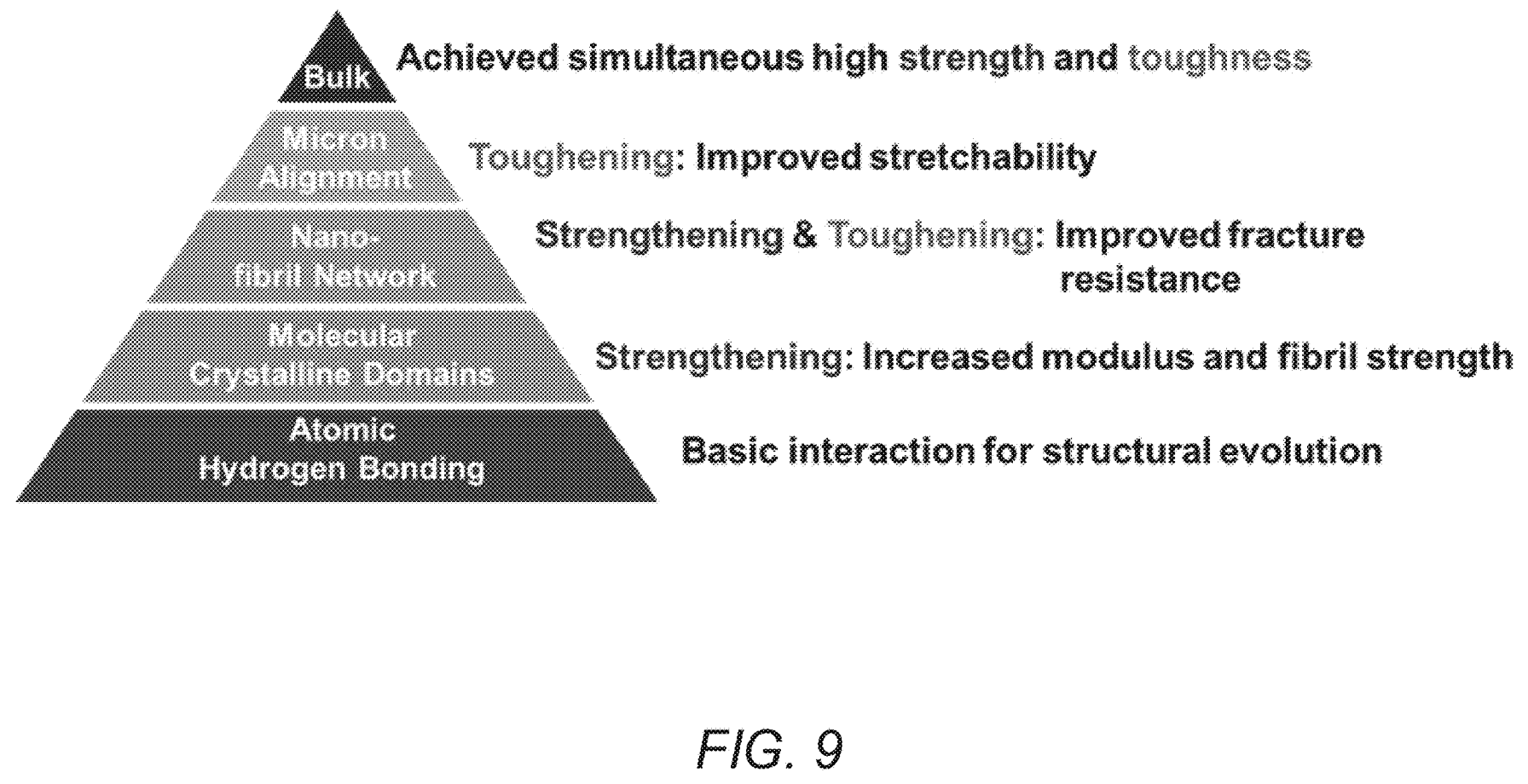

FIG. 13H
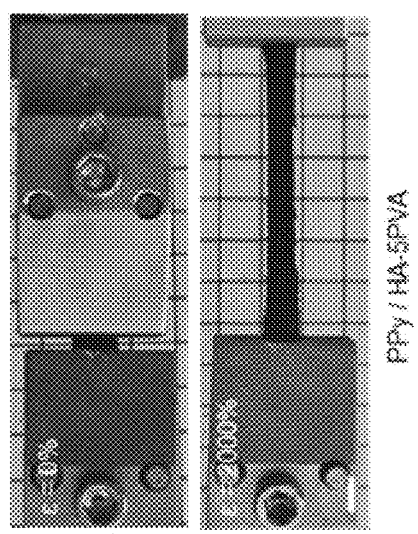
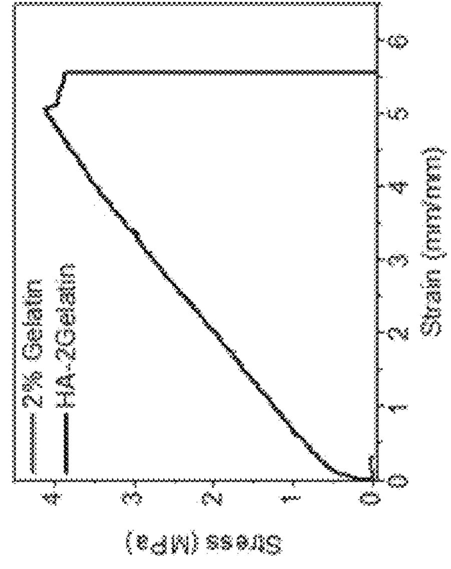
FIG. 13G b
Stress (MPa)
Strain (%)
c
Strain (%)

| Formation temperature (°C) | Ionic conductivity (S/m) | Young's Modulus (MPa) |
|---|---|---|
| -60 | 7.5 | 3.5 |
| -20 | 8.9 | 3.1 |
| 4 | 9.4 | 3.2 |
| 25 | 10.0 | 3.2 |
| 40 | 11.6 | 2 |

*FIG. 31E*

HIERARCHICALLY STRUCTURED HYDROGEL WITH TUNABLE MECHANICAL PROPERTIES

CROSS-REFERENCE TO RELATED APPLICATIONS

The current application claims the benefit of and priority to U.S. Provisional Patent Application No. 63/267,654 entitled "Hierarchically Structured Hydrogel with Broad-Range Tunable Mechanical Properties" filed Feb. 7, 2022. The disclosure of U.S. Provisional Patent Application No. 63/267,654 is hereby incorporated by reference in its entirety for all purposes.

FIELD OF THE INVENTION

The present invention generally relates to methods and systems for hydrogel with hierarchical structures and broad-range tunable mechanical properties.

BACKGROUND OF THE INVENTION

Wood is light and strong; nacres are hard and resilient; muscles and tendons are soft and tough. These natural materials show a combination of normally contradicting mechanical properties, which can be attributed to their hierarchical structures across multiple length scales. Compared with natural load-bearing materials, the loose cross-linking, low solid content, and homogeneous structure make conventional hydrogels relatively weak and fragile for handling real-world applications, which may demand long service periods, high load or impact tolerance, and large deformation.

BRIEF SUMMARY OF THE INVENTION

Many embodiments are directed to methods for fabricating hydrogel with hierarchical structures and tunable mechanical properties.

One embodiment of the invention includes a method for fabricating hydrogel comprising:

- providing a solution with a solute in a solvent, wherein the solute is capable of aggregation or crystallization by forming hydrogen bonds or via hydrophobic interaction;
- concentrating the solution, wherein the concentrated solution forms a first structure with a dimension in micrometer size; and
- salting out the concentrated solution in a salt solution to form a hydrogel, wherein the salting out process forms a second structure on the first structure and the second structure has a dimension in nanometer size;

wherein the hydrogel has a hierarchical structure.

In an additional embodiment, the concentrating process is selected from the group consisting of: freezing, freeze-casting, crosslinking, covalent bond-based crosslinking, thermal annealing, phase separation, and polymerization.

In another embodiment, the freezing is directional freezing, bi-directional freezing, or non-directional freezing.

In a further embodiment, the directional freezing forms an anisotropic first structure, and the non-directional freezing forms an isotropic first structure.

In an additional embodiment again, the solute is selected from the group consisting of: a monomer, an oligomer, and a polymer.

In a further yet embodiment, the solute is selected from a group consisting of poly(vinyl alcohol) (PVA), poly(2-hydroxylethyl acrylate) (PHEA), gelatin, alginate, and cellulose.

In another further embodiment, the solute comprises PVA and the salt solution comprises an anion selected from the group consisting of: citrate$^-$, $SO_4^{2-}$, $CO_3^{2-}$, $Ac^-$, $Cl^-$, $NO_3^-$, and $I^-$.

In a further embodiment again, the solute comprises PVA and the salt solution comprises a cation selected from the group consisting of: $K^+$, $Na^+$, $Cs^+$, $Li^+$, $Ca^{2+}$, $Mg^{2+}$, and $Fe^{3+}$.

In another embodiment again, the solvent is water or a water-based solution.

In a further yet embodiment, a toughness of the hydrogel is between 0.017 MJ/m$^3$ and 210 MJ/m$^3$.

In an additional further embodiment, a strength of the hydrogel is between 50 KPa and 23.5 MPa.

In another embodiment again, a strain of the hydrogel is between 300% and 2900%.

In a further yet embodiment again, a water content of the hydrogel is from 70% to 95% weight percent.

Another embodiment includes a method for processing hydrogel comprising:

- providing a hydrogel;
- concentrating the hydrogel, wherein the concentrated hydrogel forms a first structure with a dimension in micrometer size; and
- salting out the concentrated hydrogel in a salt solution to forma processed, wherein the salting out process forms a second structure on the first structure and the second structure has a dimension in nanometer size;

where the processed hydrogel has a hierarchical structure.

In an additional embodiment, the hydrogel is formed via additive manufacturing or 3D printing.

In a further yet embodiment, the hydrogel comprises a conducting polymer.

In another yet embodiment again, the concentrating process is selected from the group consisting of: freezing, freeze-casting, crosslinking, covalent bond-based crosslinking, thermal annealing, phase separation, and polymerization.

In an additional embodiment, the freezing is directional freezing, bi-directional freezing, or non-directional freezing.

In a further embodiment, the directional freezing forms an anisotropic first structure, and the non-directional freezing forms an isotropic first structure.

In a further yet embodiment, the solute is selected from the group consisting of: a monomer, an oligomer, and a polymer.

In another embodiment again, the solute is selected from a group consisting of poly(vinyl alcohol) (PVA), poly(2-hydroxylethyl acrylate) (PHEA), gelatin, alginate, and cellulose.

In a further yet embodiment, the solute comprises PVA and the salt solution comprises an anion selected from the group consisting of: citrate$^-$, $SO_4^{2-}$, $CO_3^{2-}$, $Ac^-$, $Cl^-$, $NO_3^-$, and $I^-$.

In an additional embodiment again, the solute comprises PVA and the salt solution comprises a cation selected from the group consisting of: $K^+$, $Na^+$, $Cs^+$, $Li^+$, $Ca^{2+}$, $Mg^{2+}$, and $Fe^{3+}$.

In a further embodiment, the solvent is water or a water-based solution.

In a yet further embodiment, a toughness of the processed hydrogel is between 0.017 MJ/m$^3$ and 210 MJ/m$^3$.

In an additional embodiment, a strength of the processed hydrogel is between 50 KPa and 23.5 MPa.

In another embodiment, a strain of the processed hydrogel is between 300% and 2900%.

In a further yet embodiment, a water content of the hydrogel is from 70% to 95% weight percent.

A further embodiment includes a hydrogel comprising a hierarchical structure comprising: a first structure with a dimension in micrometer size; and a second structure formed on the first structure and the second structure has a dimension in nanometer size; where the hydrogel has a water content from 70% to 95% weight percent.

In an additional embodiment, the hydrogel comprises a conducting polymer.

In a further yet embodiment again, the hydrogel comprises a material selected from a group consisting of poly (vinyl alcohol) (PVA), poly(2-hydroxylethyl acrylate) (PHEA), gelatin, alginate, and cellulose.

In another embodiment, a toughness of the hydrogel is between 0.017 $MJ/m^3$ and 210 $MJ/m^3$.

In another further embodiment, a strength of the hydrogel is between 50 KPa and 23.5 MPa.

In a further yet embodiment, a strain of the hydrogel is between 300% and 2900%.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIGS. 5A-5D illustrate hydrogel structure and mechanical properties relationship in accordance with an embodiment.

FIGS. 6A-6F illustrate micro- and nano-structures and stress-strain curves of PVA hydrogels fabricated by different methods and their corresponding fracture energies and critical strains in accordance with an embodiment.

FIG. 9 illustrates a hierarchy and relationship of different strengthening and toughening roles played by each level of structures in accordance with an embodiment.

FIGS. 13A-13H illustrate tunable mechanical properties and generality of ice-templating assisted salting-out hydrogels in accordance with an embodiment.

FIGS. 20A-20J illustrate HA-PVA hydrogel as strain sensor in accordance with an embodiment.

FIGS. 31A-31E illustrate fabrication of gradient hydrogel leveraging solvent-polymer interaction in accordance with an embodiment.

DETAILED DESCRIPTION OF THE INVENTION

Figures 1A, 1B, 1C, 1D, 1E, 1F:
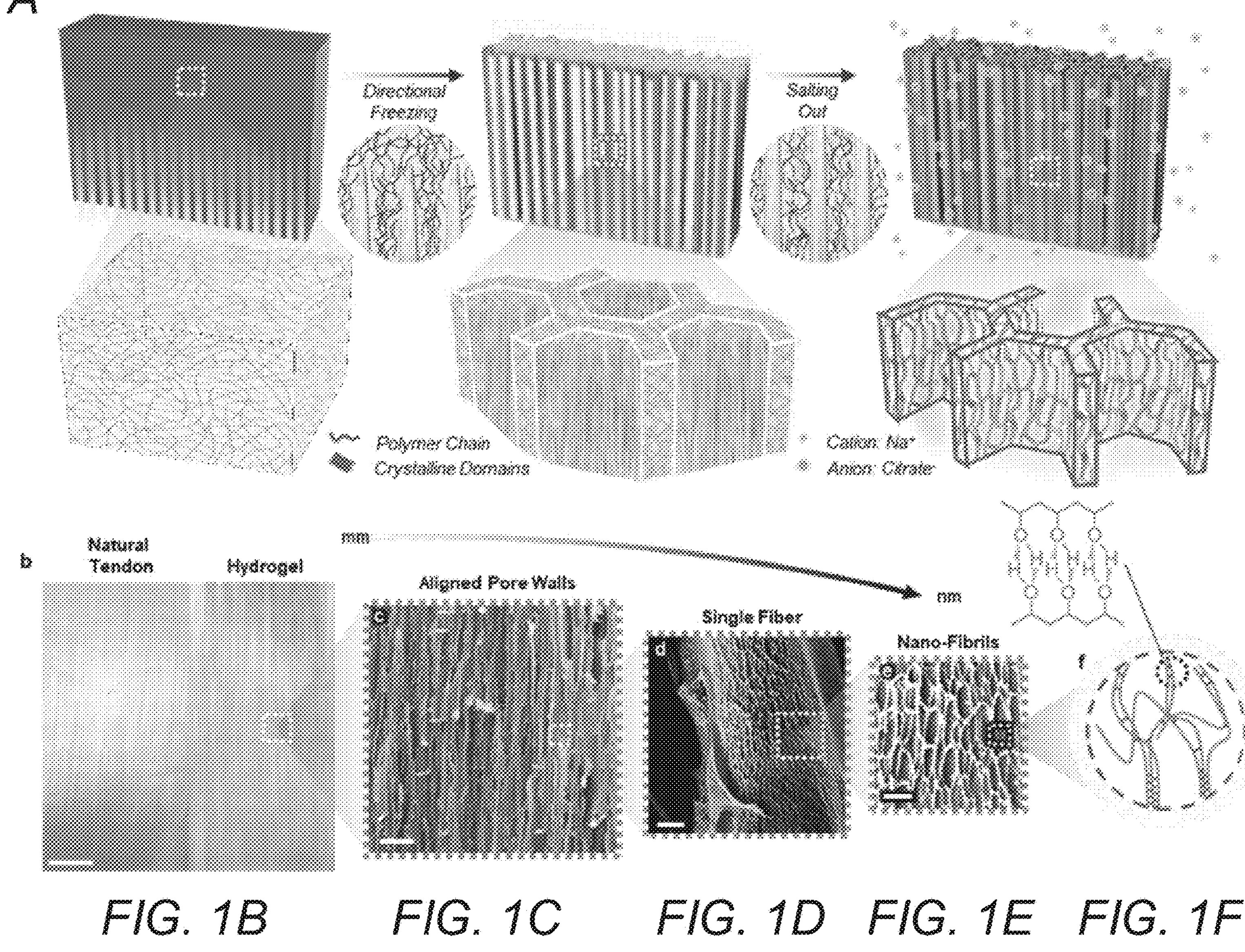
FIGS. 1A-1F illustrate fabrication processes and hierarchical structures of HA-PVA hydrogels in accordance with an embodiment.

Turning now to the drawings and data, fabrication methods that combine pre-concentrating and salting out in sequential steps for fabricating tough hydrogel with hierarchical micro- and nano-structures and broad-range tunable strength, strain, toughness, and fatigue resistance are described. Many embodiments comprise pre-concentrating a polymer solution followed by casting the concentrated solution into specific salt solution for fabricating tough hydrogels. Various processes can be used to pre-concentrate the solution including (but not limited to) freeze-casting, crosslinking, covalent bond based crosslinking, thermal annealing, phase separation, and polymerization from monomers. Various embodiments provide that the pre-concentrating process can create micrometer size structures in the material and the subsequent salting out process can create nanometer scale structures in the material.

Methods of fabricating tough hydrogels in accordance with several embodiments allow for facile fabrication steps, tunable and desirable mechanical properties, and multi-scale hierarchical architecture. Some embodiments provide fabrication steps of making tough hydrogel. The fabrication steps can be carried out without the need for sophisticated instruments. The fabrication processes can be scaled for making various sample sizes. A number of embodiments provide that hydrogel can have tunable mechanical properties including (but not limited to): strength, strain, toughness, and fatigue resistance by salting out in different salt solution for various period of time. Certain embodiments provide that hydrogel can have desired mechanical properties including (but not limited to): simultaneous ultra-high strength, strain, toughness, fatigue resistance, and low hysteresis, by choosing appropriate salt in the salting out step. In several embodiments, that hydrogel has multi-scale hierarchical architecture including (but not limited to): complex hierarchical structure that mimics natural materials.

The fabrication methods of hydrogel in accordance with some embodiments can be applied to monomers, oligomers, and polymers capable of aggregation and/or crystallization by themselves via formation of hydrogen bonds and/or hydrophobic interaction. Examples of the tough hydrogels that can be produced by the method include (but are not limited to): poly(vinyl alcohol) (PVA), poly(2-hydroxylethyl acrylate) (PHEA), gelatin, alginate, and cellulose. The target solute (monomers, oligomers, and polymers) can be dissolved in a solvent including (but not limited to): water or water based solution in accordance with some embodiments. Several embodiments fabricate PVA hydrogels with high mechanical strength, high mechanical strain, high toughness, and high fatigue resistance. Some embodiments fabricate PHEA hydrogels with low hysteresis.

In some embodiments, the first step of the fabrication process includes pre-concentrating the polymers (i.e., making the polymer chains spatially close enough to aggregate upon the exposure to salts and/or ions in the subsequent salting out step), and fixing the bulk shape. The first step for forming hydrogels with desired properties in accordance with several embodiments can include (but is not limited to) polymerization from monomers, covalent-bond-based crosslinking, thermal annealing, phase separation, and freezing. Many embodiments pre-concentrate the polymers or preform hydrogels by chemical reactions, polymerization and/or crosslinking. Several embodiments pre-concentrate the hydrogels by freezing the solution. In various embodiments, the freezing step can be directional, bi-directional, or non-directional. In certain embodiments, the freezing temperature should be below the freezing point of the solution. In some embodiments, the freezing step can concentrate the dissolved solute to the grain boundaries between ice crystals. This is because the solute will be expelled out of the ice phase during freezing. The micrometer scale structure can be determined by this step. If directional freezing is applied, the final material may have anisotropic structures. If non-directional freezing is applied, the final material may have isotropic structures. The solute concentrating effect induced by freezing can prepare the solute for subsequent aggregation by salting out.

In several embodiments, the second step includes salting out to form and toughen the hydrogels. The salt solution used in salting out step should be chosen specifically to induce desired level of aggregation of the frozen assay. The effect of different salt solutions on the solute can be determined empirically. In several embodiments, the salting out step can induce the aggregation and/or crystallization of solute by phase separation to various degrees by selecting specific salt. For hydrophilic molecules and water solvents, salt with strong salting out effect should be used to create hydrogel with high mechanical properties in accordance with certain embodiments. Under the influence of specific salt with strong salting out effect, the preconcentrated solute by the freezing step can strongly self-coalesce and phase-separate from the original homogeneous phase, which in turn form a mesh-like nanofibril network on the surface of the micrometer-scale structures. Many embodiments show that the final material can have hierarchical architecture with nanometer scale structures within the micrometer scale structures. The formation of this hierarchical structure can endow the material with improved strength, strain, toughness and fatigue resistance. The method can be customizable and applicable to any polymers, salts or other agents in accordance with several embodiments.

Salt with stronger salting out effect can create hydrogel with higher mechanical properties in accordance with a number of embodiments. Salt with weaker salting out effect can create hydrogel with lower mechanical properties. In several embodiments, for hydrophilic molecules and water solvent, salt with kosmotropic ions (as defined by Hofmeister series) show strong salting out effect, and can lead to higher mechanical properties. On the other hand, salt with chaotropic ions show weak salting out effect (or salting in effect), which can lead to lower mechanical properties. The salting out effect of common anions and cations on PVA in aqueous systems follow the order of citrate$^{-}$>$SO_4^{2-}$>$CO_3^{2-}$>$Ac^{-}$>$Cl^{-}$>$NO_3^{-}$>$I^{-}$, and $K^{+}$>$Na^{+}$≈$Cs^{+}$>$Li^{+}$≈$Ca^{2+}$≈$Mg^{2+}$>$Fe^{3+}$. As shown in the orders, some ions can strongly induce aggregation and crystallization of PVA and thus yield stronger and tougher PVA hydrogel, while some ions can destabilize aggregation and crystallization of PVA and thus yield weaker PVA hydrogel. In certain embodiments, KAc shows ultra-high solubility and can be used for making PVA hydrogels. The resulting PVA hydrogels have high ionic conductivity with anti-freezing effect and anti-dehydration effect.

In many embodiments, temperature gradient control can be used during the fabrication process to create hydrogel of gradient porous structures hence gradient mechanical properties. Temperature gradient control can result in pores in horizontal direction and/or the vertical direction. Applying the temperature gradient in a horizontal direction results in pores in horizontal direction. Applying the temperature gradient in a vertical direction results in pores in vertical direction. The orientation of the pores can affect the mechanical properties and the diffusive properties of the hydrogel.

The hierarchically structured hydrogel with tunable mechanical properties can be applied to various applications. Some embodiments use the hydrogels for tissue replacement. Using directional freezing plus subsequent salting out can produce hydrogels with resemblance to natural tendons in both structure and mechanical properties. PVA is an FDA approved biocompatible polymer. Hydrogel has high water content compared with commercial tissue replacement materials, which are water-less solid materials. The hydrogel based materials with tunable mechanical properties in accordance with several embodiments retain water content between about 70% and about 95%. The closer resemblance to natural tissues promote better implantation and less inflammation.

The tough hydrogel in accordance with some embodiments can toughen target polymers including (but not limited to) stimuli-responsive hydrogels, by copolymerizing, mixing or combining the precursors or non-crosslinked oligomers or polymers of tough hydrogel and target polymers into a hybrid polymer. Using the monomers, oligomers, and polymers of tough hydrogels that are functionalized to form covalent bonds or other bonds with target polymers, the resulting hybrid polymers can combine the properties of all the components, including high toughness and the functions of the target polymer components. In some embodiments, the tough hydrogel component can toughen the stimuli-responsive component to create a "stimuli-responsive tough material", providing an effective means of creating tough actuators or other active material systems. The molecular-level integration of the tough hydrogel and other polymers into a single polymer network via covalent bonds or other bonds, enables simultaneous toughening and maintaining of responsiveness and functions of the target polymer component. Such integration of properties may not be achievable by physical integrations (such as double network hybrid) where the two components may constrain and suppress each of the components. In certain embodiments, the resulting stimuli-responsive tough materials can generate much higher force when acting as actuators due to the effective toughening, which effectively solves the general mechanical weakness issue of many stimuli-responsive hydrogels.

In many embodiments, the fabrication methods can be applied to 3D printed PVA hydrogels of various geometries. The 3D printed part could mimic body parts including (but not limited to) blood vessel and alveoli, to be used as tissue replacements of various organs. The 3D printed part could also be hydrogel actuators or robots with complex structures. 3D printed hydrogels are usually weak due to requirement of printing precursor physical properties and limited bond formation during printing. The hydrogel fabrication methods in accordance with some embodiments can serve as post-treatment processes to increase the toughness of 3D printed hydrogels. Incorporating the tough hydrogel into 3D printing can toughen and refine the hydrogels simultaneously through the salting out processes. Refining the hydrogel can be achieved by ion-induced polymer aggregation to increase the print resolution. Thus the printed structures can have ultra-high resolution.

In several embodiments, the methods can be applied to PVA solution of various volume and geometries. In certain embodiments, it can be applied to PVA solution coated to other objects and structures. PVA solution can be coated onto rigid surgical tools including (but not limited to) clamps and needles, and then toughened using the disclosed methods. This can improve the interface between tools and tissues and reduce frication and the chance of accidental damage to tissues. In a number of embodiments, PVA solution can be coated onto porous materials with weak mechanical properties, and then toughened using the disclosed method. This can improve the mechanical property of porous materials. The methods provide easy fabrication processes. The liquid PVA solution can be easily coated onto objects with complex geometry. The coating then could be toughened by freezing and salting out using the disclosed methods. The methods provide high robustness and durability. The toughened PVA has high toughness and fatigue resistance, which allows the coating to be used for long term.

The tough PVA hydrogel in accordance with several embodiments can serve as matrix for infiltrating materials with additional functionality, such as infiltrating conductive polymer for electrical conductivity or combining with other stimuli responsive polymers for achieving stimuli responsiveness along with high toughness. The PVA hydrogel in accordance with some embodiments can improve mechanical property of conductive polymers. Conventional conducting polymers are brittle. By combining conducting polymer with the tough hydrogel, the conducting polymers could gain improved toughness, stretchability, and fatigue resistance. This can broaden the application of conducting polymers to more demanding mechanical loadings. The PVA hydrogel in accordance with several embodiments can improve mechanical property of stimuli responsive hydrogels. Conventional stimuli responsive hydrogels are fragile. By combining stimuli responsive hydrogel including (but not limited to) poly(n-isopropyl acrylamide) hydrogel with temperature responsiveness, with the described tough hydrogel, stimuli responsive hydrogels could gain improved toughness, stretchability, and fatigue resistance, while maintaining stimuli responsiveness. This can broaden the application of stimuli responsive hydrogels to more demanding mechanical loadings.

Methods for Fabricating Tough Hydrogel

Natural load-bearing materials with hierarchical assembly of anisotropic structures across multi-length-scales possess high water content of about 70% but are still strong and tough even when used for over 1 million cycles per year. Various hydrogels have been created via methods like electro-spinning, extrusion, compositing, freeze casting, self-assembly, and mechanical stretching for improved mechanical performance. However, many hydrogels with high water content do not show high strength, large toughness or high fatigue resistance.

Various improvements have been made to strengthen and toughen hydrogels by introducing mechanisms for energy dissipation during loading, such as by forming double network, having dual crosslinking, self-assembly, inducing hydrophobic aggregation, and creating nano-crystalline domains. These methods primarily focus on composition and molecular engineering, involving limited structural changes within a narrow length scale (molecular or nanoscale) and relatively simple structures compared to their complex structured natural counterparts.

Other advances take structural engineering approaches by creating anisotropic structures in hydrogels through methods of freeze casting, mechanical stretching, and compositing. For examples, directional freezing or ice templating is adopted due to its generic applicability to various polymers. However, ice-templated hydrogels with micro-alignment have shown mechanical performance comparable to, or lower than that of homogeneous tough hydrogels made by molecular engineering methods. Mechanical stretching has also been used to create anisotropic micro/nanostructures. Alternatively, instead of in-situ creating anisotropic structures within the hydrogel by ice templating and mechanical stretching, compositing method by addition of alien micro/nanoscale fiber-reinforcements into hydrogel has also been explored. The mechanically-trained hydrogels and hydrogel composites have improved strength and fracture toughness over homogeneous tough hydrogels, but also have limited stretchability or water content. These structural engineering approaches focus on optimizing the micro/nanostructures of existing hydrogels, yet it remains challenging to create simultaneously strong, tough, stretchable and fatigue-resistant hydrogels with more elaborately hierarchical structures across broader length-scales, like those observed in natural materials, while using a generic and facile approach.

Anisotropic composite of modulus-contrasting fibers and matrix made of similar composition has shown effectiveness for maintaining stretchability while improving strength, fracture toughness and fatigue resistance. Therefore, forming a hierarchically anisotropic single-composition hydrogel containing strong and stretchable fibers made of the same composition, would be promising for making water-laden hydrogels with simultaneous high strength, toughness, stretchability and fatigue threshold.

The alteration of polymer aggregation state could be realized by the addition of specific ions, known as the Hofmeister effect, where different ions have distinct abilities to precipitate polymers. With the aid of specific ions, modulus-contrasting structures could be formed out of the same polymer composition. Meanwhile, directional freezing could endow hydrogels with anisotropic structures at the larger (μm-mm) scales while promoting molecular concentrating. Many embodiments provide methods to make hydrogels by the combination of molecular and structural engineering approaches. By combining directional freeze-casting and a subsequent salting-out treatment, which synergistically create hydrogel structures on different length scales across mm to molecular level in accordance with several embodiments. Some embodiments provide strong, tough, stretchable and fatigue-resistant hydrogels with hierarchical and anisotropic structures (denoted as HA-PVA/gelatin/alginate hydrogels).

Many embodiments provide methods to produce strong, tough and fatigue resistant hydrogels with multi-length-scale hierarchical architecture using a pre-concentrating and salting-out treatment. Poly(vinyl alcohol) hydrogels exhibit highly anisotropic, comprising micro-sized honeycomb-like pore walls, which in turn comprise interconnected nanofibrils meshes, entirely physically assembled from polymer chains. The PVA hydrogels in accordance with several embodiments have water content from about 70% to about 95%, and exhibit stress of about (23.5±2.7 MPa) and strain of about (2900±450%), giant toughness of about (210±13 $MJ/m^3$, 175±8 $kJ/m^2$), and fatigue threshold of about (10.5±1.3 $kJ/m^2$). The PVA hydrogels are about 10-time tougher than natural tendon. The tough hydrogel fabrication methods in accordance with several embodiments could expand the applicability of weak polymeric material including (but not limited to) hydrogels, in applications that may require long-term services with high-loads and abrupt-impacts and extend the development of structural hydrogels.

Many embodiments employ the pre-concentrating and salting-out methods to make gelatin and alginate hydrogels with enhanced mechanical properties. In some embodiments, pre-concentrating can be achieved by freezing, polymerization from monomers, covalent-bond-based cross-linking, thermal annealing, and phase separation. Several embodiments provide that the gelatin hydrogel can achieve about 4 MPa and about 550% strain, which may lead to an over 1000-time increase in toughness (from about 0.0075±0.0006 $MJ/m^3$ to about 11.9±1.7 $MJ/m^3$). In some embodiments, the alginate hydrogel show about 1.1±0.2 MPa ultimate strength and an over 20-time increase in toughness compared to calcium crosslinked alginate hydrogel. Building upon the combination of high strength, stretchability and fatigue resistance of the PVA hydrogels, certain embodiments provide the material customizability for additional properties including (but not limited to) electrical conductivity to benefit the application of other fields. Several embodiments incorporate the PVA hydrogel with conducting polymer including (but not limited to) poly-pyrrole (PPy) and the hydrogel can be functionalized with electrical conductivity without retarding its strength nor toughness. Many embodiments provide hierarchically structured hydrogels that combined high strength, toughness, stretchability and fatigue resistance, using a freezing-assisted salting-out treatment.

Several embodiments provide methods for fabricating robust, low tortuosity electrodes with ultra-high mass loading, by compositing a superficial layer of tough hydrogel as reinforcement binders to the originally fragile micro-open-porous conducting polymer electrodes, termed as tough-gel reinforced open-porous foam (TROF) in the following. Some embodiments implement poly(vinyl alcohol) (PVA) to construct the tough hydrogel layer due to its excellent mechanical properties, ease of physical crosslinking and compositional simplicity. The ultra-tough hydrogel can reinforce the electrode in accordance with certain embodiments with a small amount of addition (0.1 mL $cm^{-2}$), which can improve electrode flexibility, stretchability and toughness while maintaining the open porous structure for fast diffusion. In a number of embodiments, when electrodes with tough hydrogel coating are assembled into an all-solid-state supercapacitor, the device demonstrate a high capacitance of about 5.25 $F/cm^2$, power density of about 41.28 mW $cm^{-2}$, stretchability of about 140% strain, toughness of about 1000 J $m^{-2}$ and cyclic stability of about 95.8% capacitance retention after 3500 cycles, owing to the ultra-high mass loading, open-porous structure and tough hydrogel reinforcement. Many embodiments provide the design and fabrication of high-performance supercapacitors for energy storage in flexible and wearable electronics.

Tough Hydrogel

Many embodiments implement tough hydrogel fabrication methods to make PVA hydrogels. In some embodiments, the PVA solution can be first directionally frozen and then directly immersed in a kosmotropic salt solution. A honeycomb-like micro-network with aligned pore walls can be created during the directional-freezing process. In certain embodiments, the concentration and closer packing of polymer during freezing can prepare the polymer chains for subsequent strong aggregation and crystallization induced by salting-out. For the choice of kosmotropic ions, various species can allow for a broad tunable range of the gel microstructures and mechanical properties. In some embodiments, sodium citrate show good salting-out ability and a high modulus. Under the influence of kosmotropic ions, the preconcentrated PVA chains can strongly self-coalesce and phase separate from the original homogeneous phase, which in turn form the mesh-like nanofibril network on the surface of the micron-scale aligned pore walls in accordance with several embodiments. In a number of embodiments, the phase separation of PVA can evolve over time for the elaborate structure and crystallinity to develop and mature, and the non-phase-separated portion of PVA remain in between the nanofibrils as a continuous membrane that can fill the nanofibril network.

FIGS. 1A-1F illustrate fabrication processes and hierarchical structures of HA-PVA hydrogels in accordance with an embodiment. FIG. 1A shows freezing-assisted salting-out fabrication procedure of the HA-PVA hydrogels. Structural formation and the polymer chain concentration, assembly and aggregation during freezing-assisted salting-out fabrication process can be seen in FIG. 1A. FIG. 1B shows macroscopic view of real tendon and the HA-5PVA hydrogel, scale bar 5 mm. FIGS. 1C-1E illustrate SEM images showing the microstructure (C, scale bar 50 μm) and nanostructure (D, scale bar 1 μm; E, scale bar 500 nm) of the HA-5PVA hydrogel. FIG. 1F shows molecular illustration of aggregated polymer chains into nanofibrils.

The Hoffmeister series originated from the empirical and qualitative ranking of different ions' ability to precipitate proteins from solution, also known as the "Ion-specific effect". Apart from proteins, many polymers also show similar trend of solubility in the presence of ions. For instance, PVA could strongly precipitate to form gels in the presence of some ions but dissolves quite well in other ionic solutions. To utilize the Hoffmeister effect as a gelation mechanism, the modulus of PVA hydrogels formed by self-aggregation in various salt solutions (different anion, fixed cation $Na^+$) are tested. The PVA solution can be poured into a mold and frozen to preserve the shape of the mold, followed by salting out in ionic solutions beginning from the frozen state. The result shows that under the same molar concentration, different anions have drastically different abilities to form PVA hydrogels and the modulus of formed PVA hydrogels mostly follows the Hoffmeister series.

Figure 2:
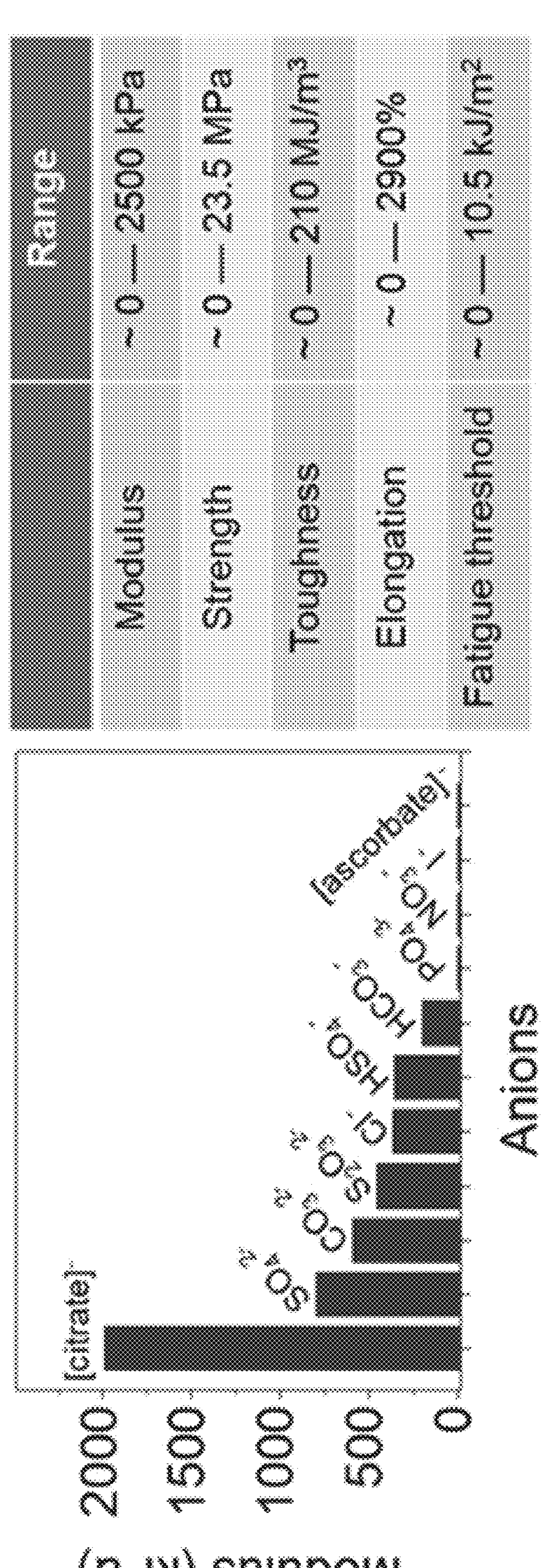
FIG. 2 illustrates Hoffmeister effect of various ions on the mechanical properties of PVA hydrogels in accordance with an embodiment.

FIG. 2 illustrates Hoffmeister effect of various ions on the mechanical properties of PVA hydrogels in accordance with an embodiment. FIG. 2 shows modulus of HA-5PVA hydrogel treated by different anions (concentration of about 1 M) after 5 hours of salting out treatment. The table shows a broad range tunability of different mechanical properties of this method by using different ions. For HA-5PVA hydrogel, the citrate used in salting out step can induce a modulus of at least 2000 kPa. $SO_4^{2-}$ used in salting out step can induce a modulus of at least 750 kPa. $CO_3^{2-}$ used in salting out step can induce a modulus of at least 500 kPa. $PO_4^{3-}$, $NO_3^-$, $I^-$, and ascorbate induce almost 0 kPa modulus in the hydrogel.

The anions used in the salting out step can tune the mechanical properties of the HA-5PVA hydrogel in a broad range in accordance with many embodiments. As shown in FIG. 2, the hydrogel can have a tunable modulus from about 0 kPa to about 2500 kPa; a strength from about 0 MPa to about 23.5 MPa; a toughness from about 0 MJ/m$^3$ to about 210 MJ/m$^3$; a elongation from about 0% to about 2900%; a fatigue threshold from about 0 kJ/m$^3$ to about 10.5 kJ/m$^3$.

Most common strengthening processes (e.g., increasing crosslinking density, increasing polymer content or adding nano-fillers for soft materials) provide strengthening at the cost of lowering the ductility, which is hard to compensate with subsequent post-treatments. Although limited processes exist for synergistic strengthening and toughening, they are restricted to specific types of materials (e.g., grain refining for metals, transformation-induced plasticity in metals and ceramics), not applicable to soft materials.

The combination of high strength and high toughness of the hydrogel in accordance with many embodiments can be correlated with three structural aspects at micro-, nano-, and molecular levels that evolved during synthesis, which integrate multiple strengthening and toughening mechanisms. On a micrometer level, the size and spacing of the aligned pore walls initially created by ice templating reduce significantly over time, as the hydration water between the polymer chains is gradually expelled during the "salting-out" treatment. This results in microfiber densification, which can strengthen the hydrogel by increasing the material density and also toughen the hydrogel by increasing the unit-volume energy dissipation via fiber pull-out. In conjunction with this microfiber densification, crack deflection and fiber bridging can serve as additional toughening mechanisms. The micron-scale changes originated from the significant nanoscopic evolution as more PVA aggregates, during which the nanofibril diameter decreases overtime, indicating each strand of fibril was densified overtime. Meanwhile, the number density of nanofibrils also significantly increases overtime as more nanofibrils are formed. The increase in both the physical density and number density of nanofibrils boosts the strength of the hydrogel and provides toughening by increasing energy dissipation per fracture of fibril (due to physical density increase) and the capacity of dissipated energy per unit volume (due to number density increase). The additional toughening mechanisms on this level are fibril bridging and crack deflection by nanofibrils. The nanofibril network also shows partial alignment along the ice growth direction, as indicated by the SEM and stretch of SAXS pattern. The partial alignment provides additional strengthening in the parallel direction and the unifying mesh serves as extra toughening mechanism by more even distribution of stress within the nanofibril network, such that the stress is less concentrated to fracture each fibril. The nanofibril growth further originates from the molecular-level PVA aggregation and crystallization overtime, as indicated by the appearance of the ring pattern corresponding to diffraction peak from crystalline PVA in the WAXS pattern. The crystalline content of HA-5PVA is measured to be about 4% in the swollen state after 24 hours of salting-out. The PVA crystalline domains strengthens each nanofibril and improves material elasticity by acting as rigid high functionality crosslinkers. They also toughen the fibrils by virtue of their ability to delay the fracture of individual fibrils by crack pinning.

The HA-PVA hydrogels in accordance with many embodiments show mechanical properties in the parallel and perpendicular direction relative to the alignment direction due to the induced anisotropy (denoted as HA-xPVA for x % PVA precursor). In some embodiments, the HA-5PVA hydrogels have toughness of about 175±9 MJ/m$^3$ upon stretching in the direction parallel to alignment, with an ultimate stress of about 11.5±1.4 MPa and ultimate strain of about 2900±450% after 24 h salting-out. The HA-5PVA hydrogel show a gradual failure mode featuring stepwise fracture and pull-out of fibers typical for highly anisotropic materials in accordance with embodiments. Some embodiments show no observable crack propagation perpendicular to the stretch direction during tensile loading of the hydrogel. Several embodiments provide that the hydrogel with pre-existing cracks show a significant crack blunting ability and the initial crack do not advance into the material at high strains, showing a flaw-insensitive property.

In many embodiments, the combination of high strength and high toughness can be correlated with three structural aspects at micro-, nano-, and molecular levels that evolve during synthesis, which can integrate multiple strengthening and toughening mechanisms. In some embodiments, the densification of aligned micropore walls and nanofibrils can strengthen the material by increasing the material density and toughen the material by increasing the energy dissipation during fracture. In several embodiments, the growing crystallinity during salting out can strengthen each nanofibril and improve material elasticity by acting as rigid high functionality crosslinkers and toughen the fibrils by virtue of their ability to delay the fracture of individual fibrils by crack pinning. In a number of embodiments, the strengthening mechanism can be mainly structural densification due to H-bonds and crystalline domain formation, and the toughening mechanisms can be pull-out, bridging and energy dissipation by the fibrils. During the evolution of these structures, the strength, stretchability and toughness of the HA-PVA hydrogel simultaneously increased, attributed to the structural evolution across multiple length scales.

Figures 3A, 3B, 3C, 3D, 3E, 3F, 3G:
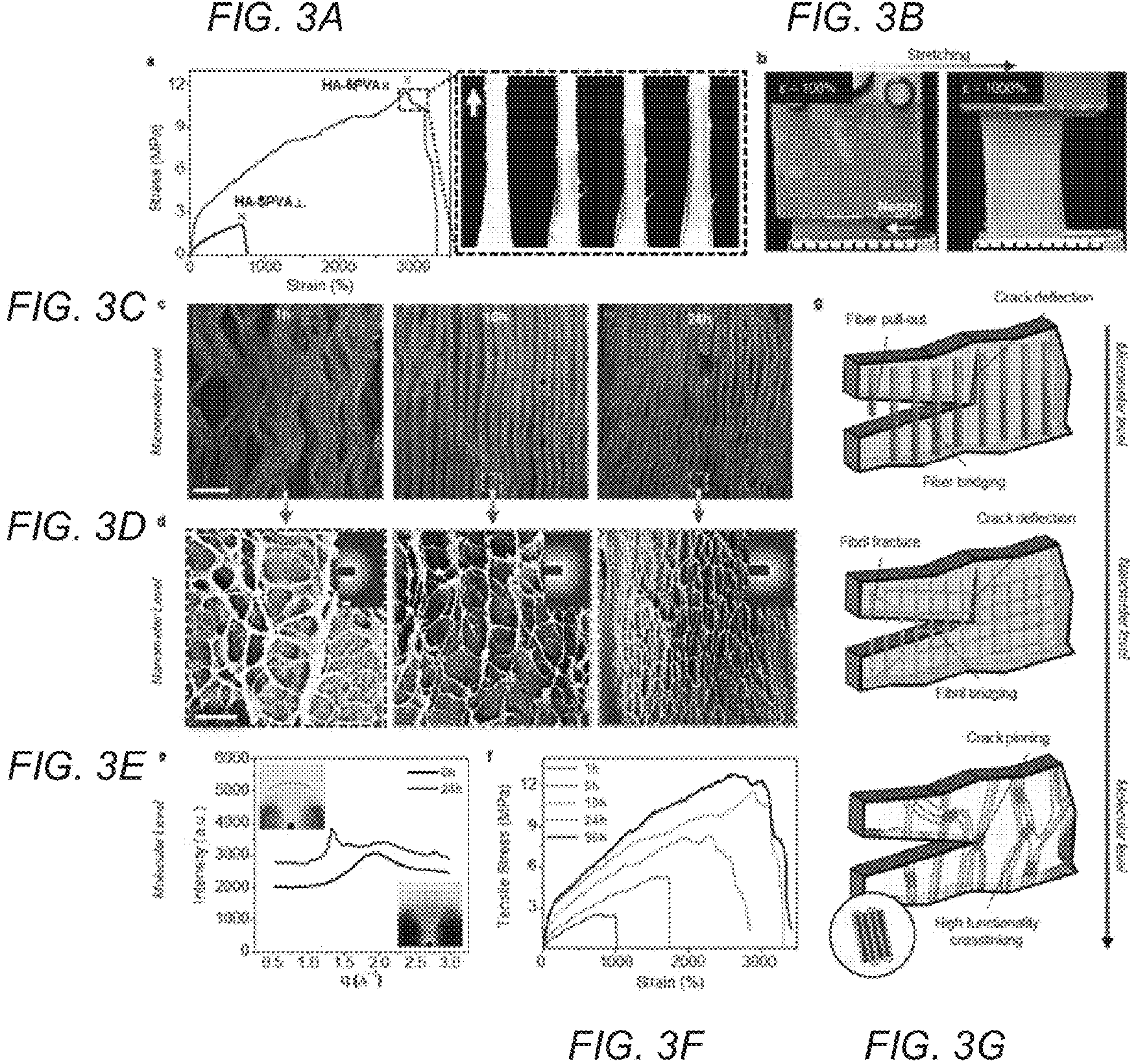
FIGS. 3A-3G illustrate mechanical properties and structural evolution of HA-PVA hydrogel in accordance with an embodiment.

FIGS. 3A-3G illustrate mechanical properties and structural evolution of HA-PVA hydrogel in accordance with an embodiment. FIG. 3A shows tensile stress-strain curve of HA-5PVA hydrogel in the parallel (||) and vertical (⊥) direction of alignment. The image to the right shows the fibrotic fracture of the HA-5PVAI|| hydrogel. FIG. 3B shows tensile loading of a HA-5PVA|| hydrogel with pre-made crack. FIG. 3C shows confocal images showing the microstructures of HA-5PVA|| hydrogels after different periods of salting-out in 1.5 M sodium citrate, scale bar 50 μm. FIG. 3D shows SEM images showing the evolution of nanofibril network within the microstructure during the salting-out process, scale bar 5 μm. The inset shows the corresponding SAXS pattern of freeze-dried HA-5PVA (II) hydrogel, scale bar 0.01 $Å^{-1}$. FIG. 3E shows WAXS patterns of HA-5PVA (||) hydrogel (top) compared with PVA hydrogel of the same polymer content prepared by repeated freeze-thaw cycles (bottom) and the corresponding integrated scattering intensity with scattering vector q between 0.5 to 3 $Å^{-1}$, scale bar 0.5 $Å^{-1}$. The peak at q=1.35 $Å^{-1}$ corresponds to the crystalline peak around 2Θ=18 degrees in 8 keV XRD scattering. FIG. 3F shows stress-strain curve of HA-5PVA (||) hydrogels after different periods of salting-out in 1.5M sodium citrate. FIG. 3G shows an illustration of toughening mechanisms from each length scale.

Figure 4:
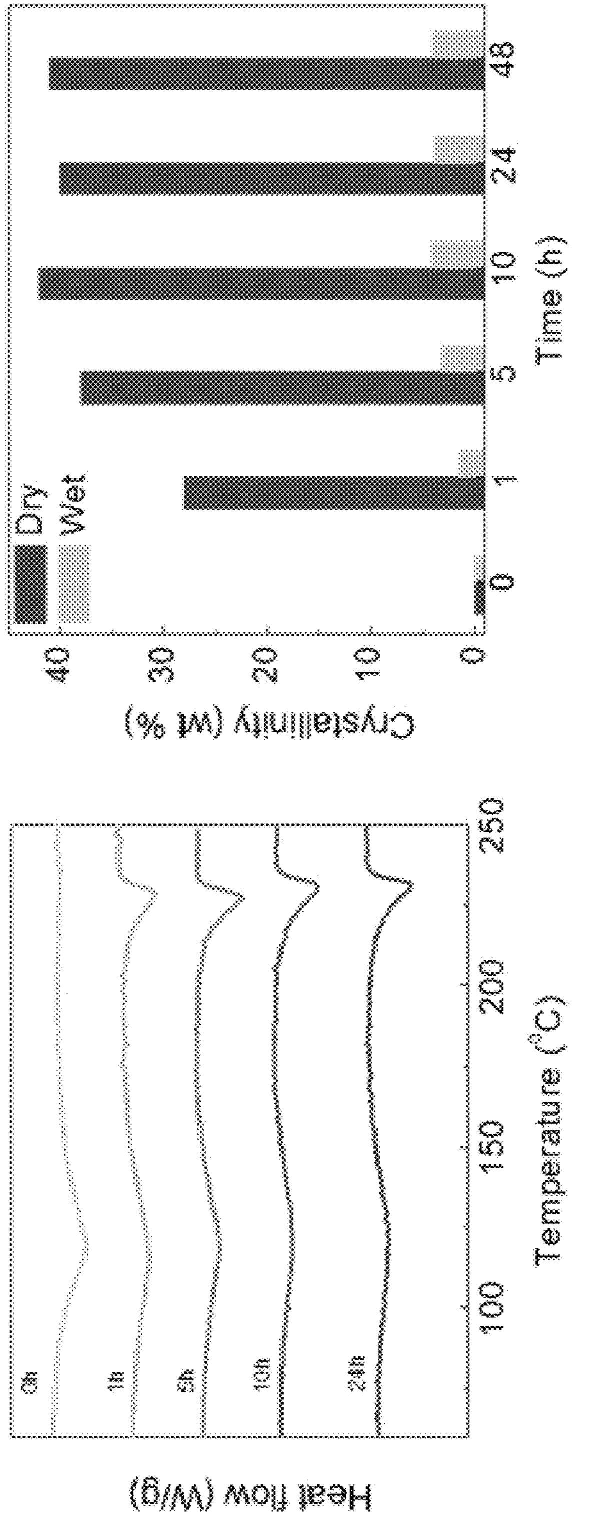
FIG. 4 illustrates DSC measurement of crystallinity of HA-5PVA hydrogel in accordance with an embodiment.

FIG. 4 illustrates DSC measurement of crystallinity of HA-5PVA hydrogel in accordance with an embodiment. The 0 h sample corresponds to hydrogel prepared by ice templating with 1 freeze-thaw cycle alone.

In many embodiments, ice templating can concentrate PVA to form the aligned pore walls and increase the local concentration of PVA to higher values than the nominal concentration, while salting-out may strongly induce the aggregation and crystallization of PVA by phase separation to form the nanofibrils. To understand the synergistic effects of freezing and salting-out in this combined method, several embodiments utilize a series of gel preparation methods with one or several factors missed out for direct comparisons. As control samples, the PVA hydrogels prepared by ice templating alone or salting-out alone show strength, toughness and stretchability all lower than those of HA-PVA hydrogels in accordance with embodiments. In some embodiments, structure-wise, the ice-templated PVA hydrogel without the subsequent salting-out show only aligned pore walls without the mesh-like nanofibrils, which suggest a weak aggregation of polymer chains in the absence of salting-out treatment. In several embodiments, directly salting-out the PVA without prior freezing may not yield a bulk hydrogel and instead may form loosely and randomly entangled fibrils, which suggest that pre-freezing the PVA solution can provide necessary confinement and preconcentration of PVA chains for effective phase separation during the subsequent salting-out to form a strong bulk material. In certain embodiments, such a freezing-assisted salting-out method may present a unique synergy that integrates the advantages of the two techniques to boost the effect of aggregation, and may be crucial for achieving the simultaneous high strength, toughness, stretchability and structural hierarchy in the HA-PVA hydrogels.

Figures 5A, 5B, 5C:
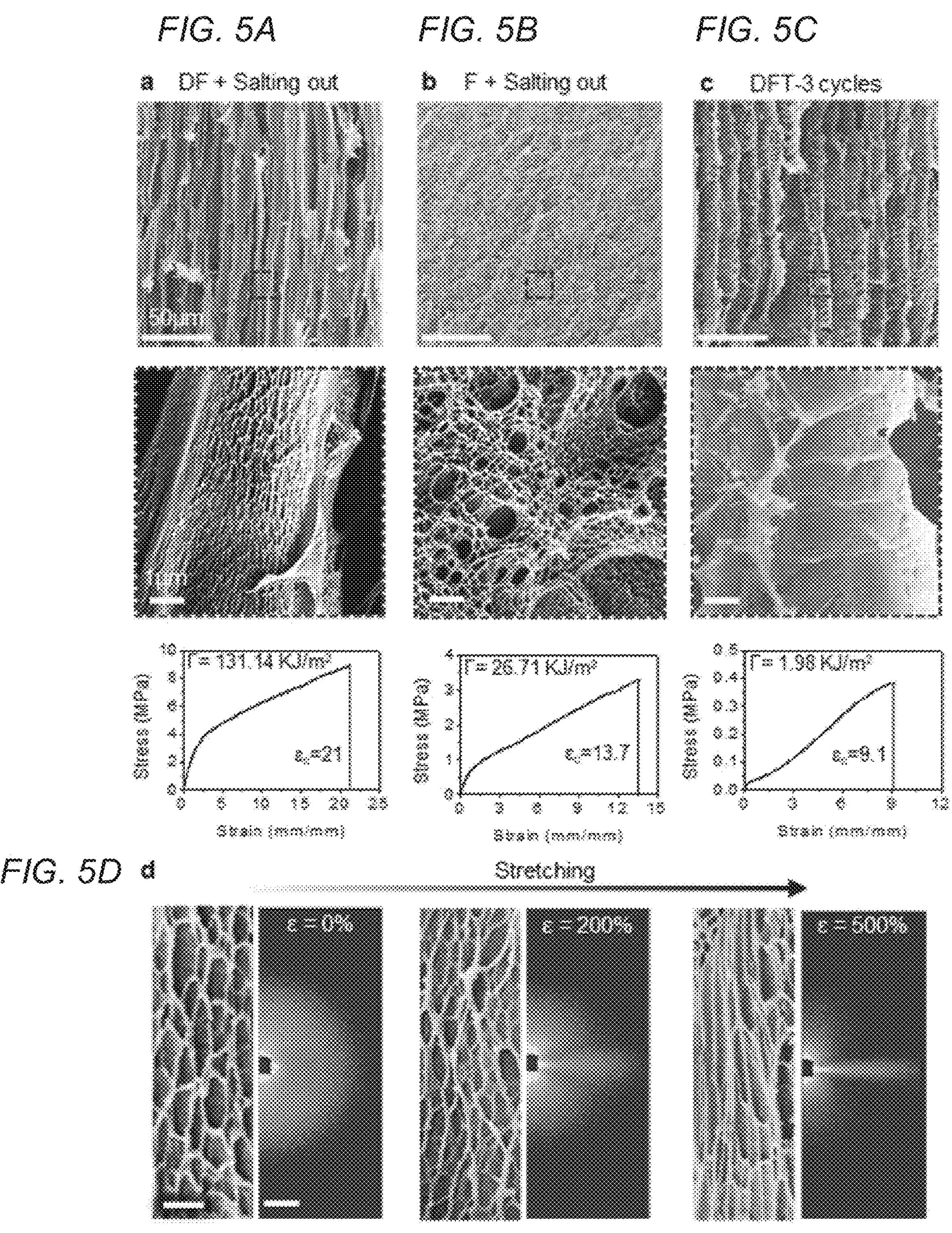

FIGS. 5A-5D illustrate hydrogel structure and mechanical properties relationship in accordance with an embodiment. FIG. 5A shows SEM images and mechanical properties of HA-5PVA hydrogel prepared by directional freezing and subsequent salting-out. FIG. 5B shows SEM images and mechanical properties of F+S-5PVA hydrogel prepared by uniform freezing and subsequent salting-out (i.e., non-directional compared to a). FIG. 5C shows SEM images and mechanical properties of DFT-5PVA hydrogel prepared by directional freezing and thawing for 3 cycles (i.e., no salting-out compared to a). Scale bar 50 μm for first row, and 1 μm for zoomed in SEM. FIG. 5D shows deformation of the mesh-like nanofibril network during stretching and the corresponding in-situ SAXS patterns. SEM scale bar 1 μm, and SAXS scale bar 0.025 $Å^{-1}$.

FIGS. 6A-6F illustrate micro- and nano-structures and stress-strain curves of PVA hydrogels fabricated by different methods and their corresponding fracture energies and critical strains in accordance with an embodiment. FIG. 6A shows “DF+Salting out” hydrogel prepared by directional freezing 5% PVA solution and salting out in 1.5 M sodium citrate solution for 24 hrs. FIG. 6B shows “F+Salting out” hydrogel prepared by non-directional freezing 5% PVA solution in fridge and salting out in 1.5 M sodium citrate solution for 24 hrs. FIG. 6C shows “DFT-3 cycle” hydrogel prepared by directional freezing and thawing 5% PVA solution for 3 cycles. FIG. 6D shows “FT-3 cycle” hydrogel prepared by non-directional freezing in fridge and thawing 5% PVA solution for 3 cycles. FIG. 6E shows “Chemical Crosslinking” hydrogel prepared by mixing 0.5% glutaraldehyde and 0.5% hydrochloric acid into 5% PVA solution for gelation. FIG. 6F shows “Salting-out” resulted in non-gelation. Only weak globules of loose and random nanofibrils made by directly adding 1.5M sodium citrate solution in 5% PVA solution.

Figure 7B:
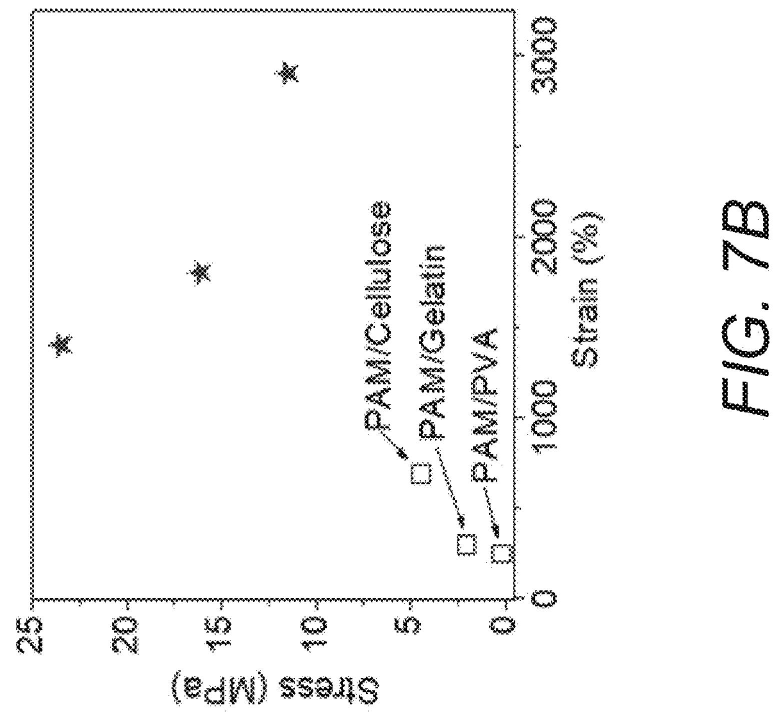
FIGS. 7A and 7B illustrate mechanical properties of HA-PVA hydrogel compared to PVA hydrogels prepared by ice templating alone or salting-out alone in accordance with an embodiment.
Figure 7A:
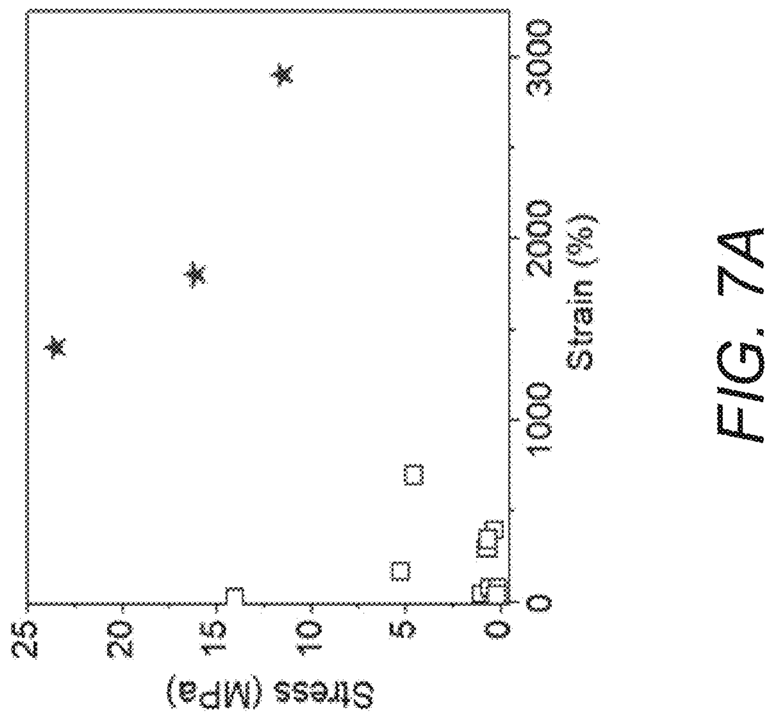

FIGS. 7A and 7B illustrate mechanical properties of HA-PVA hydrogel compared to PVA hydrogels prepared by ice templating alone or salting-out alone in accordance with an embodiment. The HA-PVA hydrogels are shown with stars, the ice-templated PVA hydrogels are shown in squares in FIG. 7A, the salting-out PVA hydrogels are shown in FIG. 7B as black squares.

Many embodiments provide that the three structural aspects from different length scales can be intertwined in the present material. Several embodiments compare the mechanical performances (critical stress $\sigma_c$, critical strain $\varepsilon_c$, and fracture energy Γ) of a series of PVA hydrogels with different combinations of those three structural aspects to identify their roles in the synergistic strengthening and toughening (FIGS. 5A-5C, FIG. 6) with a conventional chemically-crosslinked PVA hydrogel in which none of these structures exist (FIG. 6E). Forming only low-density crystalline domains (FIG. 6D) or aligned pore walls (FIG. 5C) by conventional freezing-thaw method do not show tremendous enhancement in mechanical performance, while the formation of nanofibril networks (FIG. 5B) can lead to a nearly two-order-of-magnitude increase in strength and a four-order-of-magnitude increase in toughness compared to the baseline in accordance with embodiments. The addition of anisotropic microstructure (via directional freezing) can further enhance the strength and toughness, but the increase is less pronounced (FIG. 5A). Many embodiments provide that the effect of nanofibril network can be particularly prominent for simultaneous high strength, toughness and stretchability.

Several embodiments provide that the formed nanofibrils may not be rigid but rather stretchable and deformed along with the hydrogel during stretching, as depicted in the SEM images of FIG. 5D. The nanofibrils can become increasingly aligned after stretching, as indicated by the stretch of SAXS pattern perpendicular to the loading direction (FIG. 5D). In some embodiments, the average nanofibril spacing decrease from about 350 nm to about 200 nm (FIG. 5D) when the strain increase from 0% to 500%. These stretchable nanofibrils can strengthen and toughen the hydrogel similar to rigid fiber reinforcements used in composite hydrogels, yet they are stretchable to preserve the stretchability of the hydrogel in accordance with embodiments, which can be a motivation for achieving simultaneous high strength, toughness and stretchability. From a fracture mechanics perspective, first, the formation of continuously connected network can facilitate the stress transfer between individual fibrils and prevent inter-fibril sliding, and thus, energy dissipation ahead of crack tip may not be confined to the vicinity of the crack tip but rather the entire network. The connection of nanofibrils via a continuous network can equivalently extend the length of these nanofibrils in accordance with embodiments, and longer polymer fibers along the stress direction may result in higher toughness. Second, the fracture energy of amorphous hydrogel can be evaluated as:

$$\Gamma \propto U_f N_f,$$

in which the $U_f$ is the energy to fracture a single polymer chain, and $N_f$ is the number of polymer chains fractured. Due to the strong aggregation and crystalline domains in the nanofibrils, the energy to fracture the same number of crystalized polymer chains may be much higher than that of the non-packed amorphous chains. The entire bulk hydrogel is a continuous micron-scale network comprising the above strong nanofibril networks, which may largely account for its high strength, toughness, and stretchability.

Figure 8:
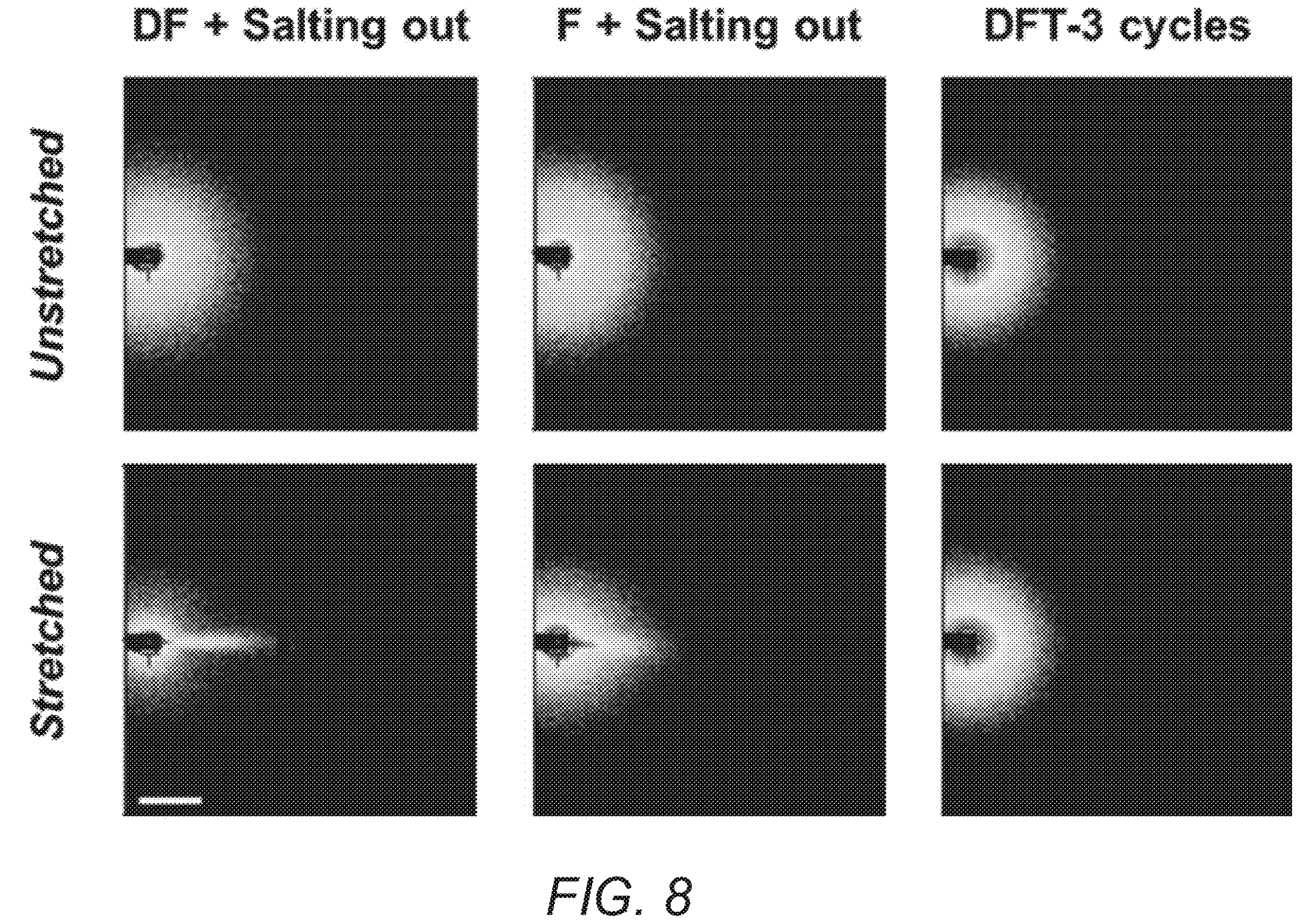
FIG. 8 illustrates SAXS pattern of PVA hydrogel with different combination of structures during stretching in accordance with an embodiment.

FIG. 8 illustrates SAXS pattern of PVA hydrogel with different combination of structures during stretching in accordance with an embodiment. The scattering is sensitive to structural less than about 100 nm. With directional freeze-thaw (DFT-s cycles), only microfibers are formed and thus does not show scattering pattern changes before and after stretching. With the salting out treatment, nano-fibrils are formed and thus causes scattering pattern changes during stretching. The "DF+salting out" samples show more fibril alignment than the "F+salting out" samples with the additional microscale alignment induced by directional freezing. Scale bar 0.05 $Å^{-1}$.

FIG. 9 illustrates a hierarchy and relationship of different strengthening and toughening roles played by each level of structures in accordance with an embodiment.

Figure 10:
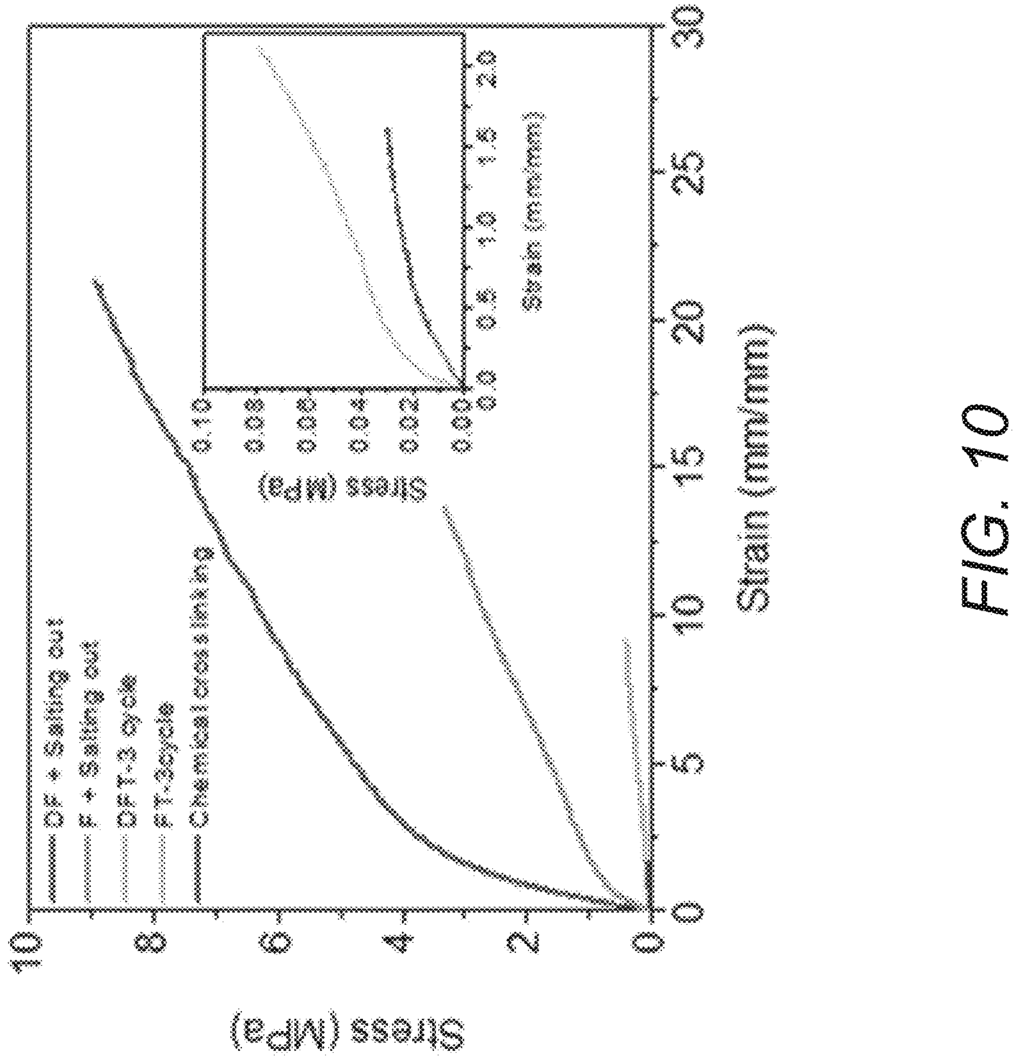
FIG. 10 illustrates stress-strain curves of PVA hydrogels prepared by different methods in accordance with an embodiment.

FIG. 10 illustrates stress-strain curves of PVA hydrogels prepared by different methods in accordance with an embodiment. FIG. 10 shows combined stress-strain curve till critical strain for the PVA hydrogels prepared by different methods in accordance with an embodiment.

Figure 11:
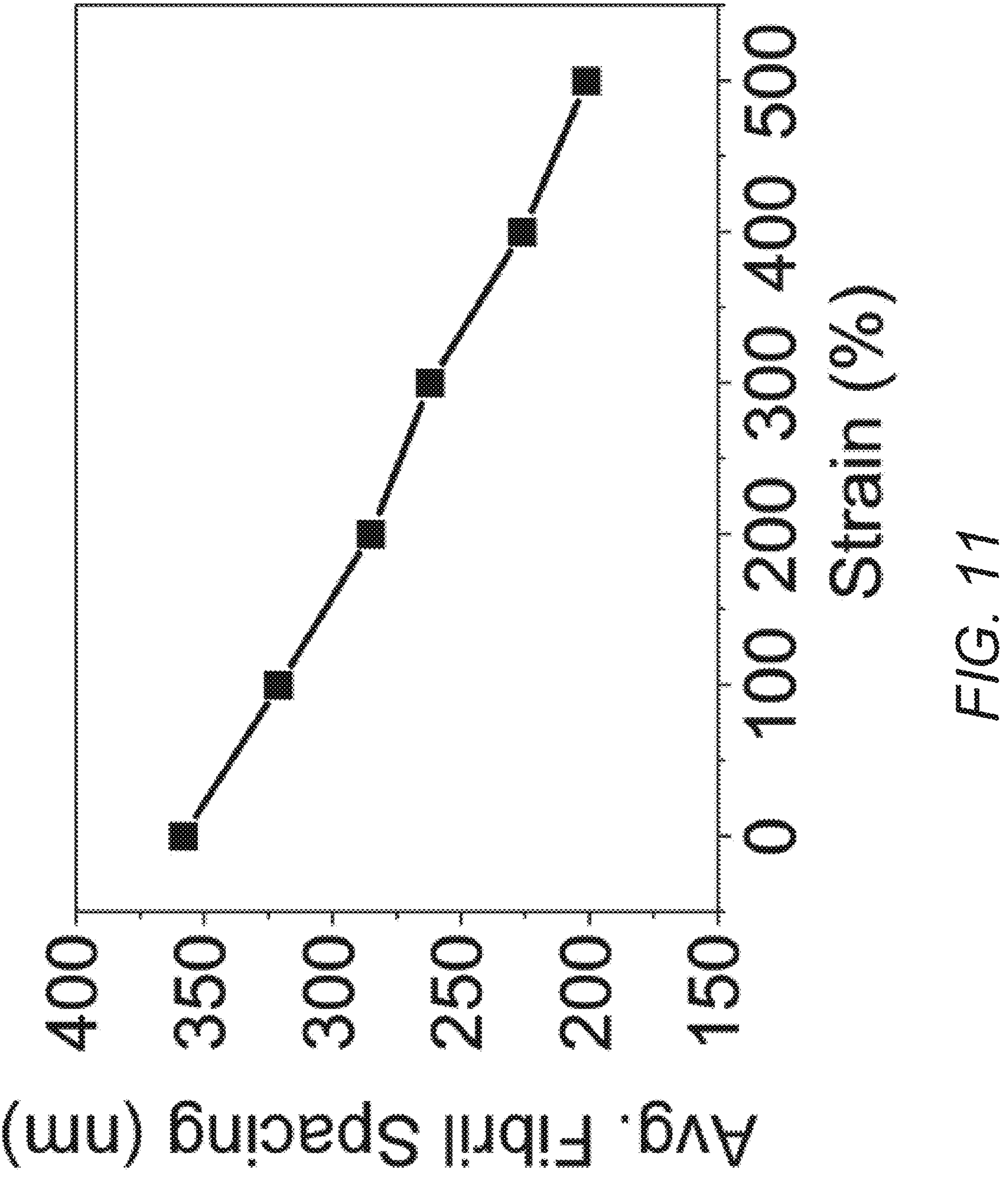
FIG. 11 illustrates a plot of average inter-nano-fibril spacing calculated from SAXS patterns versus strain in accordance with an embodiment.

FIG. 11 illustrates a plot of average inter-nano-fibril spacing calculated from SAXS patterns versus strain in accordance with an embodiment.

Figure 12:
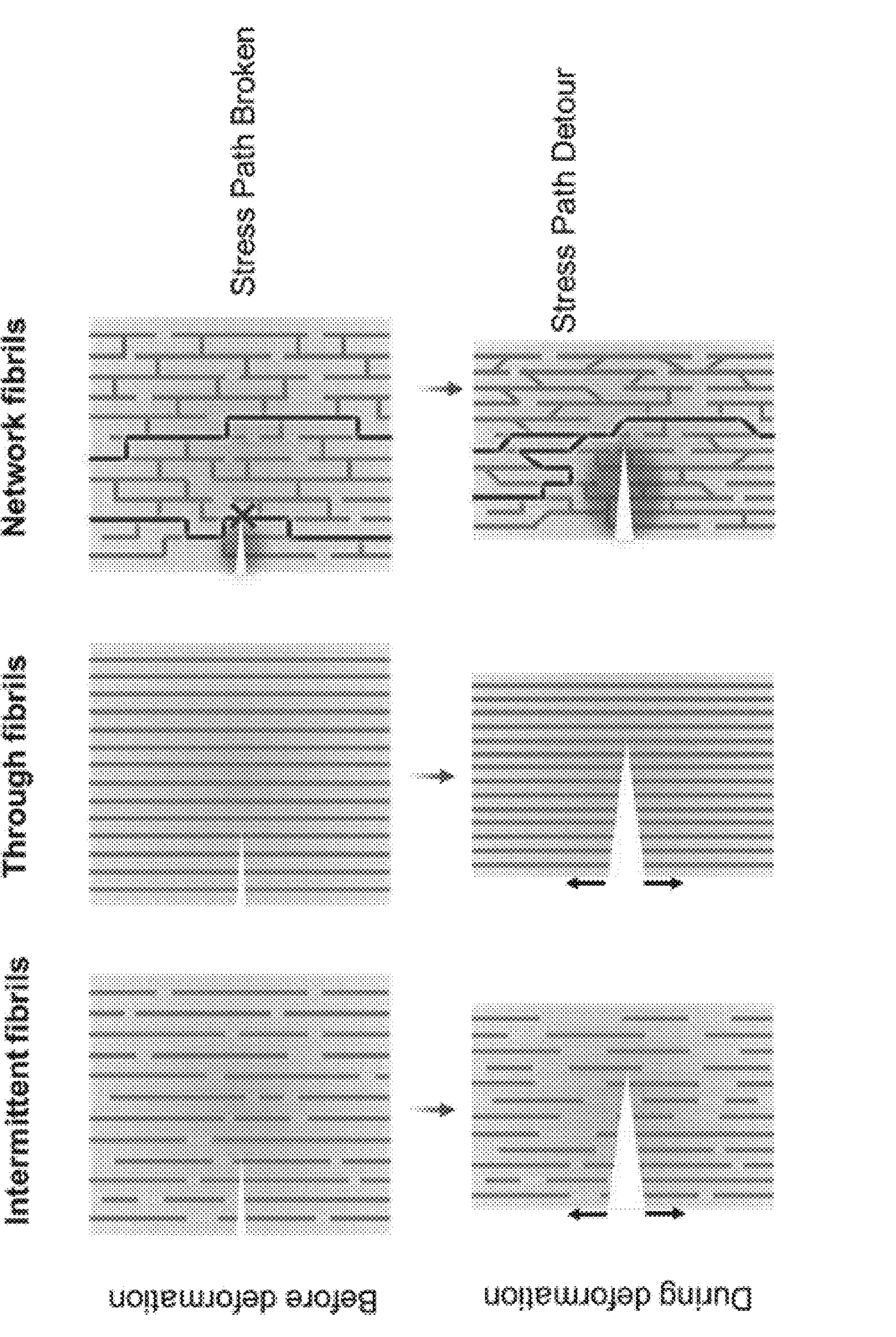
FIG. 12 illustrates nano-fibrils structure in anisotropic material in accordance with an embodiment.

FIG. 12 illustrates nano-fibrils structure in anisotropic material in accordance with an embodiment. The nano-fibrils (lines) have three assemblies of short fibrils (left), long fibrils (middle) and plaited networked fibrils (right) in the figure. The bottom row shows more compact fibril distance due to the reduction of free volume between fibrils after deformation.

Tunability and Fatigue Resistance

Several embodiments vary the densities of the aligned micropore walls and nanofibrils by changing the initial PVA concentration. The concentration of PVA can be varied from about 2% to about 20%. Many embodiments provide the PVA hydrogels can reach ultimate stresses from about 10 MPa to about 25 MPa; or about 23.5±2.7 MPa, or about 16.1±1.8 MPa, or about 11.5±1.4 MPa, after 24 hours of coalescence process. Several embodiments provide the PVA hydrogels can have ultimate strains from about 1200% to about 3500%; or about 1400±210%; or about 1800±330%; or about 2900±450% after 24 hours of coalescence process. For hydrogels with sufficient structural density and PVA concentration above about 5%, the ultimate stress may increase with PVA concentration, while the ultimate strain may decrease with increasing PVA concentration, and the overall toughness may increase with PVA concentration. In certain embodiments, the fracture energy can range from about 131±6 to about 170±8 $KJ/m^2$ as the concentration increase from about 5 to about 20 wt %, measured with a pre-cut crack perpendicular to the fibers. It should be noted that crack redirection can be observed for the HA-5PVA and HA-10PVA hydrogels during the fracture energy measurements, where the significant blunting of crack size may give these hydrogels a flaw-insensitive property. In some embodiments, the measured fracture energy can become relevant to the sample size. Under the same sample size, the fracture energy of HA-5PVA is about 5 to about 65 times higher than the hydrogel with nanofibrils only and the hydrogel with aligned porous microstructure only respectively, in which the measured fracture energy may be the true material property.

Many embodiments provide the reversibility and reusability of the HA-PVA hydrogels by conducting multiple loading-unloading tests. Mechanical hysteresis can be observed for all samples tested, which can indicate the presence of sacrificial bonds (primarily H-bonds here) that broke during deformation. In some embodiments, the maximum stress increases with more stretching cycles due to improved alignment induced by stretching. The hysteresis area do not show obvious decrease over 10 cycles, which indicate that the sacrificial H-bonds responsible for energy dissipation may be mostly reversible.

Several embodiments provide the fatigue resistance for structural hydrogels. The limit of fatigue resistance for hydrogels can be much lower than the fracture energy. To provide an accurate measurement, some embodiments use the relatively rigid HA-20PVA, in which crack redirection may be less likely to occur. The HA-20PVA hydrogels show excellent fatigue resistance with fatigue threshold of about 10.5±1.3 kJ/$m^2$. No crack propagation or redirection can be observed for over 30,000 cycles with such a high energy release rate on a HA-20PVA hydrogel in accordance with embodiments. The highly fatigue-resistant HA-PVA hydrogels well utilize the high-energy crystalline domains and networks of fibers as barriers that tendon and other robust natural materials employ.

Many embodiments provide that the HA-PVA hydrogels show high ultimate stress and strain, and the overall toughness is increased by about 4 to $10^3$ fold. The HA-PVA hydrogels demonstrate toughness from about 175±9 to 210±13 MJ/$m^3$ when there is no flaw, as the direct result of their combination of high strength and high ductility. At over 70% water contents in these hydrogels, the toughness values are well above water-free polymers like PDMS, Kevlar and synthetic rubber, even surpassing the toughness of natural tendon and spider silk.

Many embodiments employ the freezing-assisted salting-out methods to make gelatin and alginate hydrogels with enhanced mechanical properties. Regular 2% gelatin hydrogels are weak and fragile, while the HA-2Gelatin hydrogel in accordance with several embodiments could be stretched to about 4 MPa and about 550% strain, which may lead to an over 1000-time increase in toughness (from about 0.0075±0.0006 MJ/$m^3$ to about 11.9±1.7 MJ/$m^3$). In some embodiments, the HA-5Alginate, which is a pure alginate hydrogel without calcium crosslinking, show about 1.1±0.2 MPa ultimate strength and an over 20-time increase in toughness compared to calcium crosslinked alginate hydrogel. Building upon the combination of high strength, stretchability and fatigue resistance of the HA-PVA hydrogels, certain embodiments provide their facile material customizability for additional properties (e.g., electrical conductivity) to benefit the application of other fields. Several embodiments infiltrate the HA-PVA hydrogel with conducting polymer including (but not limited to) poly-pyrrole (PPy), the hydrogel can be functionalized with electrical conductivity without retarding its strength nor toughness.

Figures 13A, 13B, 13C, 13D, 13E, 13F:
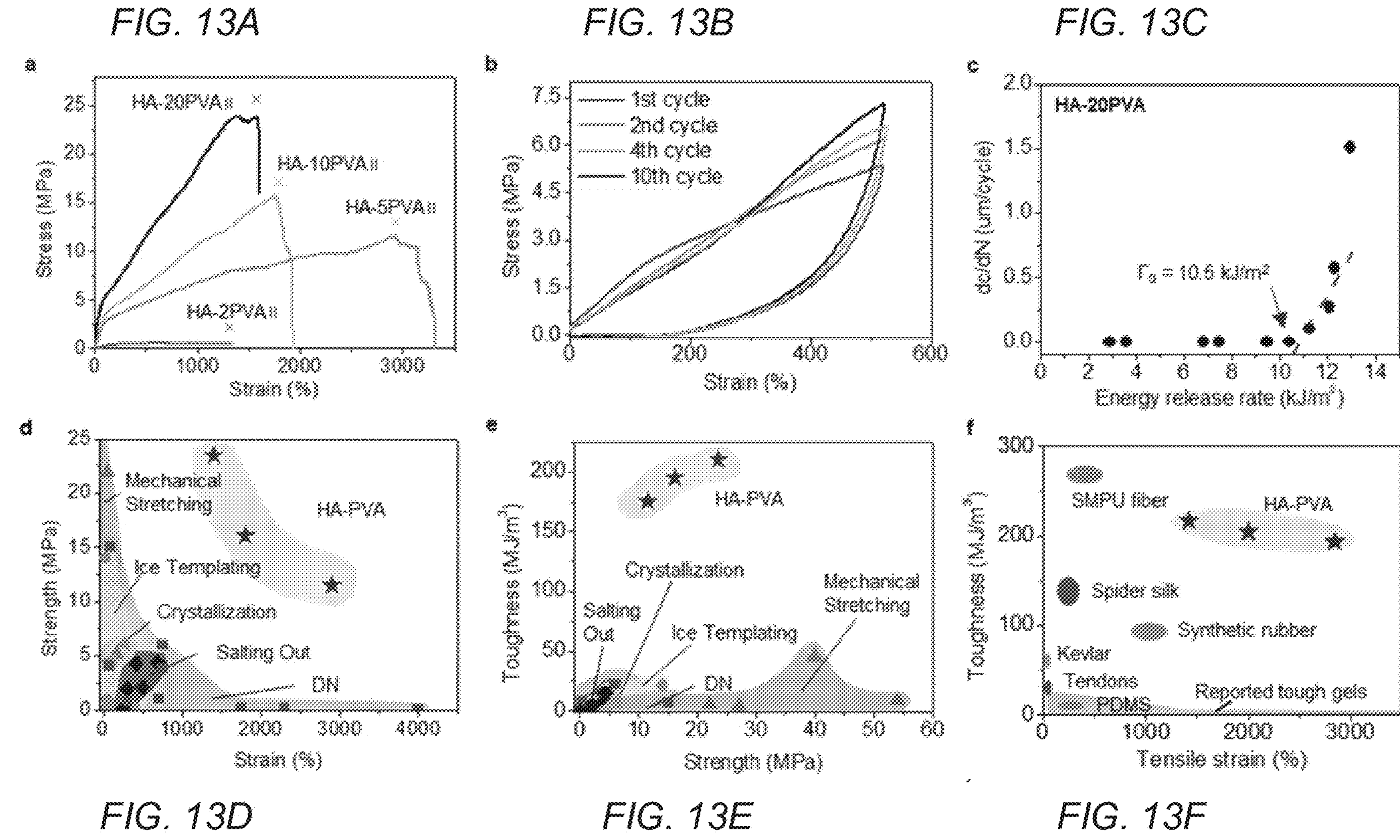

FIGS. 13A-13H illustrate tunable mechanical properties and generality of ice-templating assisted salting-out hydrogels in accordance with an embodiment. FIG. 13A shows stress-strain curves of HA-2PVA||, 5PVA||, 10PVA||, and 20PVA|| hydrogels after 24 hours of salting-out in 1.5 M sodium citrate. FIG. 13B shows cyclic loading of HA-5PVA|| hydrogel to about 500% strain. FIG. 13C shows plot of crack propagation per loading cycle under increasing energy release rate. The energy release rate can be controlled by corresponding maximum strain. FIGS. 13D-13F show Ashby diagrams of D, ultimate tensile strength vs. ultimate tensile strain, E, toughness vs. ultimate tensile strength, and F, toughness vs. ultimate tensile strain of HA-PVA hydrogels (shown in stars) and other tough hydrogels and other tough materials. FIG. 13G shows photo of HA-2Gelatin hydrogel prepared by the same method as for HA-PVA and the stress-strain curve of HA-2Gelatin compared with regular 2% gelatin hydrogel. Scale bar 5 mm. FIG. 13H shows PPy-infiltrated HA-5PVA|| hydrogel being stretched. Scale bar 5 mm.

Figure 14:
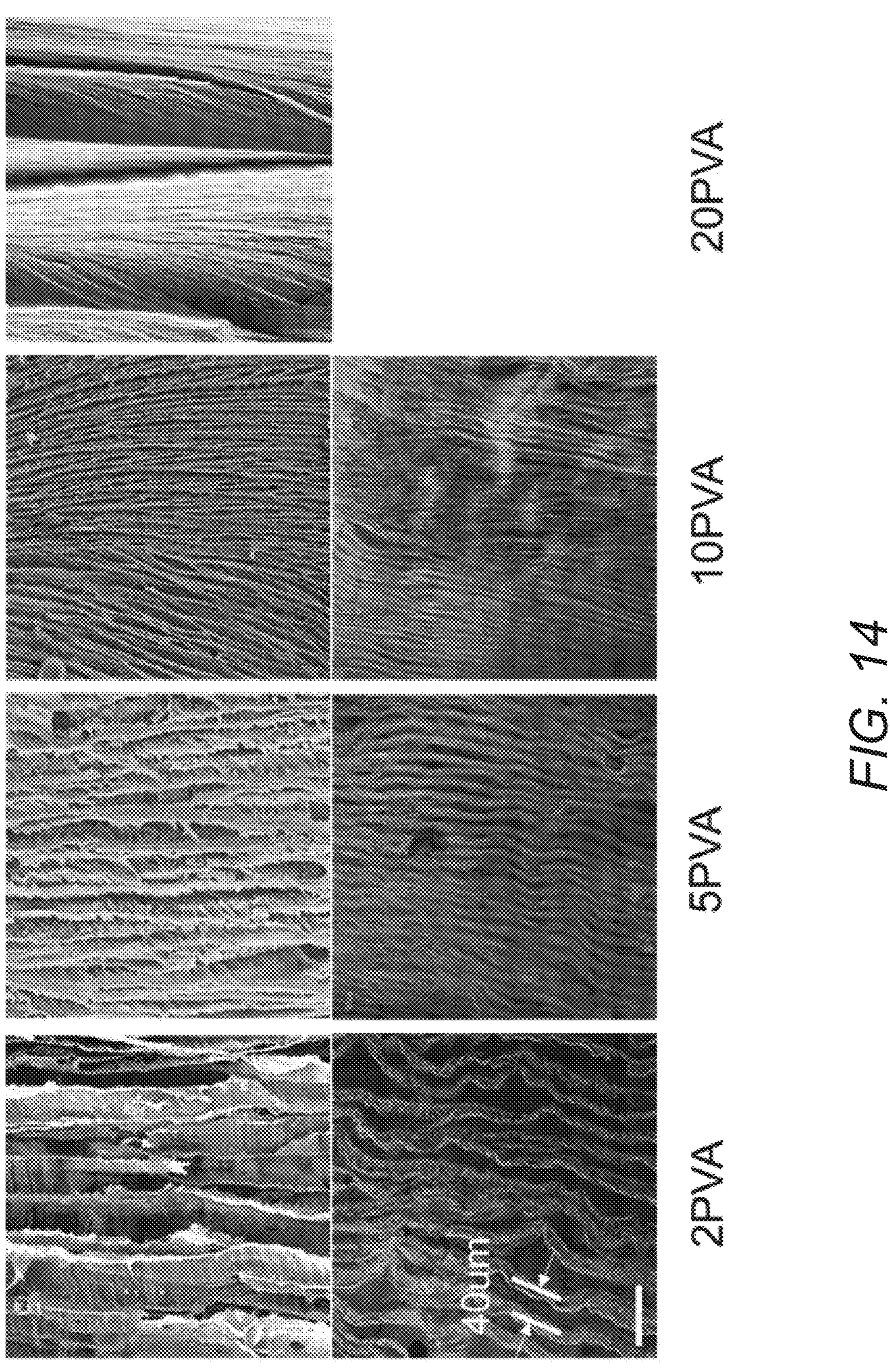
FIG. 14 illustrates images of HA-PVA hydrogels with various PVA concentration in accordance with an embodiment.

FIG. 14 illustrates images of HA-PVA hydrogels with various PVA concentration in accordance with an embodiment. SEM micrographs (top row) and corresponding confocal images (bottom row) of HA-2PVA ($1^{st}$ Column), HA-5PVA ($2^{nd}$ column), HA-10PVA ($3^{rd}$ column), and HA-20PVA ($4^{th}$ column). The confocal image for HA-20PVA is not present because the strong scattering cause by dense structures prevented us from obtaining a clear confocal image. Scale bar 50 μm.

Figure 15B:
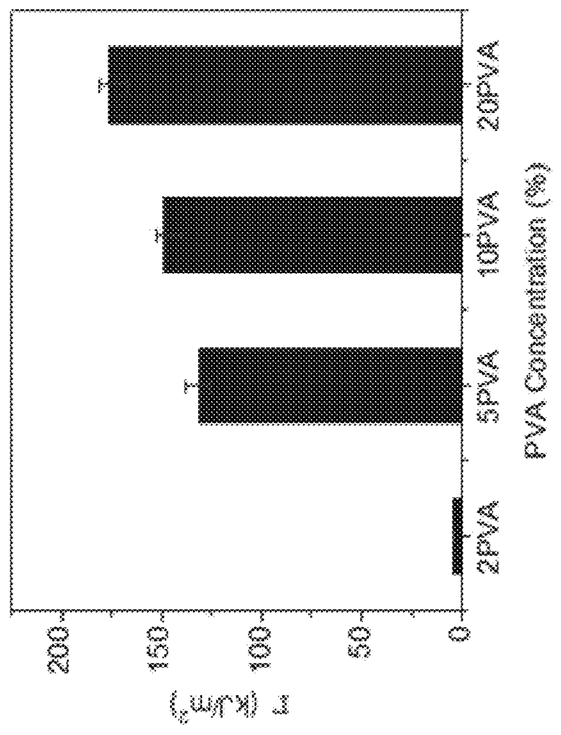
FIGS. 15A-15B illustrate water content and fracture energy of the HA-PVA hydrogels in accordance with an embodiment.
Figure 15A:
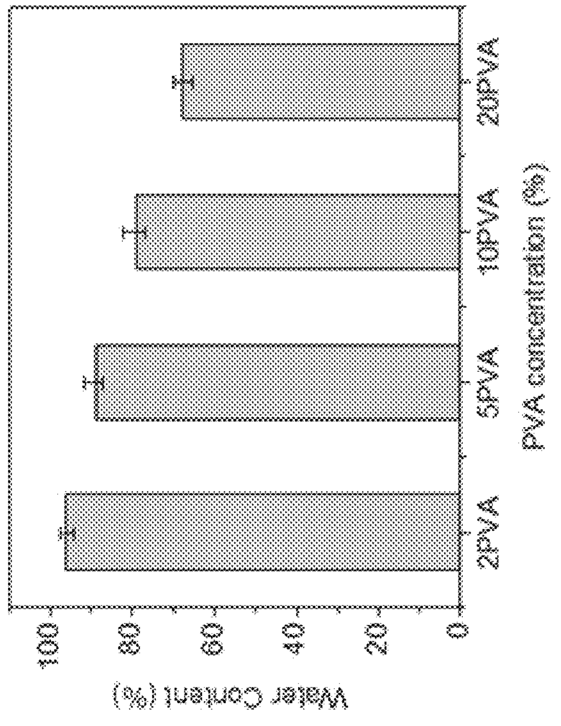

FIGS. 15A-15B illustrate water content and fracture energy of the HA-PVA hydrogels in accordance with an embodiment. FIG. 15A shows water content of HA-xPVA hydrogel, x=2, 5, 10, and 20. The error bar is obtained from 5 measured samples. FIG. 15B shows fracture energy of HA-xPVA hydrogel, x=2, 5, 10, and 20, measured by pure shear tests. The error bar is obtained from 5 measured samples.

Figures 16A, 16B, 16C:
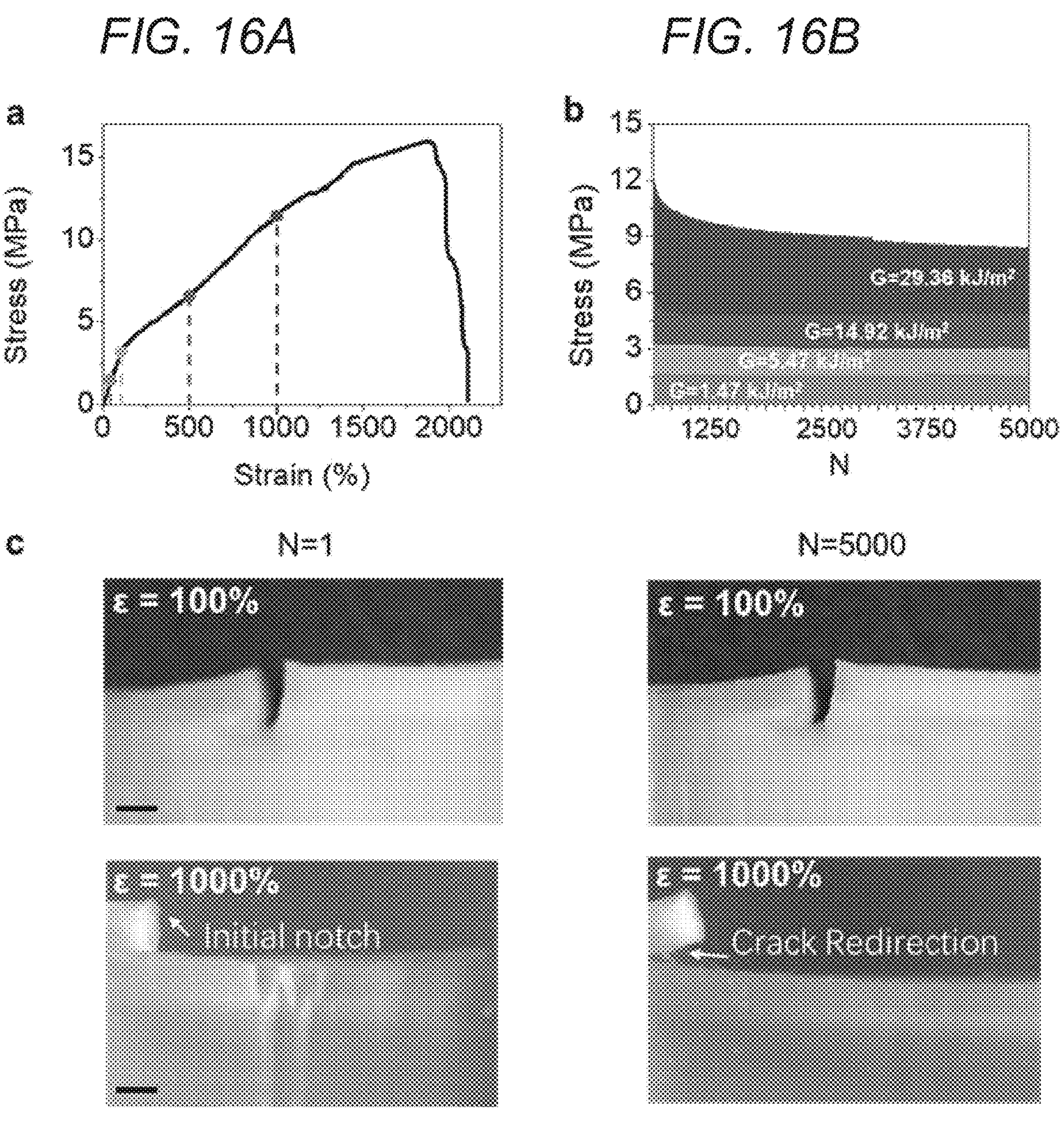
FIGS. 16A-16C illustrate fatigue testing of the HA-10PVA|| hydrogel in accordance with an embodiment.

FIGS. 16A-16C illustrate fatigue testing of the HA-10PVA|| hydrogel in accordance with an embodiment. FIG. 16A shows loading stress-strain curve of the fatigue cycles. FIG. 16B shows peak stress, and energy release rate G during the cyclic testing when loading to 50%, 100%, 500% and 1000% strain for 5000 cycles. FIG. 16C shows micro-graph of crack before and after 5000 cycles, scale bar 1 mm.

Figure 17:
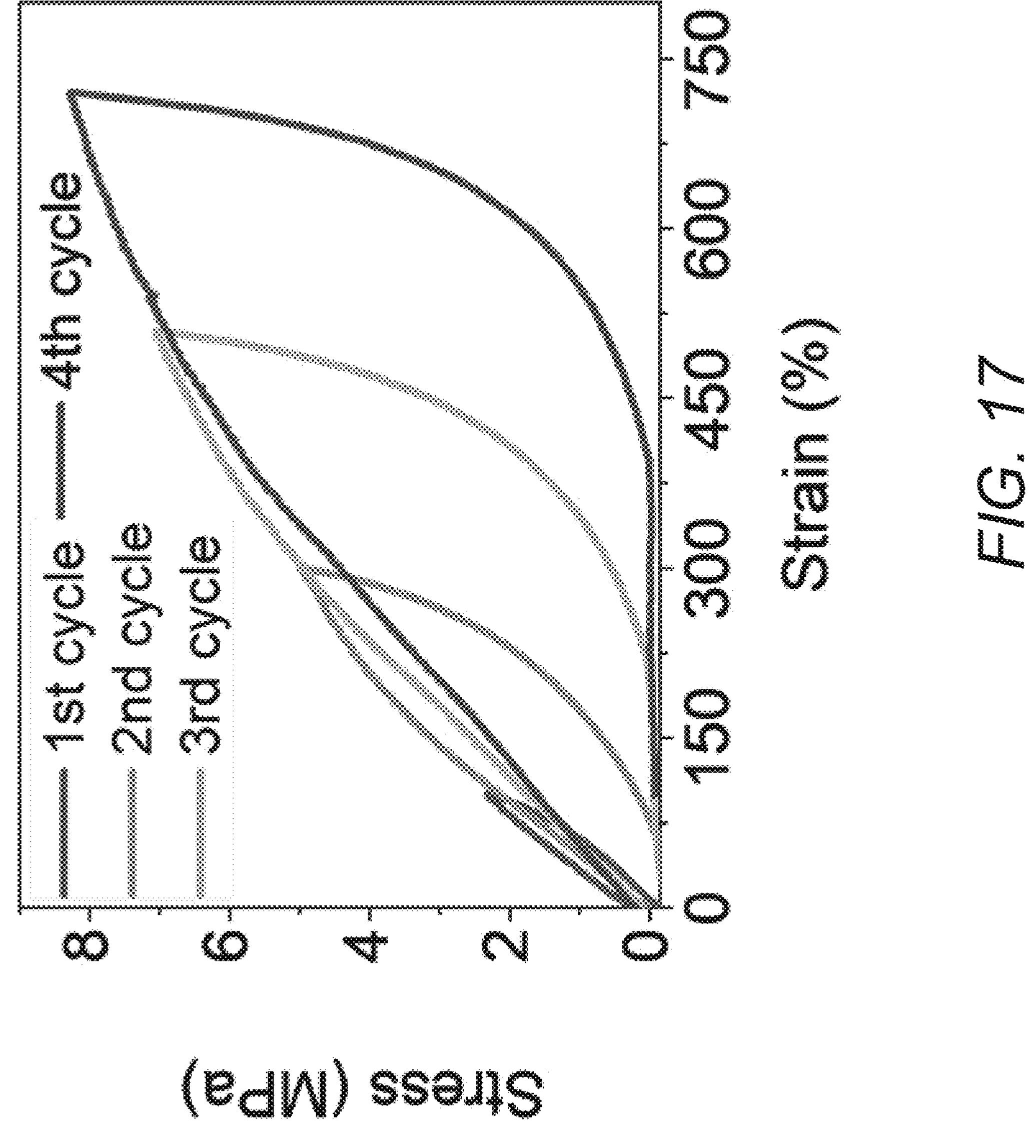
FIG. 17 illustrates cyclically loading the hydrogel with an incremental strain in accordance with an embodiment.

FIG. 17 illustrates cyclically loading the hydrogel with an incremental strain in accordance with an embodiment. FIG. 17 shows a slight decrease in modulus after each cycle which indicates that small amount of semi-crystalline domain is unfolded with the increasing strain. The yield stress, however, increases after each cycle, as it became incrementally difficult to activate plastic deformation by further consumption of the semi-crystalline domains when all structures are better aligned during stretching.

Figures 18A, 18B:
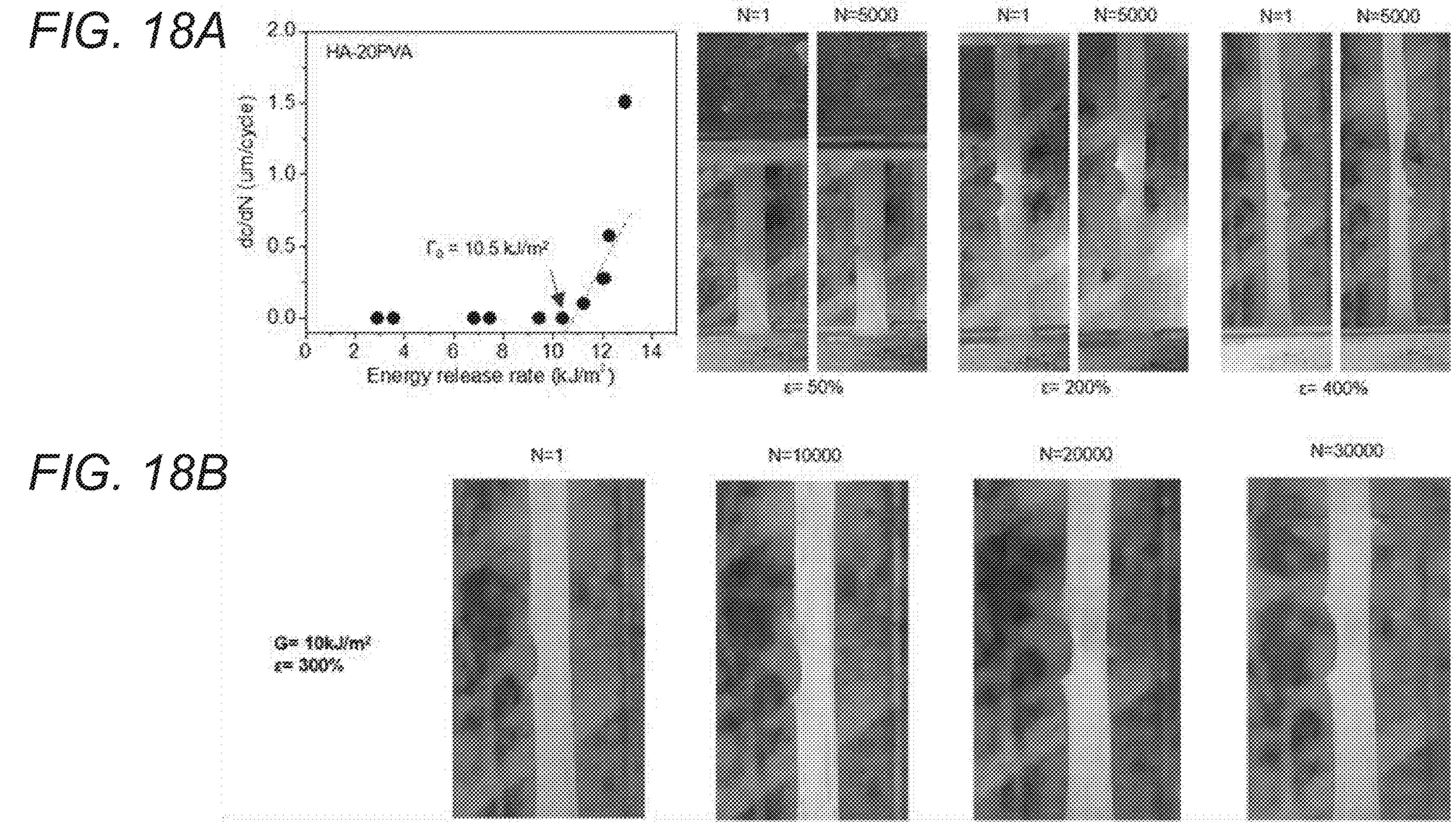
FIGS. 18A-18B illustrate fatigue test of HA-20PVA hydrogels in accordance with an embodiment.

FIGS. 18A-18B illustrate fatigue test of HA-20PVA hydrogels in accordance with an embodiment. FIG. 18A shows fatigue threshold of HA-20PVA. When loading above the threshold energy release rate (ε=400%), the crack slowly propagates. FIG. 18B shows validation of fatigue threshold with an energy release rate slightly lower than the fatigue threshold. No crack propagation or failure is observed for 30,000 loading cycles.

Figure 19A:
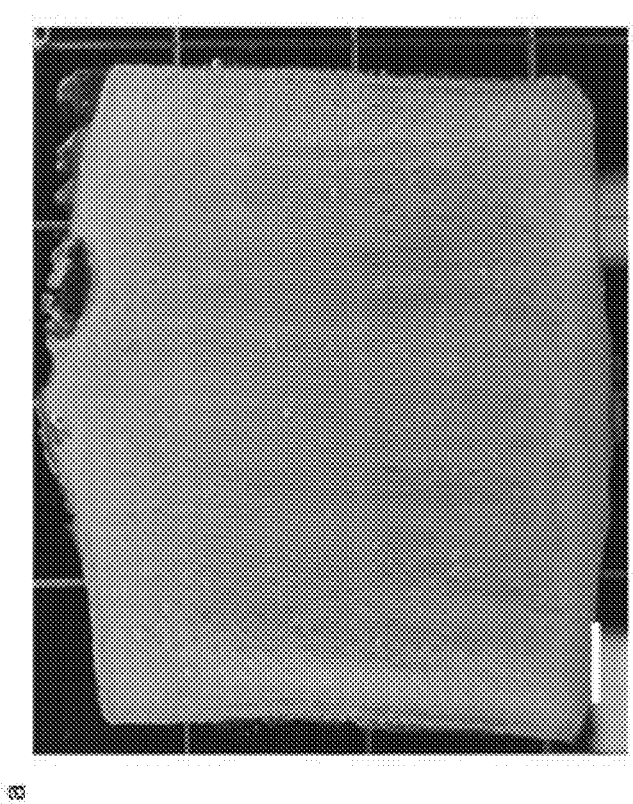
FIGS. 19A-19B illustrate HA-Alginate hydrogels compared with calcium-alginate hydrogels in accordance with an embodiment.
Figure 19B:
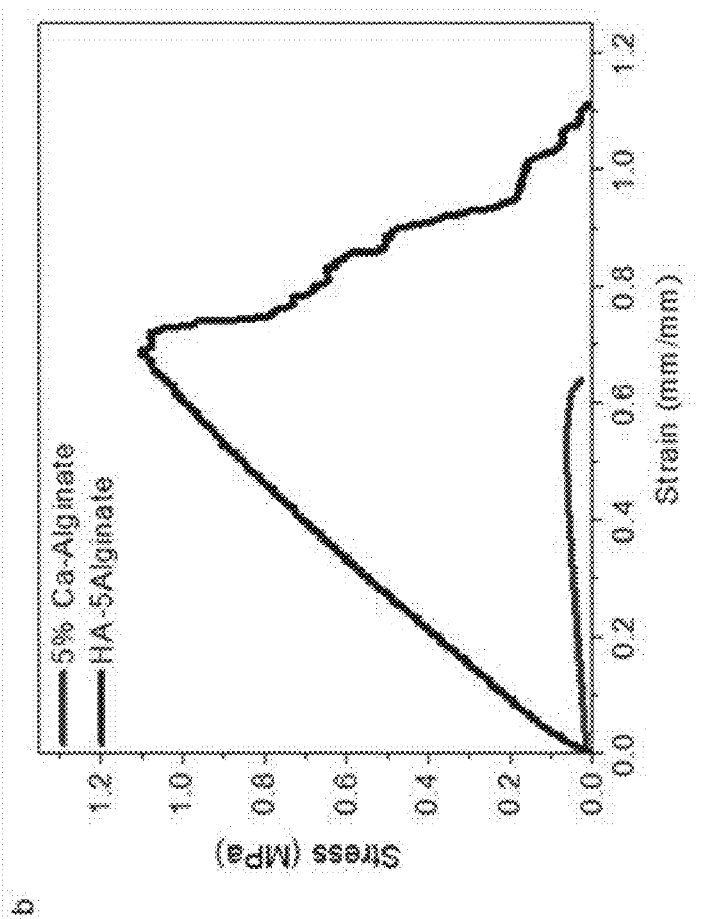

FIGS. 19A-19B illustrate HA-Alginate hydrogels compared with calcium-alginate hydrogels in accordance with an embodiment. FIG. 19A shows picture of HA-5Alginate hydrogel. FIG. 19B shows the tensile stress-strain curve of HA-5Alginate hydrogel compared to regular calcium-alginate hydrogel. Scale bar 5 mm.

Figures 20A, 20B, 20C, 20D, 20E:
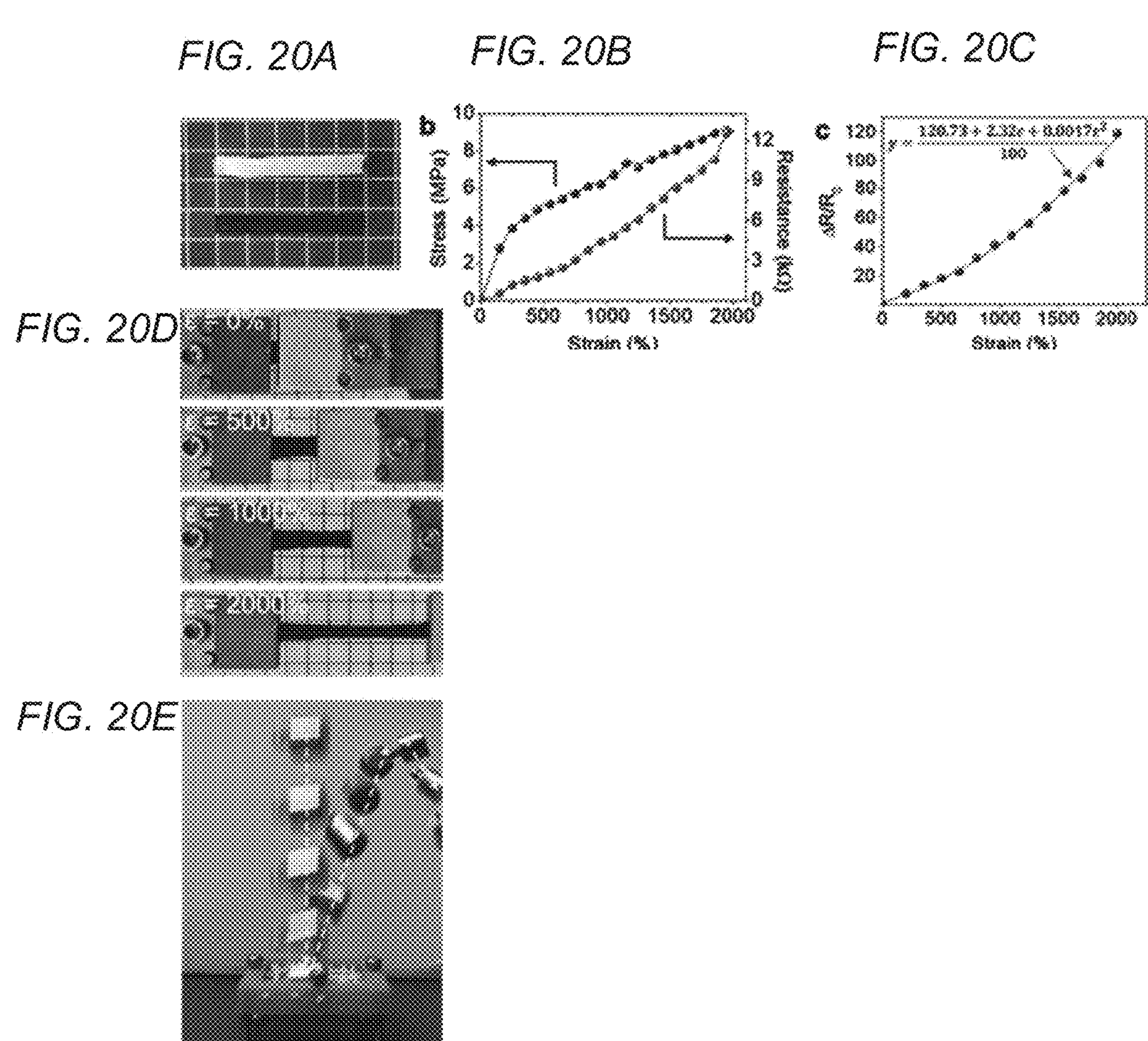
Figures 20F, 20G, 20H, 20I, 20J:
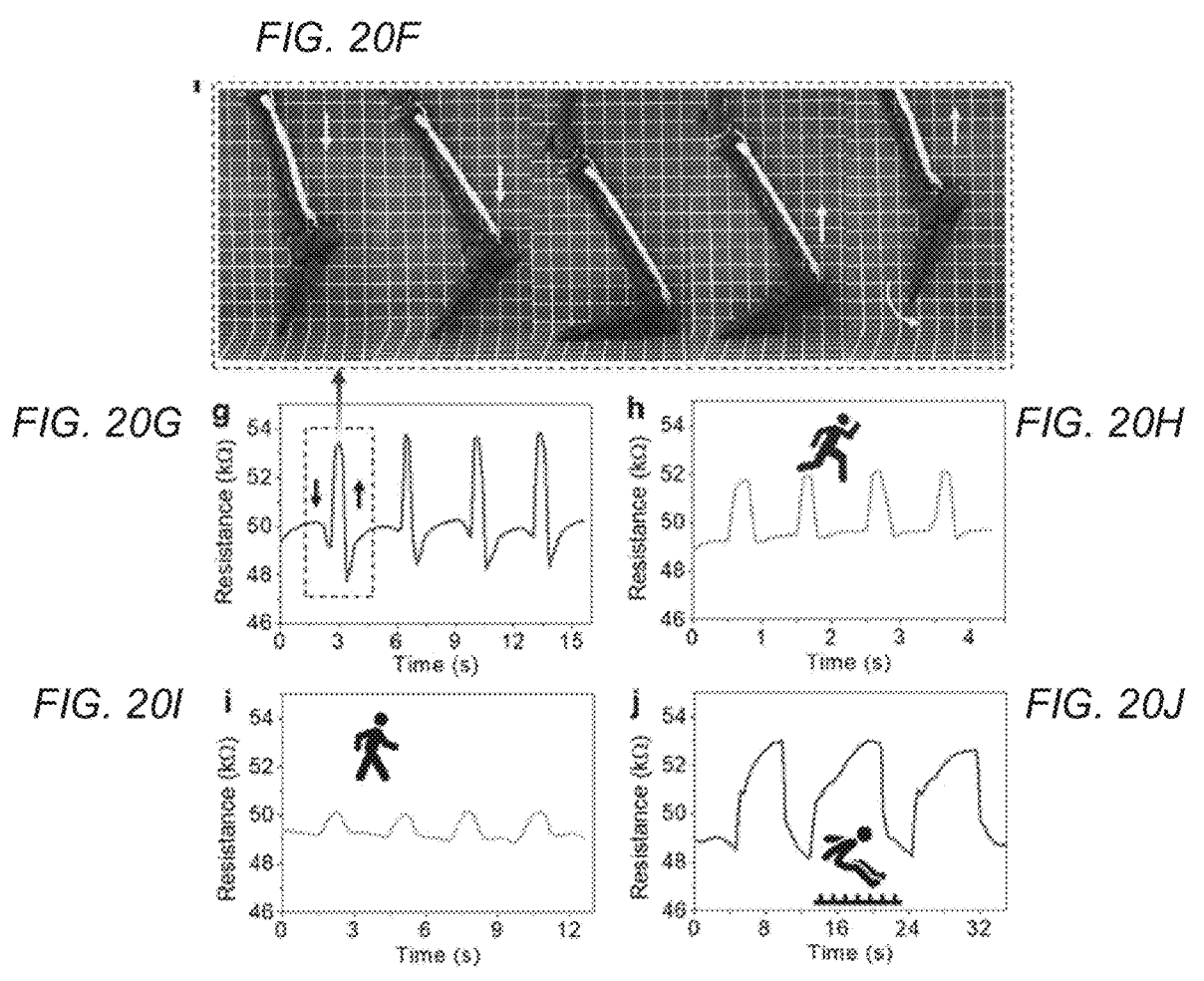

FIGS. 20A-20J illustrate HA-PVA hydrogel as strain sensor in accordance with an embodiment. FIG. 20A shows HA-5PVA|| hydrogel before (top) and after (bottom) infiltration of conduction polymer poly(pyrrole) (PPy). FIG. 20B shows stress and resistance change versus strain for PPy-infiltrated HA-5PVA|| hydrogel. FIG. 20C shows plot of relative resistance change versus strain for PPy-infiltrated HA-5PVA|| hydrogel. The equation used for fitting represents a parabolic equation y=Aε2+Bε+C, where y is the relative resistance changes and ε is the tensile strain. FIG. 20D shows PPy-infiltrated HA-5PVA|| hydrogel being stretched. FIG. 20E shows drop test of a load-bearing net woven by HA-5PVA|| hydrogel. FIG. 20F shows HA-5PVA|| hydrogel as artificial tendon, size of grid is 5 mm×5 mm. FIGS. 20G-20H show different resistance signals obtained from the artificial tendon during re-hop, running, walking, and leaping motions.

Methods of Fabricating PVA Hydrogel

Many embodiments provide that poly(vinyl alcohol) (PVA) can be used as the solute and water as the solvent. In some embodiments, 2-20 wt % PVA (molecular weight 89,000-98,000) solutions can be prepared by dissolving corresponding weights of PVA powder in deionized water under vigorous stirring and heating (about 70° C.). After degassing by sonication for about 1 h, a clear solution can be obtained. Several embodiments implement directional freezing steps: the PVA solution is poured into a container with peripheral thermal insulation and a glass bottom for good thermal conduction. The container is lowered into the constant temperature bath of about −80° C. at an immersion rate of 1 mm $min^{-1}$, until completely frozen. Some embodiments implement non-directional freezing steps: the PVA solution is poured into a container and kept in a freezer of about −23° C. until completely frozen. A number of embodiments test the effect of various salts on PVA during the salting out step. Different salts can obtain a broad tunable range of gel microstructures and mechanical properties. In some embodiments, sodium citrate shows a good salting-out ability and a high modulus. Thus, a saturated sodium citrate solution (about 1.5 M under room temperature from about 20° C. to about 25° C.) can be chosen for treating frozen PVA. The directionally frozen PVA solution or non-directionally frozen PVA is then immersed into a 1.5 M sodium salt solution for gelation. Some embodiments provide that with directional freezing, the as-prepared hydrogel can appear highly fibrous with a tendon-like shimmer, observable by the naked-eye. On micrometer scale, the hydrogel has aligned pore walls interconnected in the shape of honeycomb in accordance with some embodiments. On the nanometer scale, mesh-like nanofibrils can develop within the aligned pore walls in accordance with several embodiments. At the sub-nanometer scale, PVA chains can be aggregated and crystallized by H-bonds into the nanofibrils. Many embodiments provide that with non-directional freezing, the as-prepared hydrogel can appear as an opaque material. On micrometer scale, the hydrogel has isotropic pores in accordance with some embodiments. On nanometer scale, mesh-like nanofibrils developed within the isotropic pore walls in accordance with certain embodiments. At the sub-nanometer scale, PVA chains were aggregated and crystallized by H-bonds into the nanofibrils.

The PVA hydrogel fabricated in accordance with many embodiments exhibit strength up to about 23.5 MPa, strain up to about 2900%, toughness up to about 210 MJ/$m^3$, and fatigue limit of about 10.5 kJ/$m^2$. By changing the type of salt used in salting out step, the strength could be within a range of 50 kPa to 23.5 MPa, strain within range of 300% to 2900%, toughness within range of 0.017 MJ/$m^3$ to 210 MJ/$m^3$.

EXEMPLARY EMBODIMENTS

Although specific embodiments of compositions, methods and process are discussed in the following sections it will be understood that these embodiments are provided as exemplary and are not intended to be limiting.

Materials and Methods

Preparation of PVA solution. 2 wt %, 5 wt %, 10 wt % and 20 wt % PVA solution is prepared by dissolving PVA powder in DI water under vigorous stirring and heating (70° C.). After degassing by sonication for 1 hr, a clear solution is obtained.

Preparation of salt solution. 1.5 M concentration of sodium citrate solution is prepared by dissolving anhydrous sodium citrate powder in DI water. After sonication for 10 mins, a clear solution is obtained.

Fabrication of hydrogel. An ethanol bath of −80° C. is used as the immersion bath for ice templating. The temperature is maintained using an EYELA-PSL1810 constant temperature bath. For the typical fabrication of the hierarchically aligned PVA hydrogels, 2-20% PVA aqueous precursor is poured into an acrylic container with peripheral thermal insulation, the bottom of the container is glass for good thermal conduction. The container is lowered into the ethanol bath at an immersion rate of 1 mm/min. The directionally frozen PVA solution is then immersed into a 1.5M sodium salt solution for gelation up to 4 days.

Tensile testing. Hydrogel are cut into dog-bone shapes specimens with gauge width of 2 mm for regular tensile testing. The thickness of individual specimens is measured with a caliper, typically around 2 mm. The HA-xPVA|| specimens have microstructure parallel to the loading direction and the HA-xPVA ⊥ specimens have microstructure perpendicular to the loading direction. The force-displacement data are obtained using a Cellscale Univert mechanical tester with 50N loading cell installed. The stress-strain curves are obtained by division of measured force by initial gauge cross-section area and division of measured displacement by initial clamp distance. Five hydrogel specimens are tested for each condition.

Pure shear tests. Hydrogels are cut into rectangular specimens with height of 40 mm, width of 20 mm for fracture tests. The thickness of individual specimens is measured with a caliper. Initial clamp distance of 1 or 2 mm is used for every pair of specimens. All specimens have microstructure alignment parallel to the height direction. For pure shear tests, two identical sample (one notched, one unnotched) are loaded under the sample setup as a pair to obtain one fracture energy value. Briefly, for the notched samples, an initial straight cut with length of 8 mm are made from the middle of the long edge toward the center of the hydrogel and the specimen is loaded at strain rate of 10%/s. The critical strain ($\varepsilon_c$) for unstable propagation of the crack is obtained from the strain at maximum stress. The pairing notched specimens are subsequently loaded until $\varepsilon=\varepsilon_c$. The fracture energy value is obtained by multiplying the area under the stress-strain curve of unnotched specimens with the initial clamp distance (H) as $$\Gamma = H\int_0^{\varepsilon_c}\sigma d\varepsilon.$$

Fatigue tests. To examine the fatigue resistance of our hydrogel, the single-notch method is used. The fatigue testing is performed in a water bath to prevent dehydration of the hydrogel. Cyclic tensile tests are conducted using notched samples with initial crack length ($c_0$) smaller than ⅕ of the width ($L_0$) of the sample. The sample width $L_0$ was much smaller than the sample height $H_0$. The cyclic force-displacement curves are obtained using the Cellscale Univert mechanical tester A digital camera is used to monitor the crack propagation of the hydrogel. All stretch cycles are conducted continuously without relaxation time. The energy release rate (G) is obtained using, $$G=2kcW,$$

Where k is a varying function with strain and is empirically determined to be $k=3/\sqrt{\varepsilon+1}$, c is the crack length and W is the strain energy density of an unnotched sample with same dimension and stretched to the same strain (ε). It should be noted that when repeatedly stretching to high strains, the stress-strain curve slowly deviates from the initial loading and unloading curve as a result of plastic deformation, W is integrated from the loading part where the loading and unloading curves become stable and stopped changing.

SEM characterization. For characterization of the micro- and nano-structure of the hierarchically aligned hydrogels, all hydrogel samples are immersed in DI water for 24 hours before freeze drying using a Labconco FreeZone freeze drier. The freeze-dried hydrogels are cut along the aligned direction to expose the inside and sputtered with gold before carrying out imaging using a ZEISS Supra 40VP SEM.

Confocal characterization. Confocal microscopy is carried out using a Leica DMi8 confocal microscopy. 0.1 wt % fluorescein sodium salt is added into the PVA precursor as fluorescent marker and florescent-HA-PVA hydrogels are made with the same subsequent fabrication procedures as regular HA-PVA hydrogels. The 488 nm laser channel is used to excite the fluorescent marker. The hydrogel is assigned pseudo color of green.

X-ray scattering characterization. The HA-PVA hydrogels are cut into 1 cm by 4 cm rectangles and washed with DI water for before testing. The beamline station used is APS 8-ID-E (Argonne National Laboratory) equipped with Pilatus 1M detector. A customized linear stretcher is used to hold the samples and stretch on demand for in-situ X-ray scattering measurements. A MATLAB toolbox "GIXSGUI" is used for further editing and analysis of the scattering patterns.

Water content measurement. The water content of the HA-PVA hydrogels can be measured by comparing weight before and after freeze-drying. Excess surface water is wiped away from the hydrogel surface and the hydrogel specimens are instantly frozen using liquid nitrogen followed by freeze-drying. Weight before (mw) and after freeze drying (md) is measured with a balance. The water content is obtained by (mw−md)/mw*100%.

Crystallinity content measurement. Before freeze-drying the hydrogels for DSC measurements, excess chemical cross-links induced by glutaraldehyde to fix the amorphous PVA polymer chains to minimize the further formation of crystalline domains during the air-drying process was used. The water content of the hydrogel $f_{water}$ could be obtained by comparing the weight before and after freeze-drying. In a typical DSC measurement, the total mass of the freeze-dried sample m is weighted. The sample is thereafter placed in a Tzero pan and heated up from 50° C. to 250° C. at the rate of 20° C./min under a nitrogen atmosphere with flow rate of 30 mL/min. The curve of heat flow shows another narrow peak ranging from 200° C. to 250° C., which corresponds to the melting of the crystalline domains. The integration of the endothermic transition ranging from 200° C. to 250° C. gives the enthalpy for melting the crystalline domains per unit mass of the dry. Therefore, the mass of the crystalline domains $m_{crystalline}$ can be calculated as $m_{crystalline}=m*H_{crystalline}/H^{0}_{crystalline}$, where $H^{0}_{crystalline}=138.6$ J/g is the enthalpy of fusion of 100 wt. % crystalline PVA measured at the equilibrium melting point $T^{0}_{m}$[50]. Therefore, the crystallinity in the dry sample $X_{dry}$ can be calculated as $X_{dry}=m_{crystalline}/m$. With measured water content from freeze drying, the crystallinity in the swollen state can be calculated as $X_{swollen}=X_{dry}*(1-f_{water})$.

Example 1: Bioinspiration for Creatin Networked Structures for Toughening Hydrogels Tendons are especially strong and tough among natural load bearing materials, much more so than wood with similar hierarchical anisotropic structure. Apart from the different intrinsic mechanical properties possessed by the different molecules that formed these materials, the multiscale structure play an important role in increasing ductility while maintaining high strength in tendons. The dense fibrotic structure provide strengthening. Crack deflection, fiber bridging, fibril sliding, and molecular uncoiling provide toughening originating from macro-, micro-, nano- and molecular length scales.

Figure 22:
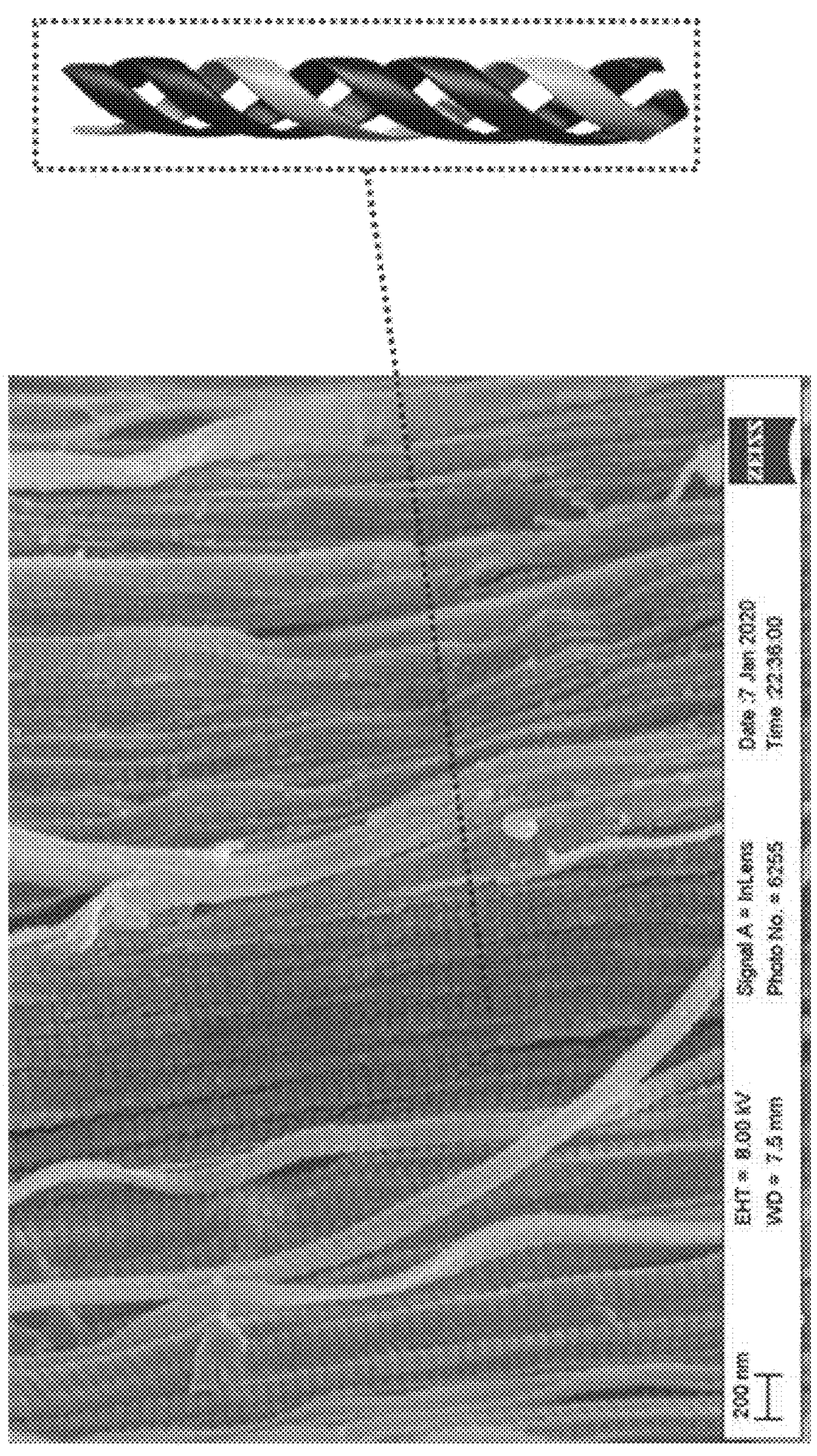
FIG. 22 illustrates SEM image of natural tendon in accordance with an embodiment.

The fibril structure in tendons are especially important for toughening. As shown in FIG. 22, the collagen fibrils show horizontal bands (D-banding) as a result of the twists of sub-fibrils. Formation such plaited nanostructure can ensure that first, the formation of ultra-long fibrils that run from one end to the other end of the material that reduce fibril sliding; second, the non-straightened sub-fibrils are relaxed and have room for deformation under stress; third, once the sub-fibrils are straighten during loading, they form highly anisotropic structures for high ultimate strength.

Learning from nature, in order to realize toughening while strengthening, it may be crucial to form interconnected fibrotic nanostructures in addition to the anisotropic microstructures in existing fabrication methods of anisotropic materials. Similar idea of chemically bridging fibrils has been exploited with heat drawing and mechanical stretching, however, formation of coherent and strong single material network by self-assembly in wet state under room temperature is a challenge and has not been realized previously.

Figure 21:
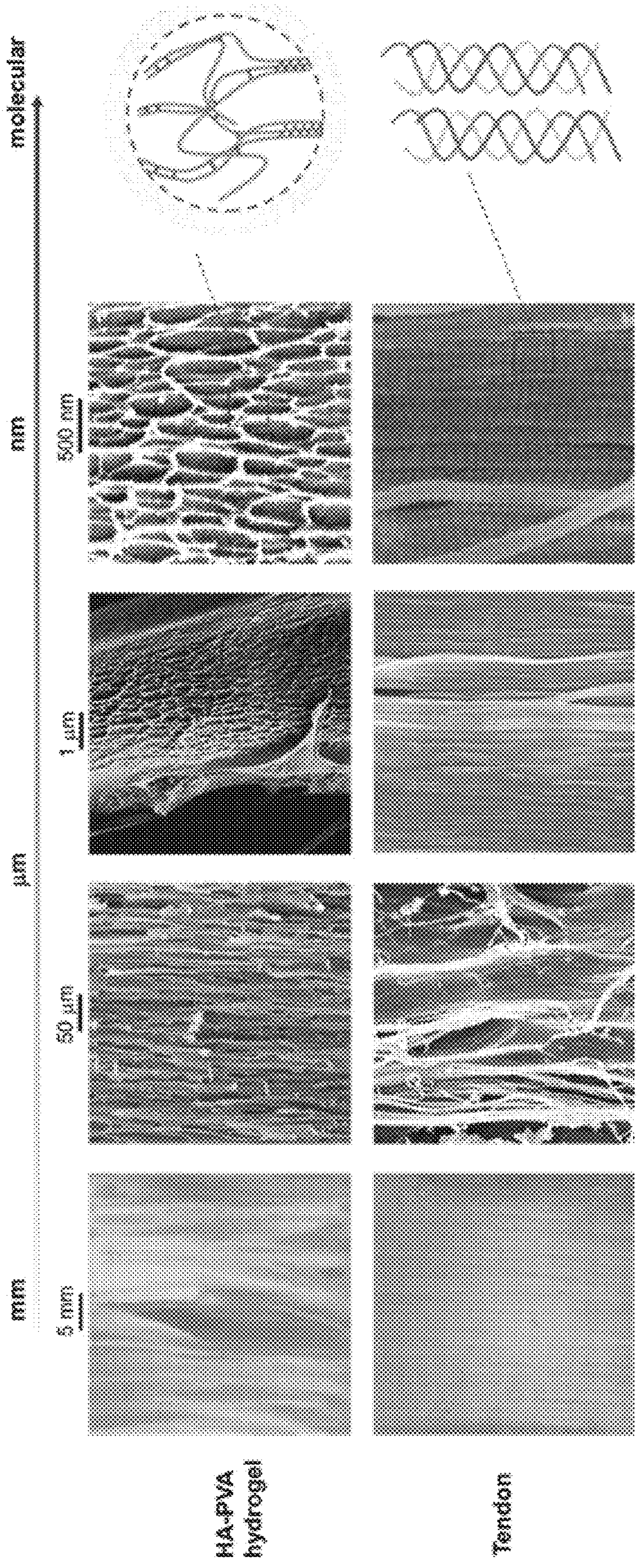
FIG. 21 illustrates hierarchical structure of HA-PVA hydrogel compared to natural tendon in accordance with an embodiment.

FIG. 21 illustrates hierarchical structure of HA-PVA hydrogel compared to natural tendon in accordance with an embodiment. Like natural tendon and wood, the HA-PVA hydrogel is anisotropic to the naked eye at macroscopic level. At micrometer length scale, natural tendon features aligned microfibers and wood features a honeycomb microstructure with nanopores. At this length scale, the HA-PVA hydrogel has an anisotropic fibrous microstructure that contains finer nanostructures of nanofibril mesh, which is like wood. At nanometer length scale, natural tendon features a spiral plaited nanostructure and wood features a nanofibrous nanostructure. At this length scale, the HA-PVA hydrogel is not the same as tendon or wood but has a nanofibril mesh structure of similar complexity.

FIG. 22 illustrates SEM image of natural tendon in accordance with an embodiment. High magnification SEM image of real tendons showing horizontal banding (D-banding) due to the helical plaited structure of collagen subfibrils.

Example 2: Salting Out Abilities of Various Anions

The Hoffmeister series originate from the empirical and qualitative ranking of different ions' ability to precipitate proteins from solution, also known as the "Ion-specific effect". Apart from proteins, many polymers also show similar trend of solubility in the presence of ions. For instance, PVA could strongly precipitate to form gels in the presence of some ions but dissolves quite well in other ionic solutions. To utilize the Hoffmeister effect as a gelation mechanism, some embodiments test the modulus of PVA hydrogels formed by self-aggregation in various salt solutions (different anion, fixed cation Na+). The PVA solution were poured into a mold and frozen to preserve the shape of the mold, followed by salting out in ionic solutions beginning from the frozen state. The result shows that under the same molar concentration, different anions have drastically different abilities to form PVA hydrogels and the modulus of formed PVA hydrogels mostly follows the Hoffmeister series (FIG. 2).

Example 3: Relationship Between Microstructure and Mechanical Performance

Common strengthening processes (e.g., increasing cross-linking density, increasing polymer content or adding nano-fillers for soft materials) provide strengthening at the cost of lowering the ductility, which is hard to compensate with subsequent post-treatments. Although limited processes exist for synergistic strengthening and toughening, they are restricted to specific types of materials (e.g., grain refining for metals, transformation-induced plasticity in metals and ceramics), not applicable to soft materials.

The combination of high strength and high toughness in accordance with many embodiments can be correlated with three structural aspects at micro-, nano-, and molecular levels that evolved during synthesis (FIGS. 4C-4E), which integrate multiple strengthening and toughening mechanisms. On a micrometer level, the size and spacing of the aligned pore walls initially created by ice templating can reduce significantly over time (FIG. 4C, ~20% for HA-5PVA hydrogel), as the hydration water between the polymer chains is gradually expelled during the "salting-out" treatment. This may result in microfiber densification, which can strengthen the hydrogel by increasing the material density and also toughen the hydrogel by increasing the unit-volume energy dissipation via fiber pull-out. In conjunction with this microfiber densification, crack deflection and fiber bridging can serve as additional toughening mechanisms. The micron-scale changes may originate from the nanoscopic evolution as more PVA aggregate, during which the nanofibril diameter decrease overtime, indicating each strand of fibril may be densified overtime (FIG. 4D). Meanwhile, the number density of nanofibrils also increase overtime as more nanofibrils are formed (FIG. 4D). The increase in both the physical density and number density of nanofibrils may boost the strength of the hydrogel and provide toughening by increasing energy dissipation per fracture of fibril (due to physical density increase) and the capacity of dissipated energy per unit volume (due to number density increase). The additional toughening mechanisms on this level are fibril bridging and crack deflection by nanofibrils. The nanofibril network also show partial alignment along the ice growth direction, as indicated by the SEM and stretch of SAXS pattern (FIG. 4D, inset). The partial alignment provide additional strengthening in the parallel direction and the unifying mesh can serve as extra toughening mechanism by more even distribution of stress within the nanofibril network, such that the stress is less concentrated to fracture each fibril. III. The nanofibril growth further originates from the molecular-level PVA aggregation and crystallization overtime, as indicated by the appearance of the ring pattern corresponding to diffraction peak from crystalline PVA in the WAXS pattern (FIG. 4E). The crystalline content of HA-5PVA is measured to be ~4% in the swollen state after 24 hours of salting-out (FIG. 3). The PVA crystalline domains strengthen each nanofibril and improve material elasticity by acting as rigid high functionality crosslinkers. They also toughen the fibrils by virtue of their ability to delay the fracture of individual fibrils by crack pinning (FIG. 4G).

To further identify the roles of micro-scale fibers, nano-scale fibril networks and formation of PVA nano-crystalline domains in strengthening and toughening, some embodiments compare between several control groups with different combinations of those three structural features (i.e., crystalline, (aligned) microstructure, and nanostructure), all fabricated with 5% PVA precursor, as shown in FIG. 6 and FIG. 10. All mechanical measurements are carried out using the pure-shear test method.

Some embodiments use the chemically crosslinked PVA hydrogel as the baseline, which can present none of these structures and was extremely weak and fragile (FIG. 6E "Chemical crosslinking", $\sigma_c$=30 kPa, $\varepsilon_c$=1.6, $\Gamma$=12 J/m$^2$). Instead, the conventional chemical crosslinking method yields a low content of crystalline PVA domains through three freeze-thaw cycles (insufficient aggregation to form nano-fibrils). The hydrogel is strengthened by 3 times but still fragile (FIG. 6D "FT-3cycle", $\sigma_c$=78 kPa, $\varepsilon_c$=2.1, $\Gamma$=336 J/m$^2$). Therefore, using common methods for creating crystalline domains in PVA hydrogel does not provide sufficient strengthening nor toughening. By contrast, every hydrogel prepared by other control methods, other than the "chemical crosslinking" one, show improved modulus; thus the modulus increase depends on the amount of PVA crystalline phase formed.

On the basis of the freeze-thawed hydrogel with low-content crystalline PVA domains (FIG. 6D), the formation of additional micron-scale alignment made the hydrogel 10 times stronger and 5 times more stretchable than the baseline (FIG. 6C "DFT-3cycle", $\sigma_c$=390 kPa, $\varepsilon_c$=9.1, $\Gamma$=1.98 KJ/m$^2$), indicating that the formation of aligned microstructure can be associated with both strengthening and toughening. By contrast, notably, the formation of additional nanometer-scale fibril networks can make the hydrogel two-order-of-magnitude stronger and nearly one-order-of-magnitude more stretchable than baseline (FIG. 6B "F+salting out", $\sigma_c$=3.3 MPa, $\varepsilon_c$=13.7, $\Gamma$=26.71 KJ/m$^2$), indicating that the formation of nano-fibril network places an important role in strengthening and toughening the hydrogel.

This similar efficacy can also be observed by comparing FIGS. 6A and 6C, both of which have micron-scale alignment, while the nano-fibril network endowed hydrogel has nearly a two-order-of-magnitude toughness enhancement. The nano-fibril networks may play an important role in strengthening and toughening. Similarly, comparing FIGS. 6A and 6B, their major microstructure difference is whether having micro-scale alignment or not and the fracture energy is improved for about 5 times. While the micro-scale alignment can improve both strength and toughness, but it does not provide as significant enhancement as the nanofibril network does and thus play a secondary role.

Although there are inevitable differences in the degree of aggregation associated with different structures in these comparative samples, the formation of mesh-like nano-fibril network with stronger polymer chain aggregation induced by salting out process can be identified as the primary structure for synergistic strengthening and toughening, and the formation of honeycomb-like aligned micro-network induced by ice templating as the secondary structure. When combining the microscale aligned structure and nanoscale fibril network, the two structures on different level of hierarchy work cooperatively and synergistically, leading to the ultra-high strength, critical strain, toughness, and fracture energy (FIG. 9).

Example 4: Boost Energy Dissipation by Plaited Nano-Fibril Networks

Highly anisotropic materials, usually materials with aligned fibrotic micro/nanostructures, may be stronger than their isotropic counterpart, due to the increased energy dissipation by having longer structures. Classic Thomas-Lake theory estimates the energy required to drive cracks across a material by $\Gamma=\alpha\sqrt{n}lJ/V$, where n is the number of monomers per polymer chain/fibril (blue lines in FIG. 12), l is the length of monomer unit, J is energy to break one bond, V is the volume per monomer, and $\alpha$ is a dimensionless parameter. Consequently, the fracture resistance of a material increases with longer chain structure ($\Gamma\propto\sqrt{n}$).

Embodiments use high molecular weight PVA polymers to construct the hydrogel, which can improve the fracture energy of the hydrogel beginning from the molecular level. Additionally, the ultra-long fibrils also prevents failure caused by fibril sliding over each other (FIG. 12, middle).

In reality, most synthetic anisotropic materials have uncontrollable fibril length comprising of relatively short fibrils that does not run across the material (FIG. 12, left), which can make these materials severely underperformed than their theoretical limit. To further improve their toughness with an economically and technologically approachable method, bridging the intermittent fibrils to form an interconnected network (marked by red line) can be equivalent to extending the fibril length and thus increase energy dissipation. Further, formation of fibril network is more superior than having the “through fibrils” structure (FIG. 12, right). First, upon stretching, external stress is distributed across the entire network and the fracture of fibrils dissipates high amount of energy from the entire network, which may not be realizable with “through fibrils” structure. Second, the network structure can enable the already fractured fibrils to continuously participate in loading through other pathways (marked by dashed red line), which may also not be possible with “through fibrils” structure. Third, the network structure allow for deformation as the bridging fibrils gradually align during loading.

Example 5: Fatigue Resistance by Crack Blunting and Redirecting

Single notch tensile tests can be carried out to verify the fatigue resistance of the HA-10PVA|| and HA-20PVA|| hydrogels. The initial notch may be significantly blunted during the loading cycles, which delocalize the high stress of fibers at the crack tip over a long segment. This can lead to significant increase in the energy required to break the fibers and grow the crack. In HA-10PVA hydrogels, the crack do not extend into the material during the 5000 cycles of stretching with strain up to 1000% and energy release rate up to 29.36 kJ/m$^2$ (FIG. 16). However, due to insufficient inter-fiber bonding, the crack is redirected to be parallel to the alignment direction and could be considered as a kink crack failure. For higher PVA concentration hydrogels (e.g. HA-20PVA), the inter-fiber bonding is improved, and crack redirection is not observed. Therefore, a fatigue threshold of 10.5 kJ/m$^2$ is measured (FIG. 18). For validation, a HA-20PVA hydrogel with crack is stretched with energy release rate of 10 kJ/m$^2$ for 30,000 cycles (FIG. 18B). No sign of failure or crack propagation can be observed.

Example 6: Tough, Anti-Freezing, and Conductive Ionic Gels

Wearable electronics are capturing an increasing amount interest due to their broad applications in daily activities, sports, medical treatments and entertainment. Numerous efforts have been made toward the innovation of relevant devices, such as soft aqueous batteries, supercapacitors, wearable sensors, soft robots, ionic skins, and ionic touch panels. The emergence of wearable devices is also increasing the demand for soft conductive materials that exhibit excellent mechanical performance and high conductivity which are crucial for the overall performance of the devices. Over the past few years, considerable efforts have been made to improve the conductivity and mechanical properties of soft conductive materials, including their stretchability and toughness. For example, a class of liquid-free, solid-state conductors has been systematically studied. Among the studied soft conductive materials, conductive ionic hydrogels consisting of crosslinked networks of hydrophilic polymer chains with high loadings of water and incorporated ions have captured a tremendous amount of attention for their solid-like mechanical performances and liquid-like transport properties, and they have been widely applied for various soft devices. However, conductive ionic hydrogels freeze in subzero-temperature environments, leading to a significant loss in their conductivity and stretchability, which severely limits their applications over a broad range of conditions, especially at low temperatures.

To tackle this critical freezing issue, organic solvents in combination with high salt contents have been widely introduced into these materials to depress their freezing temperatures. However, these proposed strategies have shown multiple drawbacks. For example, excellent anti-freezing capacities can be induced by the introduction of organic solvents such as glycerol, propylene or ethylene glycol, but salts can precipitate with decreasing temperatures due to their relatively low solubility in the organic solvents. Organic solvents are also known to suppress the dissociation of salts. These two factors, i.e., low salt solubility and the suppression of salt dissociation in water-organic mixtures, reduce the conductivity of conductive ionic hydrogels. Additionally, organic solvents are known to be environmentally hazardous and raise health and safety issues. However, high salt contents can lead to higher conductivity values and satisfactory anti-freezing performances. A polyacrylamide-alginate double-network hydrogel containing $CaCl_2$ has been indicated to possess high conductivity and excellent freeze tolerance. Both its conductivity and anti-freezing capacity were dependent on the concentration of $CaCl_2$. However, as the content of $CaCl_2$ increased, the mechanical properties were significantly compromised due to a salting-in effect. Salting-in refers to the phenomenon by which increasing salt solution concentrations increase the solubility of a solute (polymer chains, in this case). In contrast, a salting-out effect promotes the aggregation of solutes, decreasing solubility. Such effects of salts on solutes are known as the Hofmeister effect or the ion-specific effect. In many embodiments, the Hofmeister effect can be utilized to broadly tune the mechanical properties of hydrogels. Salting-out salts, such as $Na_2SO_4$ and $Na_2CO_3$, promote the aggregation of polyvinyl alcohol (PVA), leading to tough hydrogels; salting-in salts, such as $NaNO_3$ and NaI, soften hydrogels. In principle, the anti-freezing performance and strengthening or softening effects of salt solutions depends on the salt concentrations and solubility. Salting-out salts, such as $Na_2SO_4$ and $Na_2CO_3$, have limited solubility, while salting-in salts, such as NaNO3, NaI and CaCl2, have much higher solubilities in water. Since salting-in salts typically compromise gel mechanical properties, it is highly desirable to identify optimal salting-out salts with high solubilities for fabricating highly conductive, anti-freezing gels that remain mechanically robust at low temperatures.

Many embodiments implement potassium acetate (KAc) to provide high solubility and induce a salting-out effect on polyvinyl alcohol (PVA) simultaneously. The freezing temperature of a KAc solution can be as low as −70° C. when the concentration is 50 wt %. A freeze-soak method, i.e., soaking frozen polymer solutions in KAc solutions, can be used to fabricate tough, anti-icing and conductive ionic hydrogels. Hydrogels soaked in a 50 wt % KAc solution exhibit more favorable mechanical properties, with an ultimate stress of about 8.2 MPa and toughness of about 25.8 MJ/m$^3$. At 50 wt % KAc, the hydrogels also exhibit desired anti-freezing performance, remaining unfrozen at temperatures below −60° C. They also show a high conductivity of about 8.0 S/m at room temperature and 1.2 S/m at −60° C. Several embodiments treat poly(acrylamide) and poly(2-hydroxyethyl acrylate) hydrogels in the same manner and observed an increase in toughness of up to two orders of magnitude. Additionally, all hydrogels containing KAc show desired anti-dehydration capacities, which further augment their practical applicability, especially under low humidity conditions.

Some embodiments use KAc salting out on PVA by introducing 10 wt % PVA solutions into a salt solution of 50 wt % KAc. The PVA salted out in the KAc solution, yielding clumps of white, opaque structures. In contrast, PVA dispersed in a $CaCl_2$ solution, remaining in the form of a transparent solution. Certain embodiments utilize a freeze-soak method to fabricate hydrogels. Specifically, PVA solutions are poured into molds, frozen at −20° C., and then immersed in a KAc solution, after which the ice melted in the salt solution at room temperature. Freezing fixes PVA into a specific shape macroscopically and prepacks the polymer chains microscopically to facilitate the aggregation of PVA chains to form a bulk hydrogel during the subsequent salting-out process. Generally, during the salting-out process, two possible interactions are possible among the ions. In the first scenario, the salting-out ions can polarize the hydration water molecules, which destabilizes the hydrogen bonds between the polymer and its hydration water molecules. In the second scenario, the ions can interfere with the hydrophobic hydration of the macromolecules by increasing the surface tension of the cavity surrounding the polymer backbone. During the melting process of frozen samples in salt solutions, both scenarios probably take place, ultimately resulting in the expulsion of water molecules from between the polymer chains and giving rise to new hydrogen bonds between the hydroxyl groups, resulting in aggregation/crystallization of the polymer chains. KAc has high solubility, and a phase diagram shows its outstanding antifreezing capacity under concentrated solution conditions. Some embodiments demonstrate the extremely low freezing temperature of the concentrated KAc solution. The 50 wt % KAc solution remained transparent after being stored at −60° C. for 1 h. The salting-out effect is concentration dependent, with higher concentrations resulting in stronger salting-out effects, improving the strength of the hydrogel. Hence, a tough, antifreezing and conductive ionic hydrogel is by soaking PVA in a concentrated KAc solution.

Figures 23A, 23B, 23C:
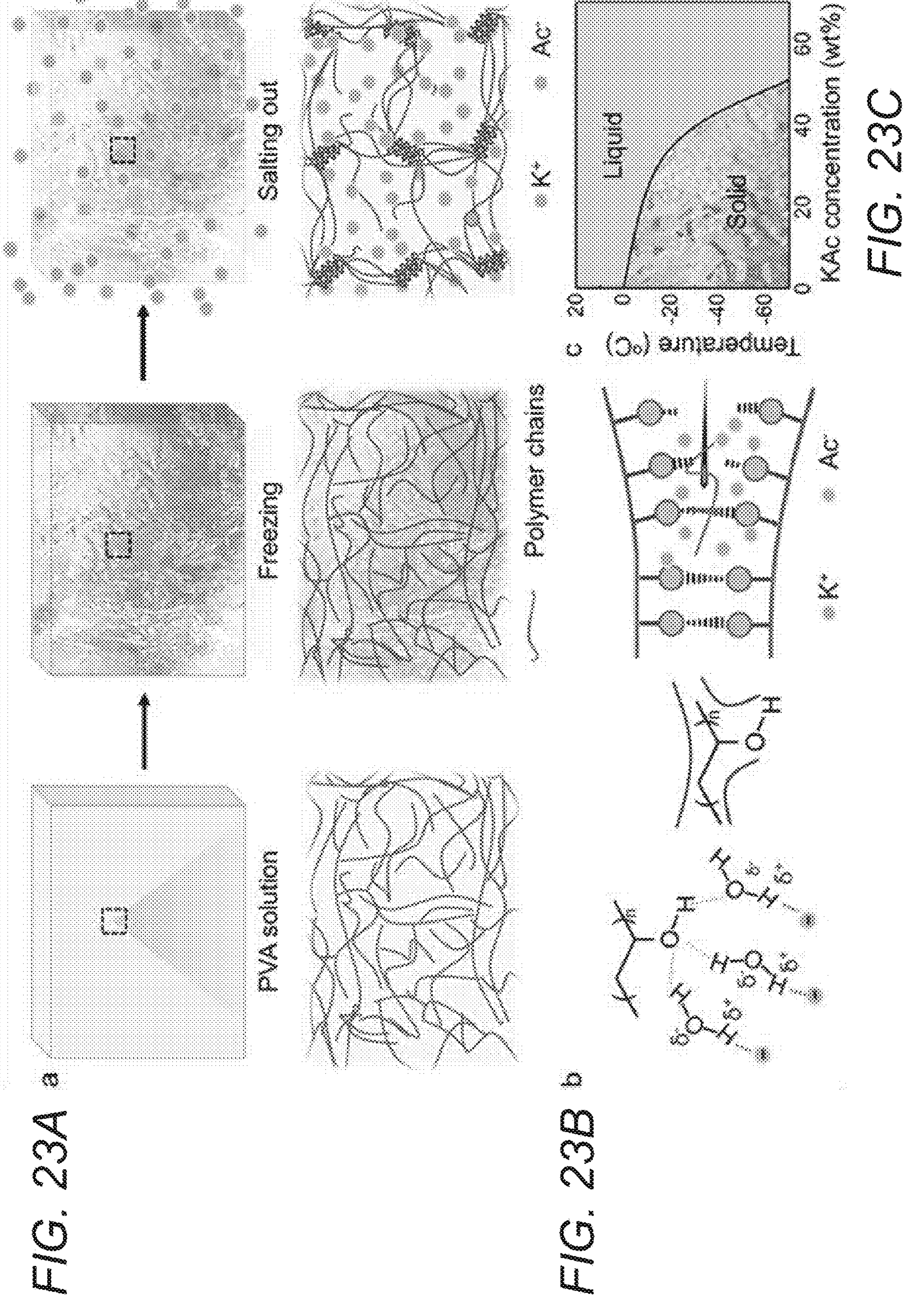
FIGS. 23A-23C illustrate schematics of the fabrication process and polymer chain aggregation in accordance with an embodiment.

FIGS. 23A-23C illustrate schematics of the fabrication process and polymer chain aggregation in accordance with an embodiment. FIG. 23A shows the fabrication processes of the hydrogels. The PVA solution is frozen at −20° C. and then immersed in the KAc solution, after which the ice melted in the salt solution at room temperature. The ions facilitated the aggregation of PVA chains to form the bulk hydrogel. FIG. 23B shows interactions among ions, polymer chains, and water molecules. K+ and Ac− expelled water molecules from between the polymer chains, and new hydrogen bonds formed between the hydroxyl groups, resulting in the aggregation/crystallization of PVA. FIG. 23C shows phase diagram of the KAc solutions, showing their high solubility and the corresponding low freezing temperatures.

Hydrogels are fabricated following the design principle presented above, and they are systematically tested for their mechanical properties. The effect of KAc concentration on hydrogel mechanical properties is shown. Hydrogel samples are prepared by immersing frozen 10 wt % PVA (molecular weight, Mw=89 kDa) solutions in KAc solutions of different concentrations for 96 h. The control hydrogel samples are semitransparent and too weak to characterize when they are not soaked in salt solutions. In contrast, the hydrogels soaked in KAc solutions became opaque and toughened significantly. When the concentration of KAc increases from 10 wt % to 50 wt %, the tensile strength and toughness increase from 0.1 MPa to 4.0 MPa and from 0.1 MJ/$m^3$ to 7.8 MJ/$m^3$, respectively. The molecular weight of PVA can be changed to observe how the mechanical properties of the salt solution-treated hydrogels are impacted. As the molecular weight of PVA was increased from 27 kDa to 195 kDa, the hydrogel mechanical performance greatly improves. Tensile strength and toughness increase from 0.5 MPa to 8.2 MPa and from 0.1 MJ/$m^3$ to 25.8 MJ/$m^3$, respectively. The toughness of the hydrogels made of 195 kDa PVA is 2 orders of magnitude greater than that of the 27 kDa PVA hydrogel. To showcase the excellent strength of the 195 kDa PVA hydrogel, a small strip of the toughened hydrogel (8 cm*5 mm*2 mm) could be used to easily lift 4 gallons of water. According to the Lake-Thomas theory ($\Gamma \propto \sqrt{n}$), the energy ($\Gamma$) required to fracture a polymer chain scales proportionally with the polymer chain length (n refers to the number of repeating units). The salting-out effect appears to be concentration dependent; a higher concentration leads to a stronger salting-out effect and a greater aggregation of polymer chains. The pore size of the hydrogels decreased, and the fiber structures become denser as the KAc concentration increases from 10 wt % to 50 wt %.

Figures 24A, 24B, 24C, 24D:
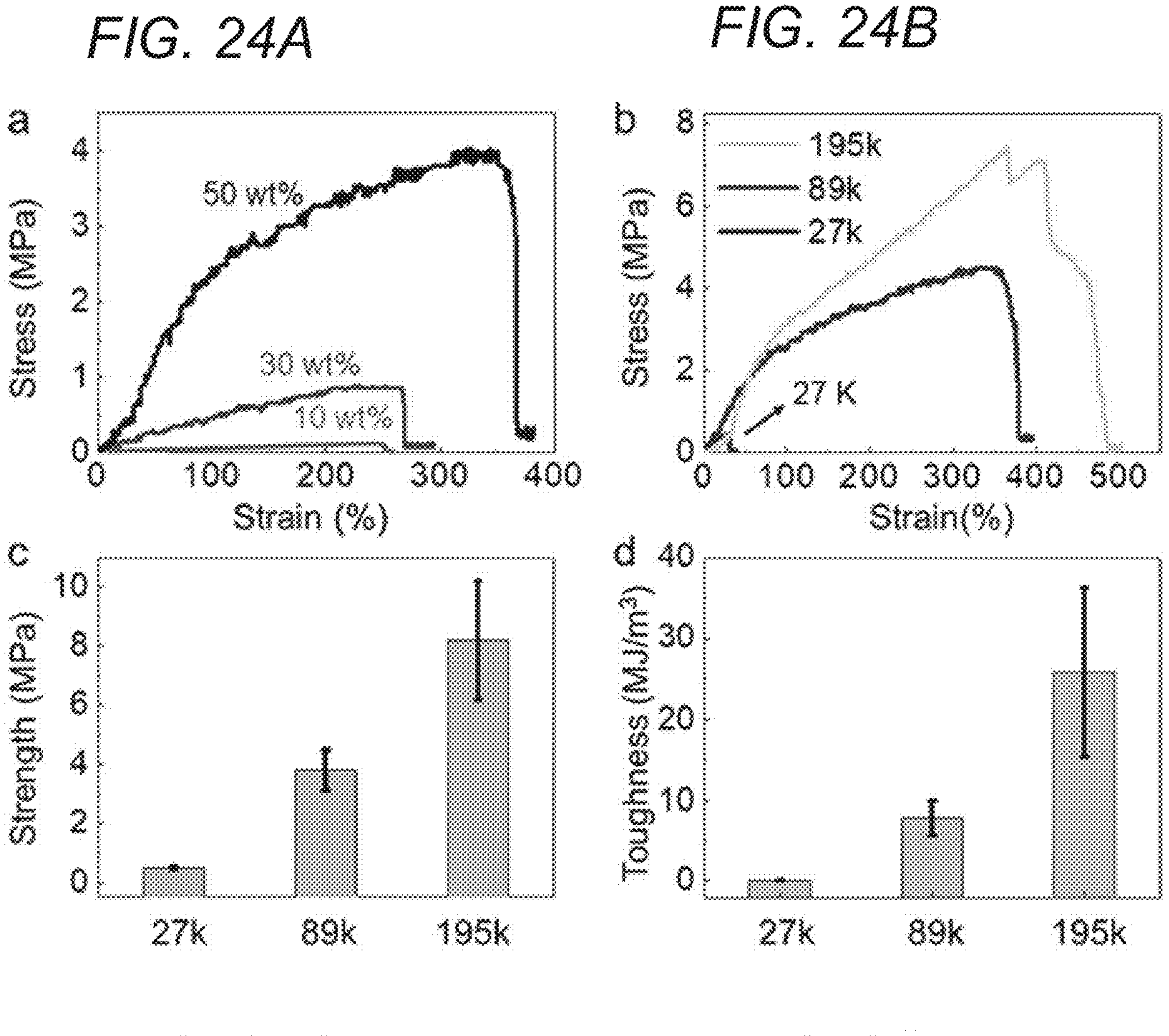
FIGS. 24A-24E illustrate mechanical properties of PVA hydrogels in accordance with an embodiment.
Figure 24E:
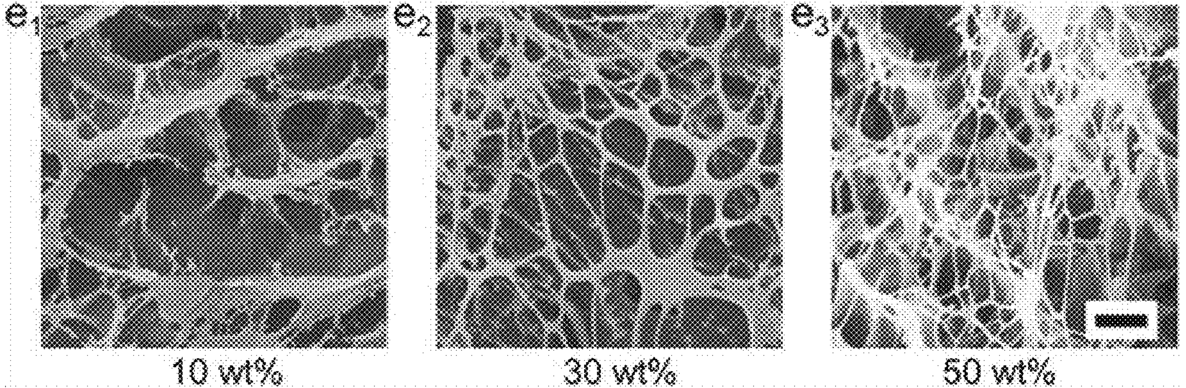

FIGS. 24A-24E illustrate mechanical properties of PVA hydrogels in accordance with an embodiment. FIG. 24A shows representative stress-strain curves of the PVA hydrogels soaked in different concentrations of KAc solutions. The PVA concentration was 10 wt %, and the molecular weight of PVA was 89 kDa. FIG. 24B shows typical stress-strain curves of the PVA hydrogels of different molecular weights soaked in a 50 wt % KAc solution. The concentration of the PVA solutions was 10 wt %. FIGS. 24C and 24D show tensile strength and toughness of PVA hydrogels made of different molecular weights. FIG. 24E shows SEM images of PVA hydrogels soaked in KAc solutions of concentration 10 wt %, 30 wt % and 50 wt %. Scale bars 500 nm.

The freezing temperatures of the hydrogels soaked in KAc solutions at varying concentrations are measured with a differential scanning calorimeter (DSC). As the salt concentration was increases from 0 wt % to 50 wt %, the freezing temperatures of the hydrogels drop from 0° C. to below −70° C. Compared with the theoretical phase diagram of KAc solutions, the freezing temperatures of salt-treated hydrogels are even lower than the freezing temperature of KAc solutions at corresponding concentrations. This is most likely due to a synergetic effect between the confinement of the polymer matrix and the colligative properties of KAc. The conductivities of the PVA hydrogels soaked in KAc solutions are measured with an electrochemical workstation. The conductivity of the PVA hydrogel increases from 5.2 to 8.0 S/m as the KAc concentration increased from 10 wt % to 50 wt %. In addition, the conductivities of the PVA hydrogel soaked in 50 wt % KAc are measured at different temperatures, from 20° C. to −60° C. The conductivity of the 50 wt % PVA hydrogel decreases gradually from 8.0 S/m at 20° C. to 1.2 S/m at −60° C. An LED light is used to demonstrate the conductivity change at low temperatures. The hydrogel containing no salt is frozen and fractured during stretching, and the LED switched off. However, the hydrogel soaked in 50 wt % KAc remains unfrozen and soft, and the LED connected to it remained on even at −30° C. with bending and stretching. The relative resistance changes in the PVA hydrogel soaked in a 50 wt % KAc solution are also studied. The relative resistance changes increase linearly with increasing strain.

Figures 25A, 25B, 25C, 25D:
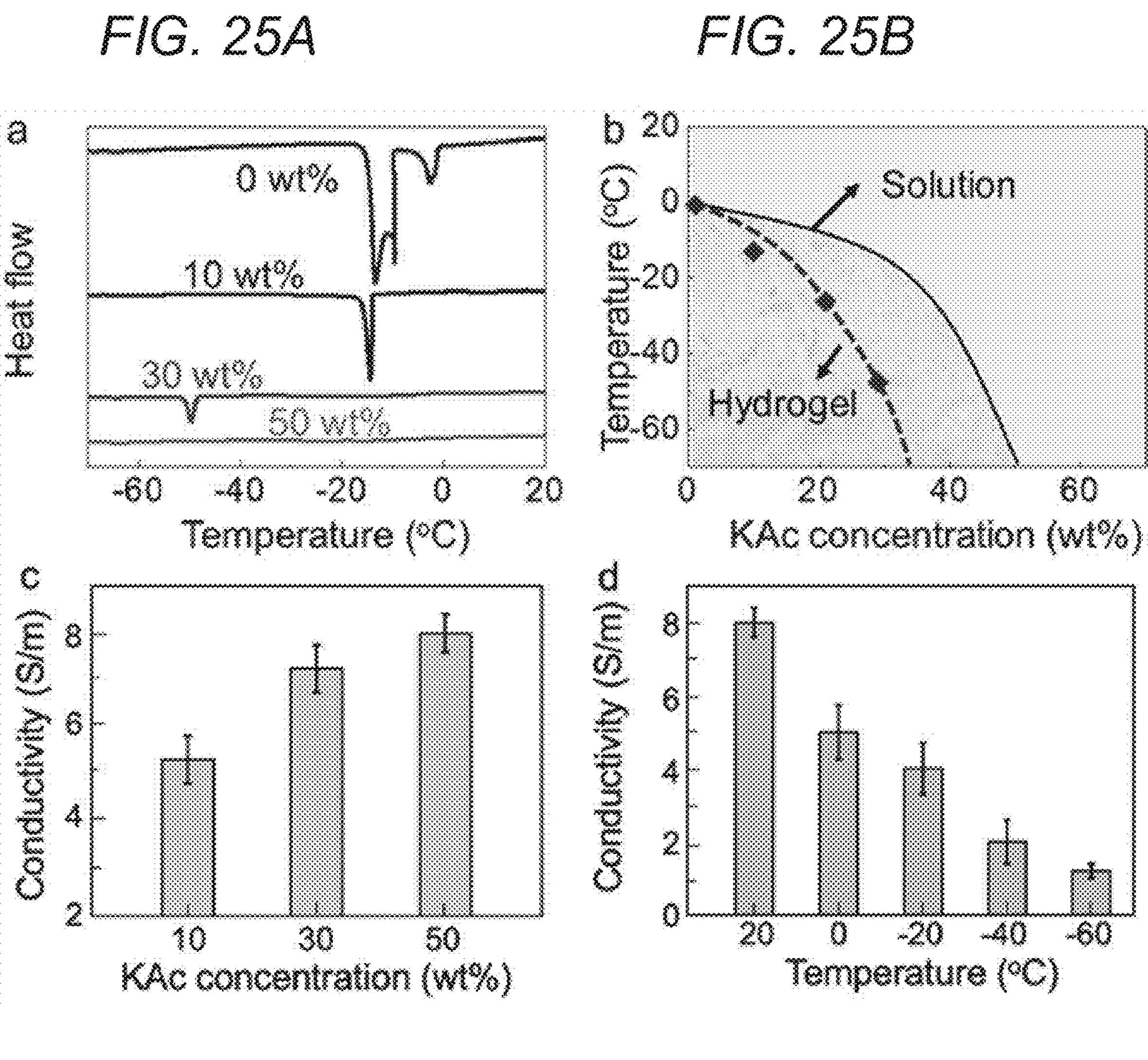
FIGS. 25A-25F illustrate conductivities of the antifreezing conductive ionic hydrogels in accordance with an embodiment.
Figures 25E, 25F:
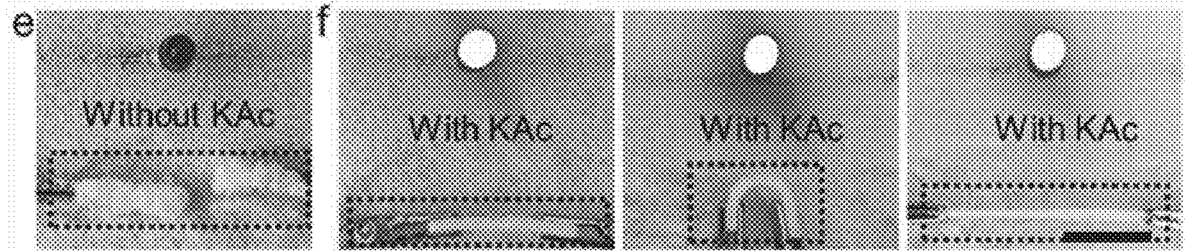

FIGS. 25A-25F illustrate conductivities of the antifreezing conductive ionic hydrogels in accordance with an embodiment. FIG. 25A shows DSC curves of hydrogels treated with different concentrations of KAc solutions, from 0 wt % to 50 wt %. FIG. 25B shows freezing temperatures of hydrogels treated with different concentrations of KAc solutions and phase diagram of the KAc solutions. FIG. 25C shows conductivities of the hydrogels soaked in KAc solutions of concentration 10 wt %, 30% and 50 wt %. FIG. 25D shows conductivities of the hydrogels under different temperatures; the hydrogels are soaked in 50 wt % KAc. FIGS. 25E and 25F show visual demonstrations of the antifreezing capacity of the tough conductive hydrogels. Tested at −30° C., the hydrogel without KAc (e) froze and fractured, causing the LED to turn off, while the antifreezing conductive ionic hydrogel soaked in 50 wt % KAc (f) did not freeze, allowing the LED to stay on even during deformation. Scale bar 1 cm.

The PVA hydrogels soaked in 50 wt % KAc showed high conductivity and superior mechanical properties, out-performing many other reported tough and conductive ionic hydrogels. Poly(acrylamide) (PAAm) and poly(2-hydroxyethyl acrylate) (PHEA) are UV polymerized and soaked in a 50 wt % KAc solution for 5 h. As shown in FIG. 4*b*, the strength and toughness of PHEA increased from 5.7 kPa to 306.5 kPa and from 2.2 kJ/$m^3$ to 1298.2 kJ/$m^3$, respectively, and the strength and toughness of PAM increased from 73.9 kPa to 337.6 kPa and from 20.6 kJ/$m^3$ to 1303.2 kJ/$m^3$. The PHEA hydrogel is transparent and flaccid before soaking but turned semitransparent and held the shape of a rectangular sheet after soaking. The mechanical properties of the PHEA hydrogels soaked in 50 wt % KAc are measured under subzero temperatures. The stress and strain are reduced as the temperature dropped from 20° C. to −60° C. However, the hydrogel still exhibits adequate stress (235.7 kPa) and strain (460%) at −60° C. The dehydration of conductive ionic hydrogels leads to a loss in stretchability, limiting their real-world applications. KAc is a hygroscopic salt, which means it can absorb water molecules from the air. The hygroscopicity of KAc can allow these hydrogels to retain their water content, preventing dehydration issues. The KAc solution-treated hydrogels were kept in under open-air conditions, and their weights were measured over the course of 10 days. The PVA hydrogels containing 0 wt % and 10 wt % KAc lost ~90% of their original weight, indicating the complete dehydration of the hydrogels. The PVA hydrogels soaked in 30 wt % lost significant amounts of weight within the first day but remained at a relatively constant weight for the remaining 9 days. In stark contrast, the hydrogel soaked in 50 wt % KAc maintain 90% of its original weight over all 10 days (240 h), demonstrating excellent anti-dehydration capacity. The observed weight fluctuations of the PVA hydrogels are probably due to humidity changes, which ranged from 40%-70% over the 10 days of testing.

Figures 26A, 26B, 26C, 26D, 26E, 26F:
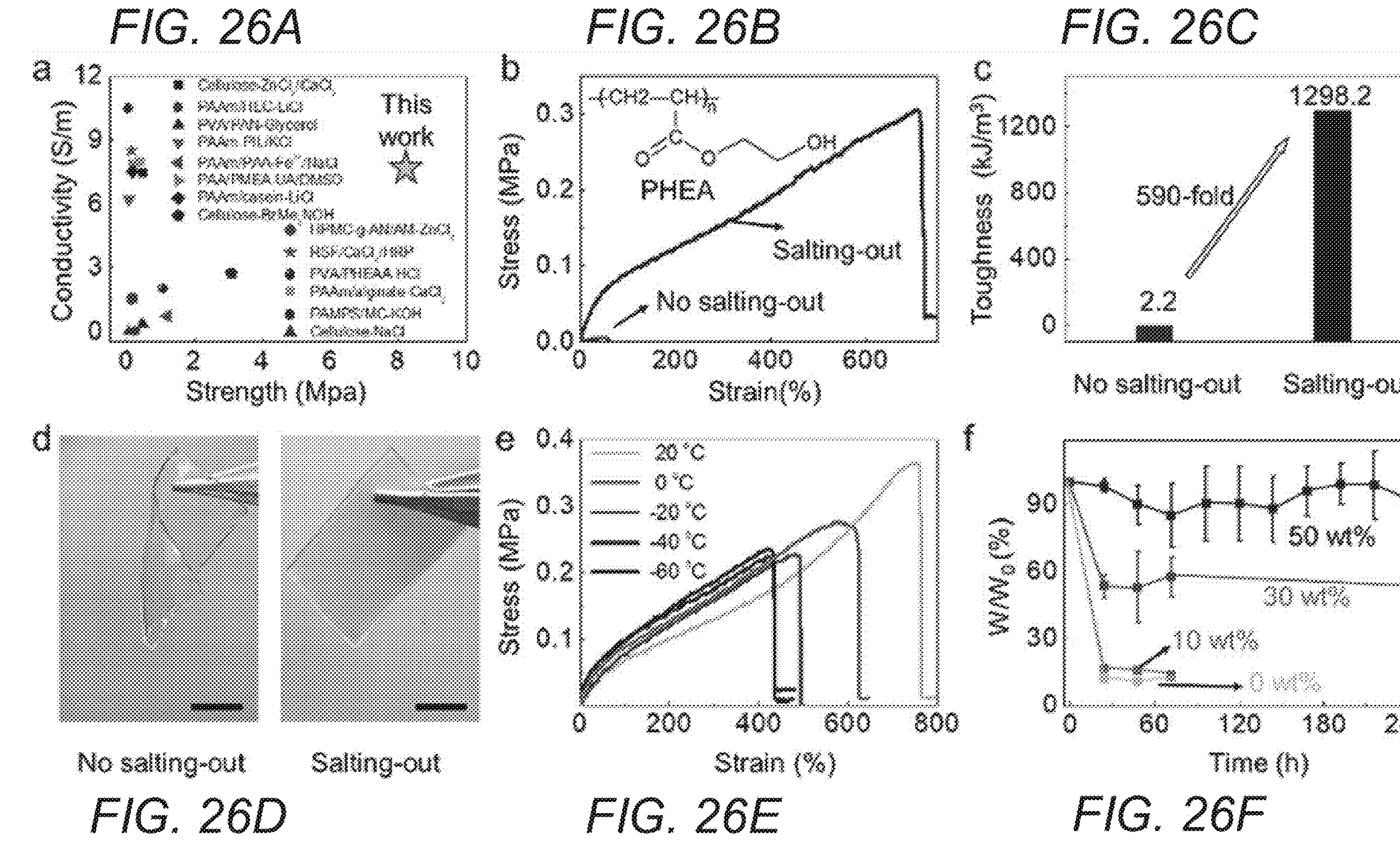
FIGS. 26A-26F illustrate performance of the tough, anti-freezing and conductive ionic hydrogels in accordance with an embodiment.

FIGS. 26A-26F illustrate performance of the tough, antifreezing and conductive ionic hydrogels in accordance with an embodiment. FIG. 26A shows comparison between the as-prepared tough conductive ionic hydrogel and reported tough ionic hydrogels. FIGS. 26B and 26C show stress-strain curves and toughness of poly(2-hydroxyethyl acrylate) hydrogels with and without soaking in a 50 wt % KAc solution. FIG. 26D shows images of poly(2-hydroxyethyl acrylate) (PHEA) hydrogels with and without soaking in a 50 wt % KAc solution. FIG. 26E shows the stress-strain curves of PHEA hydrogels soaked in a 50 wt % KAc solution characterized at different temperatures from 20° C. to −60° C. FIG. 26F shows the weight changes of hydrogels soaked in pure water and 10 wt %, 30 wt % and 50 wt % KAc solutions. Scale bars of d 1 cm.

In many embodiments, KAc induces a salting-out effect on PVA, greatly improving the mechanical properties of PVA hydrogels. The mechanical properties can be further optimized by utilizing long polymer chains and high concentrations of KAc. Furthermore, due to the high solubility of KAc, the hydrogels soaked in salt solutions exhibited antifreezing capacities. The resultant 195 kDa PVA hydrogel soaked in 50 wt % KAc solution shows superior mechanical properties, with a tensile strength of 8.2 MPa, toughness of 25.8 MJ/$m^3$, conductivity of 8.0 S/m and freeze tolerance as low as −60° C. The method addresses the previously observed tradeoff between anti-freezing performance and mechanical properties in other recently reported studies. Furthermore, this method for strengthening hydrogels can be applied to other hydrogels, such as those made of PAAm and PHEA. After soaking in a 50 wt % KAc solution, hydrogel toughness could be increased by as much as two orders of magnitude. Additionally, the as-prepared hydrogels have anti-dehydration properties. The method can expand the range of conductive hydrogel applications in wearable aqueous batteries, soft robots and ionic skins under low-temperature conditions.

Example 7: Tuing Structural and Mechanical Anisotropy of PVA Hydrogels

Hydrogels are three-dimensional (3D) polymer networks that swell in water. Due to their similarity to biological tissues with highly porous structures and high water content, hydrogel materials find a wide range of applications in biomedical engineering, soft robotics, soft sensors, wearable electronics. The broad choices of polymers and cross-linking methods, variable constituents of precursor solutions, and diverse post-treatments endow hydrogels with enormous space for tuning their structures and properties. Researchers have developed a variety of methods to control the mechanical properties of hydrogels. For example, altering the type, size, and concentration of crosslinkers can effectively change the elastic moduli of hydrogels. Using ions or co-solvents can tune the porous structures, modulus, and strength of hydrogels by modulating the polymer chain aggregation. Introducing a second polymer network to form double-network hydrogels results in toughening, due to the local yielding mechanism. The effects of these methods on the microstructures of hydrogels are isotropic, which means that mechanical performances in all directions change simultaneously.

However, there are cases where it requires anisotropic materials with specific anisotropy ratios, which refers to the ratio between moduli in different directions of the material. For instance, various biomedical implants are required to match the anisotropic mechanical properties of tissues. Biological soft tissues grown in the human body often adopt anisotropic structures with different moduli in parallel (E‖) and perpendicular directions (E⊥). Examples include human myocardium (E‖=0.1 GPa, E⊥=0.03 GPa), human coronary arteries intimal strips (E‖=600 kPa, E⊥=180 kPa), media strips (E‖=40 kPa, E⊥=7 kPa), and adventitia strips (E‖=180 kPa, E⊥=90 kPa). Mechanical property matching between the implant and the tissue is important to the function of the implant since an implant softer than the native tissue will not be strong enough to provide support, while a stiffer implant will cause foreign body reactions. Thus, implants need to have not only comparable stiffness but also similar anisotropy ratios to these tissues. Apart from tissue-mimicking biomedical implants, anisotropically structured hydrogels are also desired for drug delivery when distinct diffusion rates are required for different directions, as well as for cell culturing where cell adhesion and differentiation are influenced by directionally distinct scaffold morphology.

Anisotropic hydrogels can be fabricated via a variety of methods. Electrospinning can produce hydrogels with anisotropic ratios ranging from 1 to 1.5 by changing the mandrel velocity, but it is not suitable for large volume fabrication. Other methods utilize 3D printing to produce anisotropic hydrogels by directly printing aligned structures, multi-material printing, or applying external forces. The anisotropy ratios of hydrogels fabricated by 3D printing can take the value from 1 to over 10. These methods are limited by the choice of materials, the difficulty of printing specific structures, and the defects caused by layer-by-layer printing. Moreover, physically crosslinking the hydrogel by ions while stretching can also produce anisotropic mechanical properties. The limitation of this method is that the anisotropy cannot be retained without the presence of specific ions, which is the case in most biological applications. Ice templating is also a common method for fabricating anisotropic structures. Unidirectional freezing of aqueous hydrogel precursor induces ice crystal growth in the direction of temperature gradient and results in aligned porous structures, however, it cannot control the anisotropy ratio, since the features in the plane perpendicular to the freezing direction either are isotropic or adopt random orientations. The addition of a second temperature gradient perpendicular to the first temperature gradient can effectively align the anisotropic structures, namely lamellar structures, in that direction. Moreover, if ice templating of the hydrogel precursor results in lamellar structures, then the states between randomly orientated lamellar structure and completely aligned lamellar structure will possess different anisotropy ratios. Although various anisotropy ratios can be achieved via bidirectional ice templating, the alignment of the structures has not been well characterized, and the relation between the alignment and the anisotropy ratio has yet to be analyzed to gain a better understanding of anisotropic materials with tunable anisotropy ratios.

Many embodiments provide anisotropic polyvinyl alcohol (PVA) hydrogels by bidirectional ice templating and tuned the alignment of the lamellar structure by changing the magnitude of the second temperature gradient. The mechanical performance can be characterized by conducting tensile tests in the directions of the first and second temperature gradients. A wide tunable range of anisotropic ratio (1.6-8.3) between tensile moduli in these two directions can be achieved. The morphologies of the anisotropic hydrogels can be analyzed using histograms for lamellar structure orientations based on the SEM images. With this, key parameters that describe the extent of alignment can be extracted. Finally, a micromechanical model based on Eshelby's solution and Mori-Tanaka's mean-field theory can be developed to predict the anisotropic mechanical properties of the ice-templated porous hydrogels. The theoretical calculations agree with the experimental results. By revealing the correlation between the oriented microstructure and the anisotropic performance of the material, this model can provide guidance for future microstructure design to achieve specified mechanical properties for more anisotropic hydrogels. In addition to the aligned microporous hydrogels resulting from directional crystallization, this model can also predict the mechanical performances of hybrid hydrogels with interacting micro/nano-fillers and fiber-reinforced hydrogels.

PVA power (Mw. 89000-98000) and sodium citrate dihydrate, and Sylgard 184 poly (dimethylsiloxane) (PDMS) can be used. PVA aqueous solutions of various concentrations (2.5 wt. %, 5 wt. %, and 10 wt. %) are prepared by dissolving PVA powder in deionized water under stirring at 90° C. for 2 hours. PVA solutions were poured into 3D printed polylactic acid (PLA) molds without or with PDMS wedges of various angles ('0°' without any wedge, 10°, 20°, 30°, 40°, and 50°) inserted at the bottom of the molds, to provide temperature gradients in both vertical and horizontal directions. The molds are wrapped with a thermally insulating tap and put on a −50° C. cold plate. After unidirectionally or bidirectionally freezing for 3 hours, the frozen PVA solutions are taken out of the molds and freeze-dried for 12 hours. The dried PVA foams are soaked in a 1.5M sodium citrate solution to form the hydrogels.

The samples for morphology characterization are prepared by unidirectionally or bidirectionally freezing PVA solutions, followed by freeze-drying. The morphologies of x-y cross-sections of these samples are observed by scanning electron microscopy (SEM). The SEM images are then processed using Fast Fourier Transformation (FFT) function in ImageJ to obtain the Fourier transformed images. The alignment of lamellar structure in the SEM images was analyzed using the directionality plugin of ImageJ to obtain direction distribution (p(θ)). Statistical parameters including average direction deviation from y-direction and standard deviation of directions are calculated by the following equations:

$$\mathrm{Ave}_{Dir}=\Sigma p|_i\theta_i|$$

$$\mathrm{Stdv}=\sqrt{\Sigma p_{ii}-\mathrm{Ave}_{Dir})^2}$$

where pi is the probability of the ith alignment angle and θi is the ith alignment angle. Parameters required for theoretical calculations including pore diameters and polymer to void ratios were obtained by converting the SEM images to binary images and conducting particle analysis using ImageJ.

Mechanical properties of anisotropic PVA hydrogels are measured by uniaxial tensile testing in x, y (second temperature gradient), and z (first temperature gradient) directions. Young's modulus and ultimate tensile strength are obtained from the stress-strain curves. Anisotropic ratios were calculated by: AR=Ez/Ey, where Ey and Ez are Young's modulus in y and z directions, respectively. Poisson's ratio is measured by taking photos during tensile tests and then calculating the ratio of transverse strain to axial strain.

Some embodiments provide effect of PVA concentration on pore morphology. During the ice templating process, the temperature at the surface of the cold plate is lower than the freezing temperature of ice, as well as the temperature of the PVA solution. Thus, a temperature gradient in the vertical direction exists in the solution, which causes the ice crystals to grow upwards. This process is termed 'unidirectional freezing' where there is only a temperature gradient along the vertical direction and the temperature is uniform on the horizontal cold surface. When a PDMS wedge with a certain angle is inserted at the bottom of the mold right on top of the cooling plate, there is still a temperature gradient in the vertical direction. Meanwhile, since the heat will also slowly conduct in the PDMS wedge, there will also be a second temperature gradient along the inclined wedge surface. This process is termed 'bidirectional freezing'. The shape and size of these ice crystals are affected by PVA molecules since they inhibit ice recrystallization by binding to the prism faces of ice crystals, and this effect is more pronounced with higher PVA concentration. To determine an appropriate PVA concentration for fabricating anisotropic PVA hydrogels with lamellar structures, the effect of PVA concentration on the morphology of pores is studied. Aqueous solutions of 10 wt. %, 5 wt. %, and 2.5 wt. % PVA was bidirectionally frozen with PDMS wedges of 40°. For 10 wt. % PVA, the pore diameter is around several microns, while for lower PVA concentrations, the feature sizes increase significantly to 20-50 microns. Although all three samples were prepared with both vertical (1st) and horizontal (2nd) temperature gradients, the 10 wt. % PVA sample has round pores, the 5 wt. % PVA sample shows slight pore elongation, and the 2.5 wt. % PVA sample displays lamellar structure, because the growth of ice crystals along the horizontal temperature gradient was suppressed by the high concentration (10 wt. %) PVA chains, while for less concentrated PVA solutions, ice crystals are able to extend in that direction Since the anisotropy in x-y plane is a key feature for the tunability of mechanical properties in y direction, 2.5 wt. % PVA solution is chosen for the fabrication of PVA hydrogels with tunable anisotropy ratios.

Several embodiments provide the effect of wedge angle on the alignment of lamellar structure. The temperature gradient in the z-direction facilitates the growth of lamellar structure in the vertical direction. However, the normal of the lamellae can take any random orientation in the x-y plane. To achieve tunable mechanical properties in the y-direction, the normal directions of the planes need to go through a gradual transition from a randomly oriented state to a completely aligned state. Such structures can be fabricated by introducing a second temperature gradient in the y-direction, which is generated by inserting PDMS wedges of various angles at the bottom of the molds. The change of temperature profile on the wedge surfaces with time can be obtained by heat transfer simulation. The temperature near the top of the wedges drops more slowly than at the tip of the wedges, and the larger the wedge angle, the slower the temperature change at the top. The calculation of the temperature difference between the top and bottom of the wedges reveals that, for various wedge angles, the temperature differences all dropped rapidly in the first hour, then they reached constant values, which increase with increasing wedge angles.

The slope of the wedges affects the nucleation and growth of ice crystals, and thus influences the alignment of lamellar structures. During ice templating, ice crystals will nucleate when a certain degree of supercooling is reached, then the crystals will propagate in the directions determined by the local temperature gradient. In the experiment setup, heat transfer mostly happens through the PDMS wedge and subsequently through the PVA solution, but there is also inevitable heat transfer through the mold walls, causing an additional temperature gradient in the x-direction. At a small wedge angle, heat transfer through the PDMS wedge is faster than through the mold walls, so that ice nucleation mostly happens across the surface of the wedge at an earlier stage of ice templating. Meanwhile, the temperature gradient in the y-direction does not dominate over the temperature gradient in the x-direction, causing the nucleated ice crystals to grow in more random directions. At a large wedge angle, heat transfer across the mold walls becomes more significant compared to through thicker PDMS, resulting in lower temperature on mold walls than on the surface of the PDMS wedge. In this case, ice nucleation will more preferably happen at the edges of the PDMS wedge in contact will the walls rather than all across the PDMS surface. This ununiform nucleation, together with the additional temperature gradient in the x-direction, results in less aligned growth of ice crystals. Consequently, as the wedge angle increases, the alignment of ice crystals will become more ordered until an optimum angle is reached, after which the alignment will become more random.

Figures 27A, 27B, 27C:
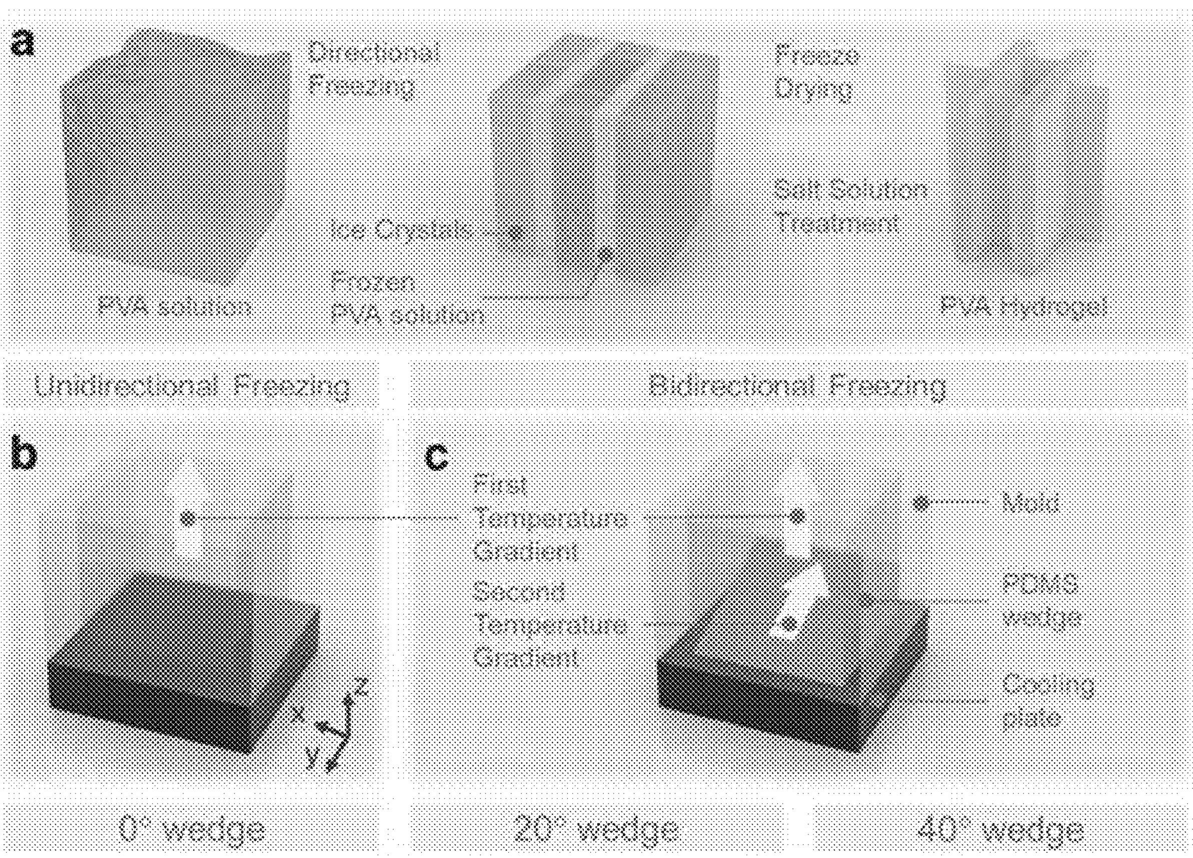
FIGS. 27A-27I illustrate bi-directional freezing fabrication process of PVA gels in accordance with an embodiment.
Figures 27D, 27E, 27F, 27G, 27H, 27I:
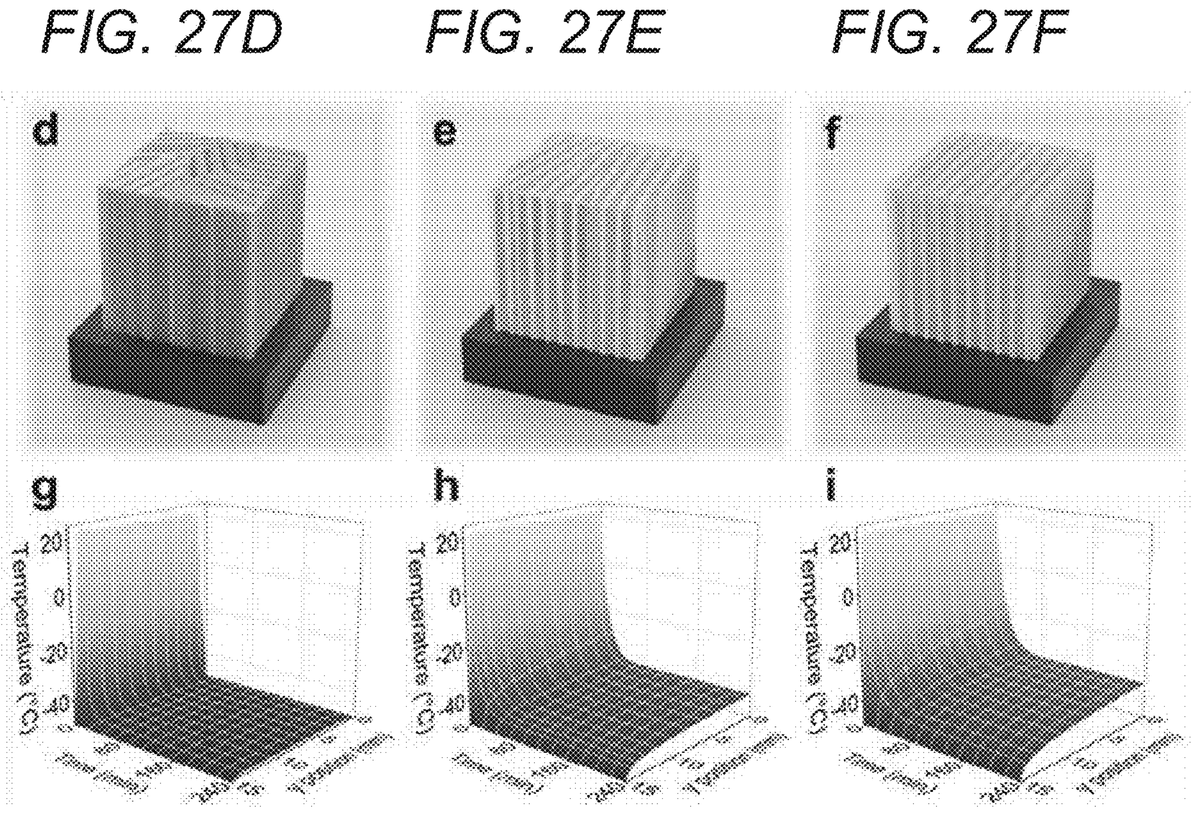
Figures 28A, 28B, 28C, 28D, 28E, 28F:
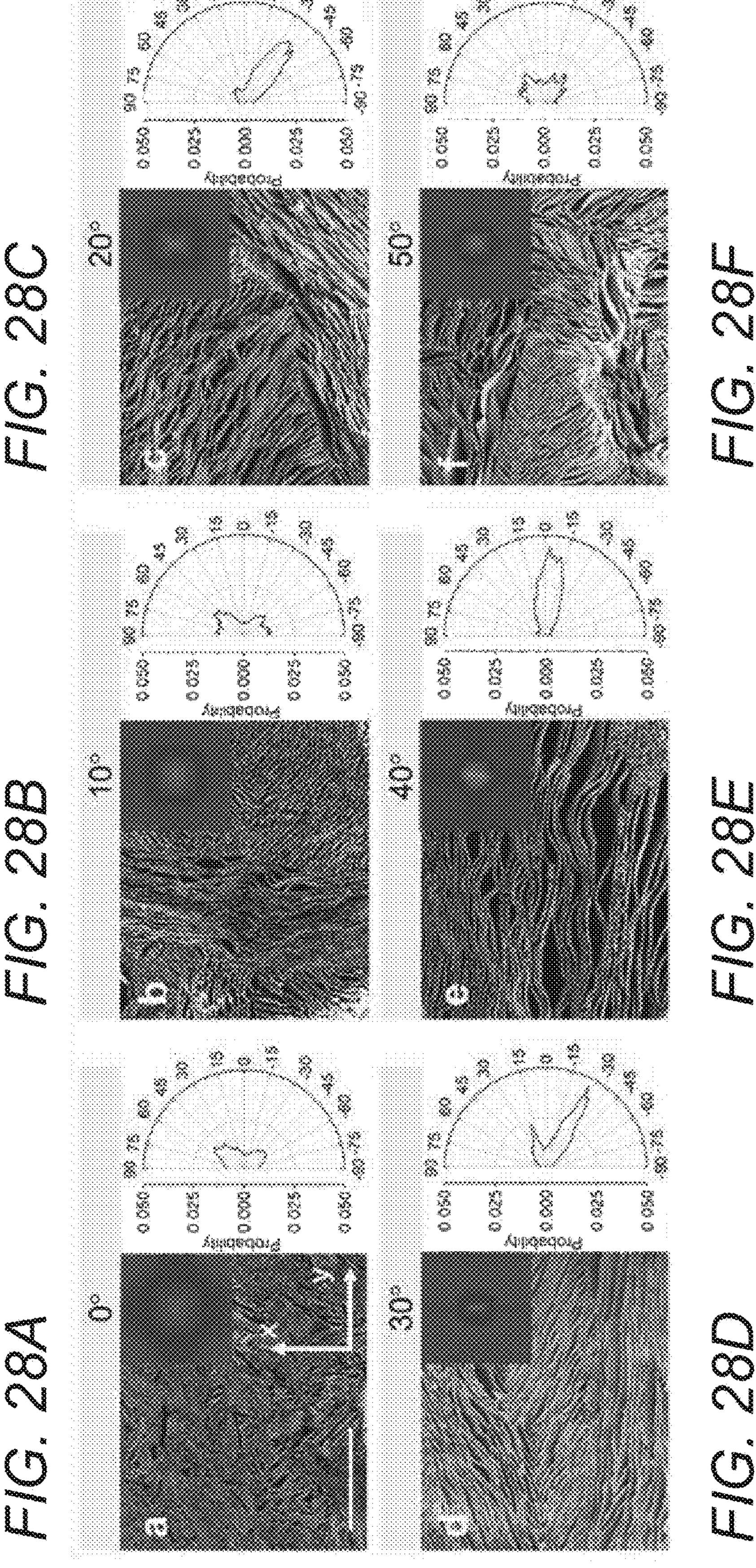
FIGS. 28A-28F compare the x-y plane morphology via SEM images of hydrogels prepared with different wedge angles, as well as their Fourier transformed images and the directionality histograms in accordance with an embodiment.

FIGS. 27A-27I illustrate bi-directional freezing fabrication process of PVA gels in accordance with an embodiment. FIG. 27A shows schematics of the fabrication steps. FIG. 27B shows experiment setup of unidirectional freezing. The direction of the temperature gradient is indicated by the arrow. There is no temperature gradient along the horizontal surface of the cooling plate. FIG. 27C shows experiment setup of bidirectional freezing. The directions of temperature gradients are indicated by the arrows. Apart from the vertical temperature gradient, there is also a temperature gradient along the inclined surface of the PDMS wedge. FIGS. 27D-27F show illustration of the directional freezing experimental setups with d) no wedge, e) a 20o wedge, and f) a 40o wedge. FIGS. 27G-27I show time-dependent temperature profiles along the y-direction on the surface of cooling plate simulated using COMSOL Multiphysics, corresponding to d), e) and f), respectively.

FIGS. 28A-28F compare the x-y plane morphology via SEM images of hydrogels prepared with different wedge angles, as well as their Fourier transformed images and the directionality histograms in accordance with an embodiment. Orientations of lamellar structures prepared with different wedge angles (a-f, in the order of 0°, 10°, 20°, 30°, 40°, and 50°), shown by the SEM images of x-y planes, with their corresponding Fourier transformed images (inserts) and directionally histograms (right). Scale bars are 1 mm.

Freezing with 0° wedge angle is essentially unidirectional freezing, which produces many domains of vertical lamellar structure with different orientations. The Fourier transformation of the SEM exhibits circular symmetry, indicating no preferred alignment direction of the structure. A more quantitative analysis of the alignment is provided by the directionality histogram, which shows the percentage of domain area of different orientations. In this case, the probabilities of finding the lamella orienting in different directions are similar, indicating that the material is mostly isotropic in the x-y plane on the macroscopic scale. As the wedge angle increases towards 40°, the temperature gradient in the y-direction increases, and the ice crystals have a higher tendency of extending in the y-direction besides growing in the z-direction, thus the lamellar structures are better aligned. As a result, the sizes of the domains increase while the orientations of the domains approach 0° (y-direction, direction of second temperature gradient). On the Fourier transformed images, the gathering of the signal along the vertical lines becomes more prominent, meaning that the structures exhibit increasingly more ordered alignment in the y-direction, and the intensity reaches a maximum on the 40° Fourier transformed image, which corresponds to a structure close to perfect alignment. The directionality histograms also show that the orientation of the structures concentrates more at 0° when the wedge angle increases to 40°. On one hand, these results reveal an optimum wedge angle for lamellae alignment. On the other hand, the gradual change of the degree of alignment indicates the continuous tunability of material performance.

The alignment of the lamellar structures can be further analyzed by calculating the average orientation deviation from the y-direction and the standard deviation of the orientation distributions. The absolute value of the orientation deviation from the y-direction is a measure of the misalignment. Theoretically, for a random distribution of orientations, the average orientation deviation from the y-direction should be 45°, which agrees with the experimental result for 0° wedge angle. With increasing wedge angle and thus larger temperature gradient in the y-direction, lamellae will take less random orientations and align closer to 0 degrees with the y-direction. The standard deviation quantifies the width of the distribution. The lowest standard deviation at 40° wedge angle means that at this fabrication condition, the lamellae grow in a narrower range of orientation than at other wedge angles.

Figures 29A, 29B:
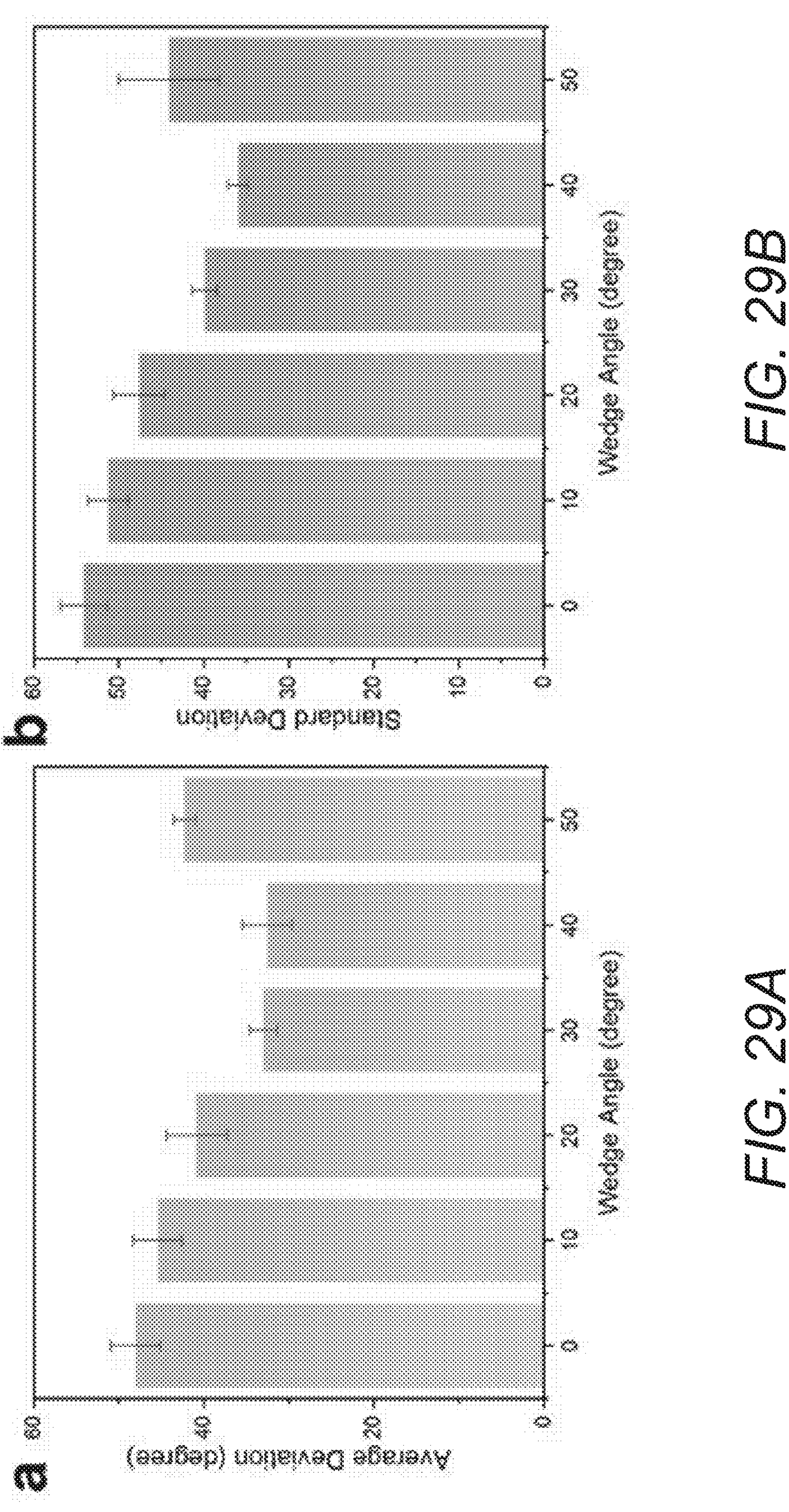
FIGS. 29A-29B illustrate directionality analysis of the structure alignment in accordance with an embodiment.

FIGS. 29A-29B illustrate directionality analysis of the structure alignment in accordance with an embodiment. FIG. 29A shows average of the deviation of alignment directions from y-direction in different domains. FIG. 29B shows standard deviation of alignment direction distribution.

The mechanical performance of the anisotropic PVA hydrogels can be characterized by tensile tests in y and z directions. The tensile moduli, ultimate tensile strengths, and representative stress-strain curves in the y or z-direction are shown. As the wedge angle increases from 0° to 40°, the anisotropic materials become stronger in the y-direction, with 4 times increase in tensile modulus and 5 times increase in ultimate tensile strength, then the properties drop at 50°, while the mechanical properties in the z-direction only change insignificantly. The lamellar structures are aligned to a higher extent when the wedge angle increases from 0° to 40°, then becomes less aligned when the angle is further increased to 50°. However, the lamellae are aligned, their normal directions are perpendicular to the z-direction, thus the alignment will not affect the properties in the z-direction. The resulting anisotropy ratio between the moduli in the z and y directions thus varies accordingly between 1.6 and 8.3, which decreases with increasing y-direction modulus. When the wedge angle is further increased to 50°, the mechanical properties drop back down to a similar level as the 30° samples. The trend of mechanical property variation agrees with the trend for lamellar structure alignment, indicating a correlation between the structural alignment and mechanical performance of the anisotropic material.

Figures 30A, 30B, 30C, 30D:
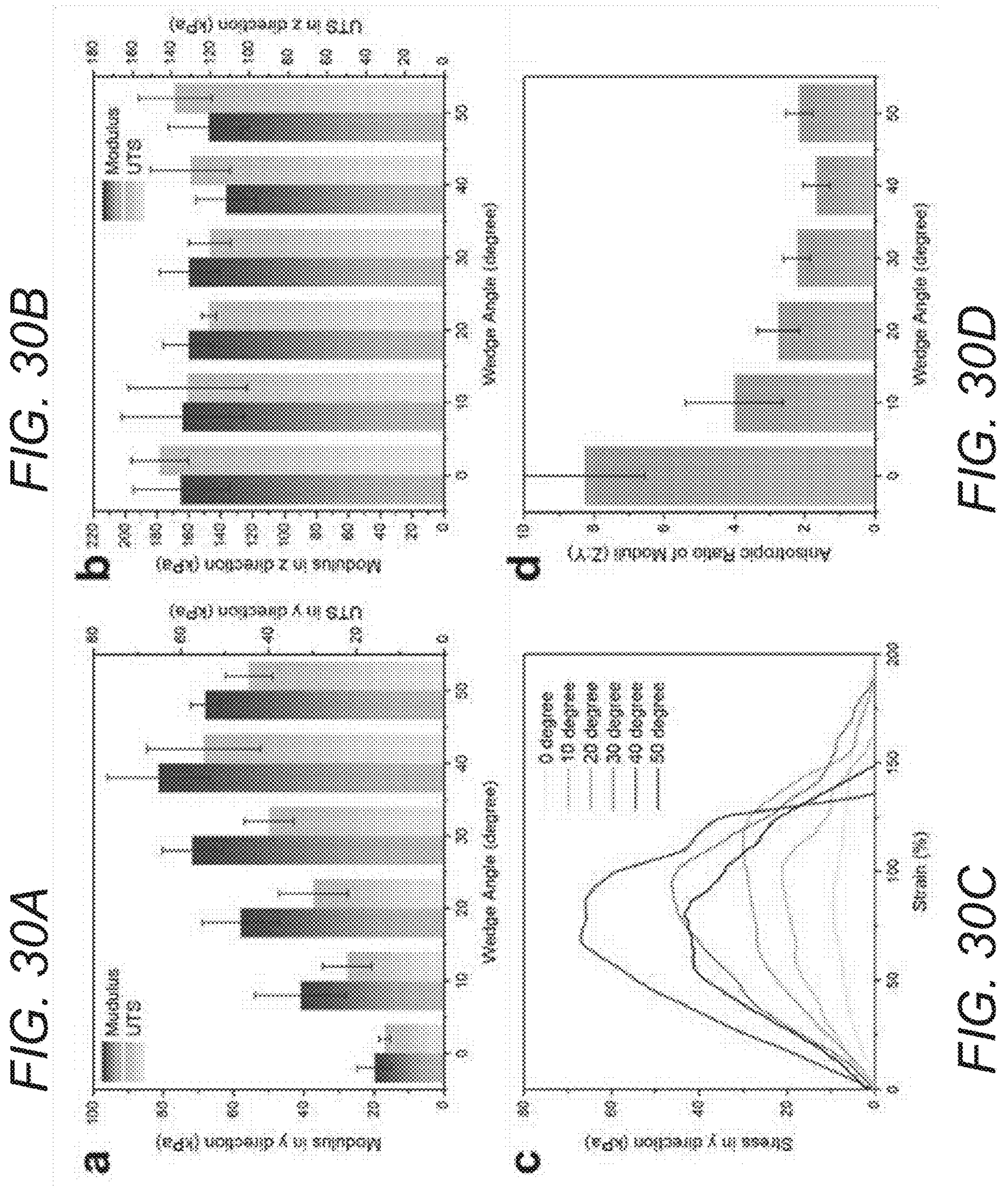
FIGS. 30A-30D illustrate tensile properties of anisotropic PVA gels in accordance with an embodiment.

FIGS. 30A-30D illustrate tensile properties of anisotropic PVA gels in accordance with an embodiment. FIG. 30A shows tensile modulus and ultimate tensile strength (UTS) in the y-direction. FIG. 30B shows tensile modulus and ultimate tensile strength (UTS) in the z-direction. FIG. 30C shows representative stress-strain curves in the y-direction. FIG. 30D shows anisotropic ratio between tensile moduli in z and y directions.

Example 8: Temperature Gradient

In many embodiments, temperature gradient control can be used during the fabrication process to create hydrogel of gradient porous structures hence gradient mechanical properties. Temperature gradient control can result in pores in horizontal direction and/or the vertical direction. Applying the temperature gradient in a horizontal direction results in pores in horizontal direction. Applying the temperature gradient in a vertical direction results in pores in vertical direction. The orientation of the pores can affect the mechanical properties and the diffusive properties of the hydrogel.

Figure 31A:
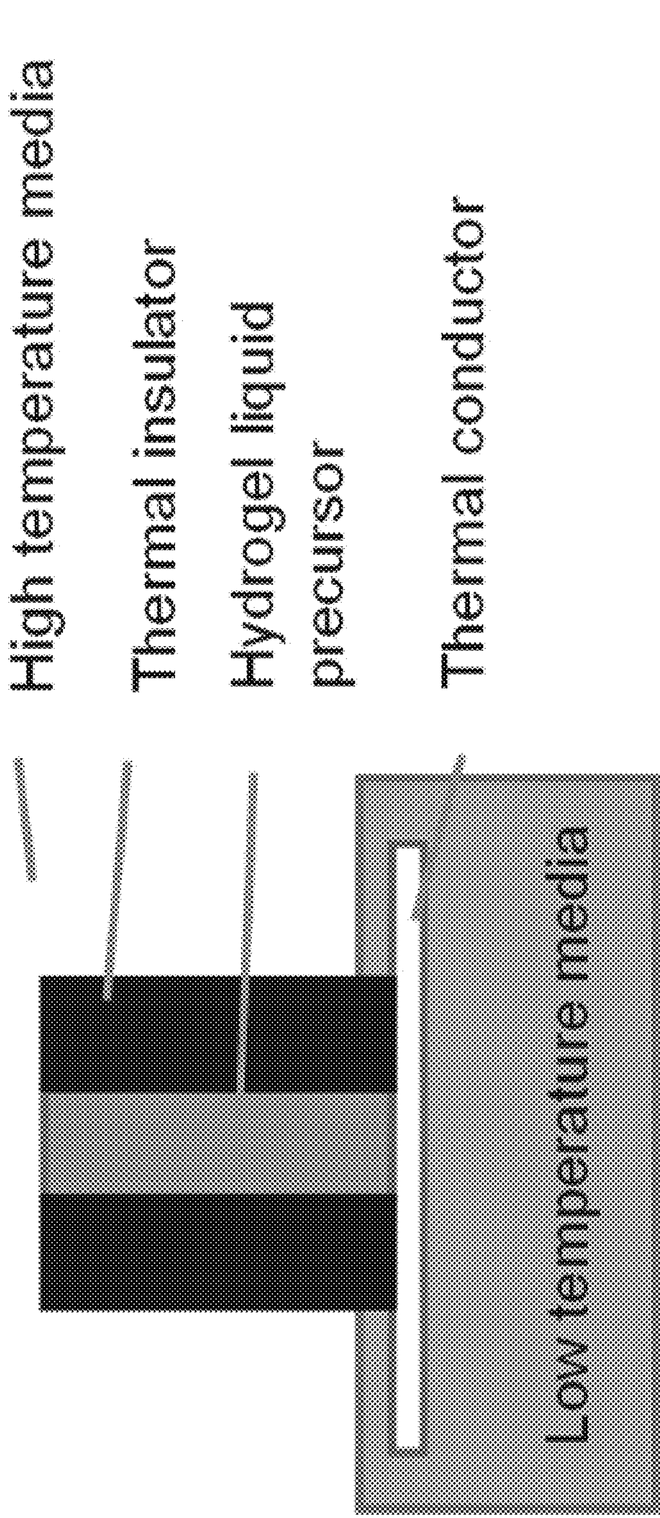
Figure 31B:
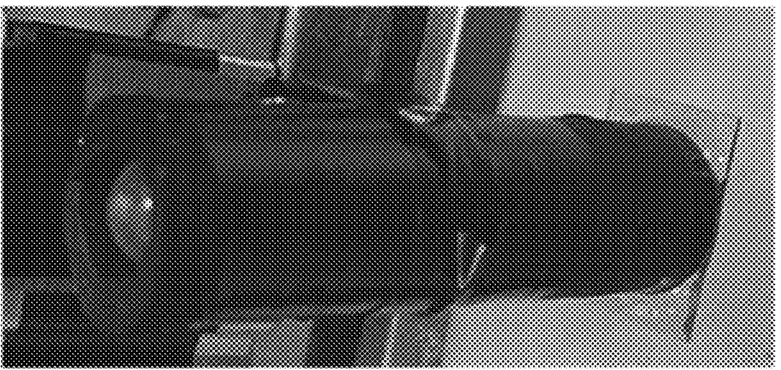
Figure 31C:
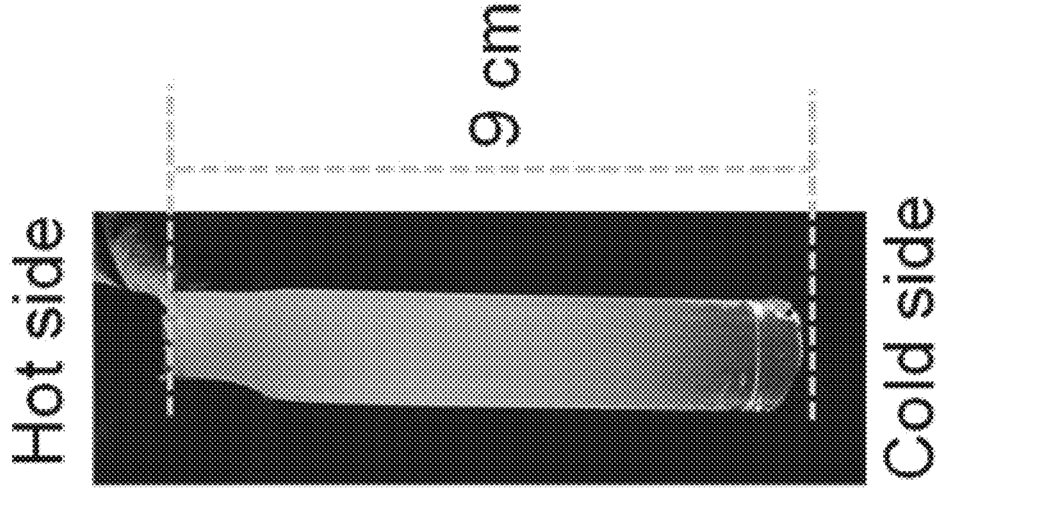
Figure 31D:
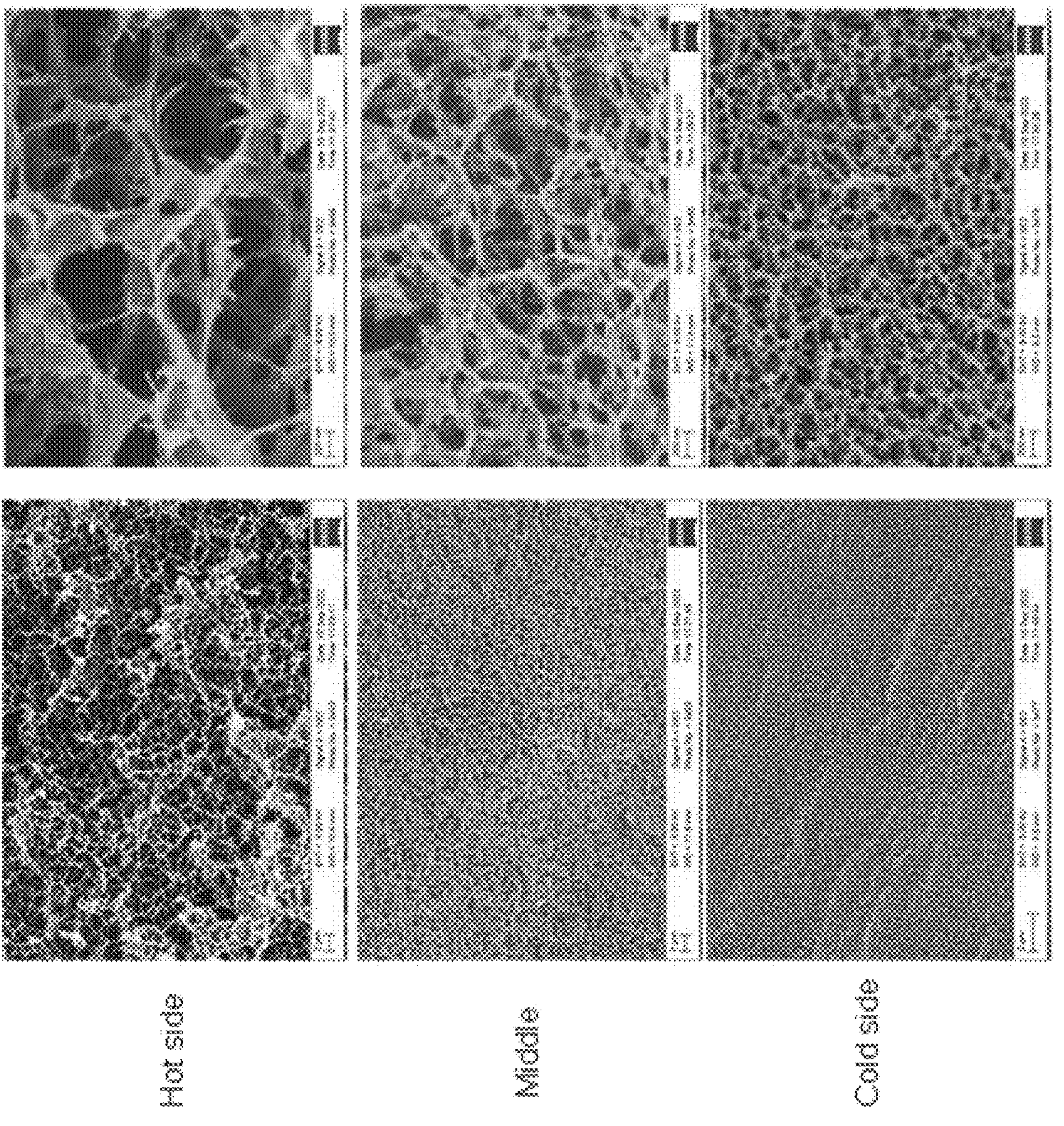

FIGS. 31A-31E illustrate fabrication of gradient hydrogel leveraging solvent-polymer interaction in accordance with an embodiment. FIG. 31A shows synthesis setup. FIG. 31B shows a photo of the setup. FIG. 31C shows a photo of the gradient hydrogel. FIG. 31D shows scanning electron microscopy images of the hydrogel. Left columns are the large area images and right columns are the zoom-in images. Pore sizes are labeled with yellow text. FIG. 31E shows tables summarizing the hydrogel properties made from a certain precursor.

Example 9: Tough Hydrogel for Supercapacitors

In many embodiments, robust, low tortuosity electrodes with ultrahigh mass loading, can be fabricated by compositing a superficial layer of tough hydrogel as reinforcement binders to the originally fragile micro-open-porous conducting polymer electrodes, termed as tough-gel reinforced open-porous foam (TROF) in the following. The ultra-tough PVA hydrogel reinforces the electrode even with a small amount of addition (0.1 mL/$cm^2$), which improves electrode flexibility, stretchability, and toughness while maintaining the open porous structure for fast diffusion. When assembled into an all-solid-state supercapacitor, the device shows high capacitance (5.25 F/$cm^2$), power density (41.28 mW/$cm^2$), stretchability (140% strain), toughness (1000 J/$m^2$), and cyclic stability (95.8% capacitance retention after 3500 cycles), owing to the ultrahigh mass loading, open-porous structure, and tough hydrogel reinforcement. The method would benefit the design and fabrication of high-performance supercapacitors for energy storage in flexible and wearable electronics.

Figures 32A, 32B, 32C:
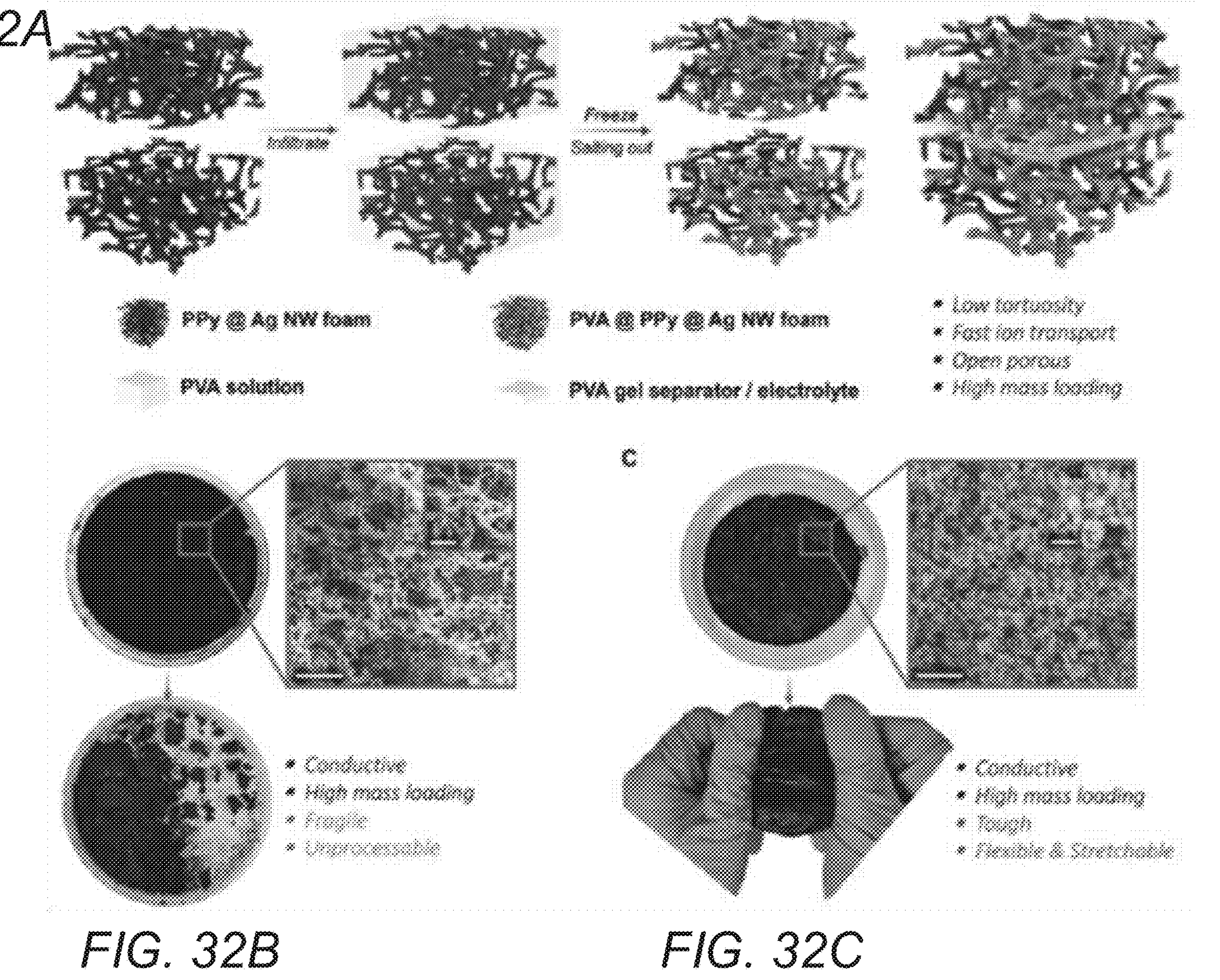
FIG. 32A illustrates the design concept and fabrication procedure of the TROF electrode in accordance with an embodiment.
FIG. 32B illustrates PPy@Ag NWs foam without tough hydrogel reinforcement in accordance with an embodiment.
FIG. 32C illustrates PPy@Ag NWs foam with tough hydrogel reinforcement in accordance with an embodiment.

FIG. 32A illustrates the design concept and fabrication procedure of the TROF electrode in accordance with an embodiment. Briefly, the initial open-porous conductive polymer foam is fabricated by the coaxial growth of conducting polymers on silver nanowires in a mixture solution containing silver nanowires, pyrrole monomers, and oxidants. The silver nanowires served as both a scaffold to guide the growth of polypyrrole (PPy) into an open porous network and a highly conductive pathway to improve the electrical transport in the thick electrode. The mass loading of active materials can be tunable by adjusting the concentration of monomers. Typically, the mass of PPy@Ag NWs foam is 32.2 mg/$cm^2$ for samples made from precursor containing 10 vol % pyrrole. The open-porous conductive foam obtained after freeze drying is mechanically weak and difficult to process as supercapacitor electrodes. The scanning electron microscopy (SEM) image shows the foam structure of sparely interconnected coaxial PPy@Ag NWs. With an increase of pyrrole concentration from 2.5 to 25 vol % in the precursor mixture, the shell polypyrrole layer could exhibit morphology from smooth, to sphere decorated, and then to spherical agglomerate microstructure. The final TROF was obtained by infiltrating a tough PVA hydrogel coating on the periphery of the open-porous conducting networks. Benefiting from the low tortuous nature of the initial conducting polymer foam, the liquid PVA precursor (2-10 wt %) is quickly absorbed and spread inside the foams, which indicates that the penetration depth is much larger than the thickness of the fabricated foam. After freezing and salting out in a 20 wt % lithium sulfate ($Li_2SO_4$) solution, a tough and conducting electrode was obtained. $Li_2SO_4$ is specifically chosen due to the high diffusivity of Li+ ions and the good toughening effect of $SO_4^{2-}$ ions on PVA hydrogels. It is confirmed that the final TROF electrode has a conductivity comparable to the pristine foam.

FIG. 32B illustrates PPy@Ag NWs foam without tough hydrogel reinforcement in accordance with an embodiment. The macroscopic image shows a black and open porous material that shatters easily under mechanical loading. The SEM image shows the microstructure of the foam. Scale bar: 50 μm; inset scale bar: 5 μm. FIG. 32C illustrates PPy@Ag NWs foam with tough hydrogel reinforcement in accordance with an embodiment. The macroscopic image shows a black tough hydrogel reinforced PPy@Ag NWs foam composite that shows stretchability and mechanical robustness. The SEM image shows the microstructure of TROF. SEM scale bar: 50 μm; inset SEM scale bar: 5 μm; the diameter of the Petri dish is around 10 cm.

Mechanistically, the infiltrated PVA solution spread inside the open porous foam following the contour of the conductive network due to surface tension. During freezing, the formation of ice crystals expelled the PVA polymers chains to the ice grain boundaries and induces the aggregation between PVA polymer chains. Note that usually one-time freezing is insufficient to induce a strong aggregation between the PVA polymer chains, and only weak H-bond interaction was established during the freezing step. Upon immersion into the high concentration lithium sulfate solution, in which the sulfate ions served as an efficient salting out agent by Hofmeister effect, the PVA polymer chains phase separated from the solution and formed strong crystalline domains by hydrogen bonding. The densely aggregated PVA polymer chains lead to the formation of an ultra-strong and tough hydrogel. The toughening effect is strongly affected by the concentration of the infiltrated PVA solution. With the increase of PVA concentration from 2 to 10 wt %, the TROF electrode showed both increase in ultimate strain and stress by 200% and 1600%, respectively.

The ultra-tough PVA hydrogel reinforcement prepared by the freezing and salting out method allowed for significant reinforcement of the originally weak conducting polymer with only a thin coating of the tough hydrogel. The coating helped reduce diffusion barrier of ions to and from the encapsulated conductive network underneath and also maintain the desired open-porous microstructure. Finally, an all-solid-state supercapacitor is fabricated by sandwiching a PVA hydrogel membrane between two pieces of 1.5 mm thick TROF electrode, the three layers were joint together by another cycle of freezing and salting out in a 20 wt % $Li_2SO_4$+5 wt % $H_2SO_4$ electrolyte solution.

The electrochemical performance of the TROF electrodes in a two-electrode system using the fabricated all-solid-state supercapacitor device is evaluated. Variation in the pyrrole concentration from 2.5 to 25 vol % does not lead to significant change in the capacitance, as the ultimate surface area is mostly determined by the amount of Ag NWs; however, higher concentration of pyrrole yields a lower internal resistance drop but higher hydrophobicity. To ensure a balance between good conductivity, infiltration ability, and toughness, 10 vol % pyrrole precursors and 10 wt % PVA infiltration solution can be used.

Figures 33A, 33B, 33C, 33D, 33E, 33F:
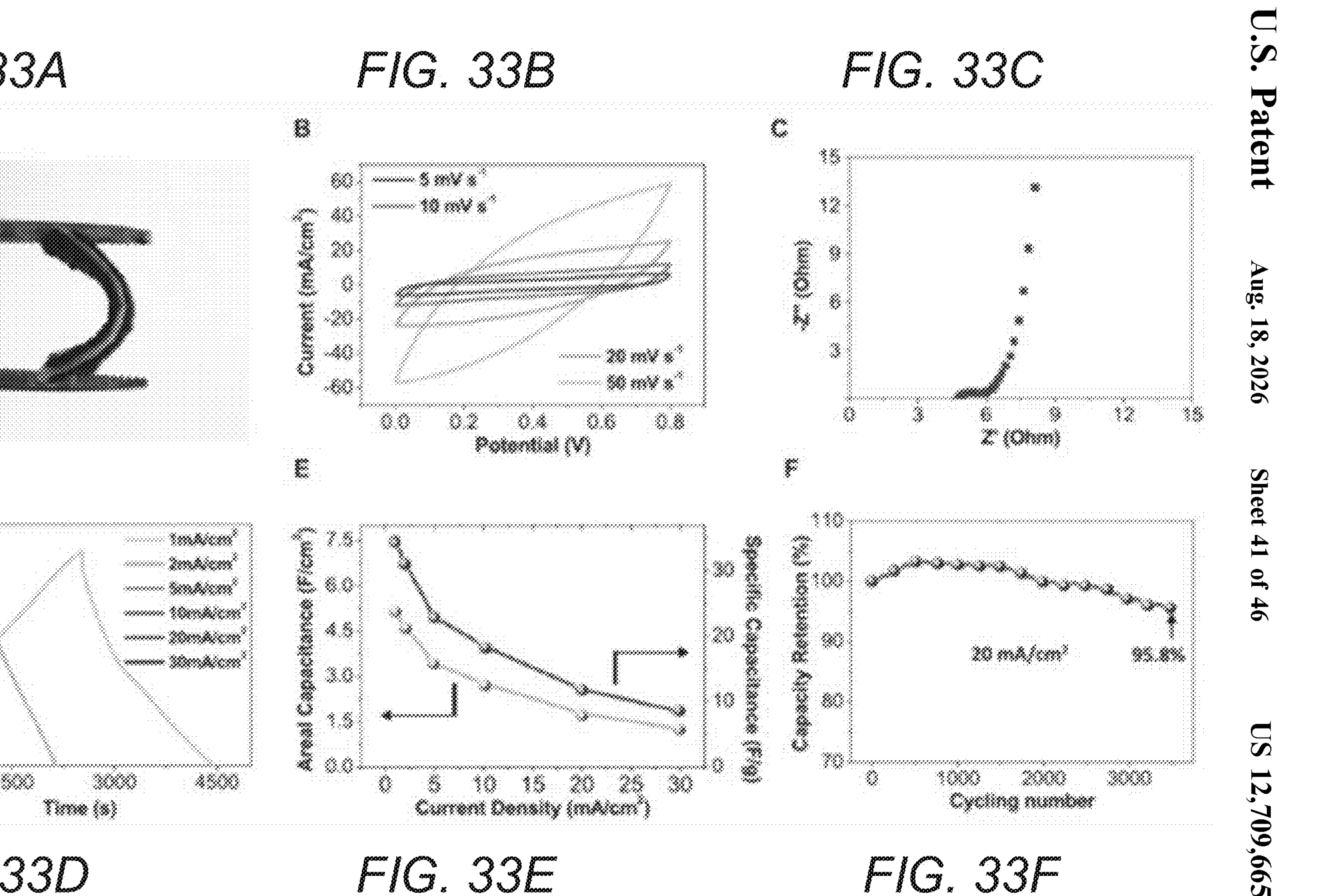
FIGS. 33A-33F illustrate TROF supercapacitor performances in accordance with an embodiment.

FIGS. 33A-33F illustrate TROF supercapacitor performances in accordance with an embodiment. FIG. 33A illustrates an image of the TROF supercapacitor fabricated by sandwiching two TROF electrodes and one PVA hydrogel separator. Scale bar: 5 mm. FIG. 33B illustrate CV curves of TROF supercapacitor with scanning rate of 5-50 mV/s. Device area 1 $cm^2$. FIG. 33C illustrates Nyquist plot of TROF supercapacitor at frequencies from 0.1 MHz to 0.01 Hz. FIG. 33D shows GCD curves of TROF supercapacitor at current densities of 1-30 $mA/cm^2$. FIG. 33E shows areal and specific capacitance of TROF supercapacitor at current densities of 1-20 $mA/cm^2$. FIG. 33F shows capacitance retention during 3500 GCD cycles.

In FIG. 33B, the typical CV curves of the TROF supercapacitor at various scan rates of 5-50 mV/s, the curves are all symmetric and has a near rectangular shapes at a scan rate below 10 mV/s, indicating a good capacitive behavior of the electrode. The Nyquist plots of the TROF supercapacitor show a low equivalent series resistance of 7.3 Ωcm2 and charge transfer resistance (RCT) of 1.2 Ωcm2, which benefited from the interconnected coaxial polypyrrole @ Ag NWs conductive network and the open-porous microstructure that facilitated the ion transportation (FIG. 33C). The galvanostatic charge-discharge (GCD) curves measured with current density of 1-30 $mA/cm^2$ within an operation window of 0-0.8 V all show nearly triangular shapes, indicating the formation of efficient electrochemical double layer inside the TROF electrode and high Coulomb efficiency (FIG. 33D). The TROF device exhibits an ultrahigh areal capacitance of 5.25 $F/cm^2$ (34.96 F/g, normalized against the device's total weight) at 1 $mA/cm^2$ charging and discharging rate (FIG. 33E). Even at a high current density of 20 $mA/cm^2$, the areal capacitance was maintained at a high value of 1.8 $F/cm^2$. With partial sacrifice of the mechanical robustness by infiltrating more dilute PVA solutions (2 wt % PVA), the areal capacitance of the device measured at the same high current density of 20 $mA/cm^2$ increased for >2 times to 3.9 $F/cm^2$. The capacitance values of the TROF are especially high, owing to the high mass loading of the electrodes (≈77 mg/cm2). Such a high capacitance is maintained at 95.8% after 3500 GCD cycles even when operating under a high current density of 20 $mA/cm^2$ (FIG. 33F). The excellent cycling performance and stability are attributed to the open-porous structure that allow fast ion-diffusion and the tough hydrogel reinforcement binder that maintained the structure integrity throughout the long-term GCD cycles.

Figures 34A, 34B, 34C, 34D, 34E, 34F:
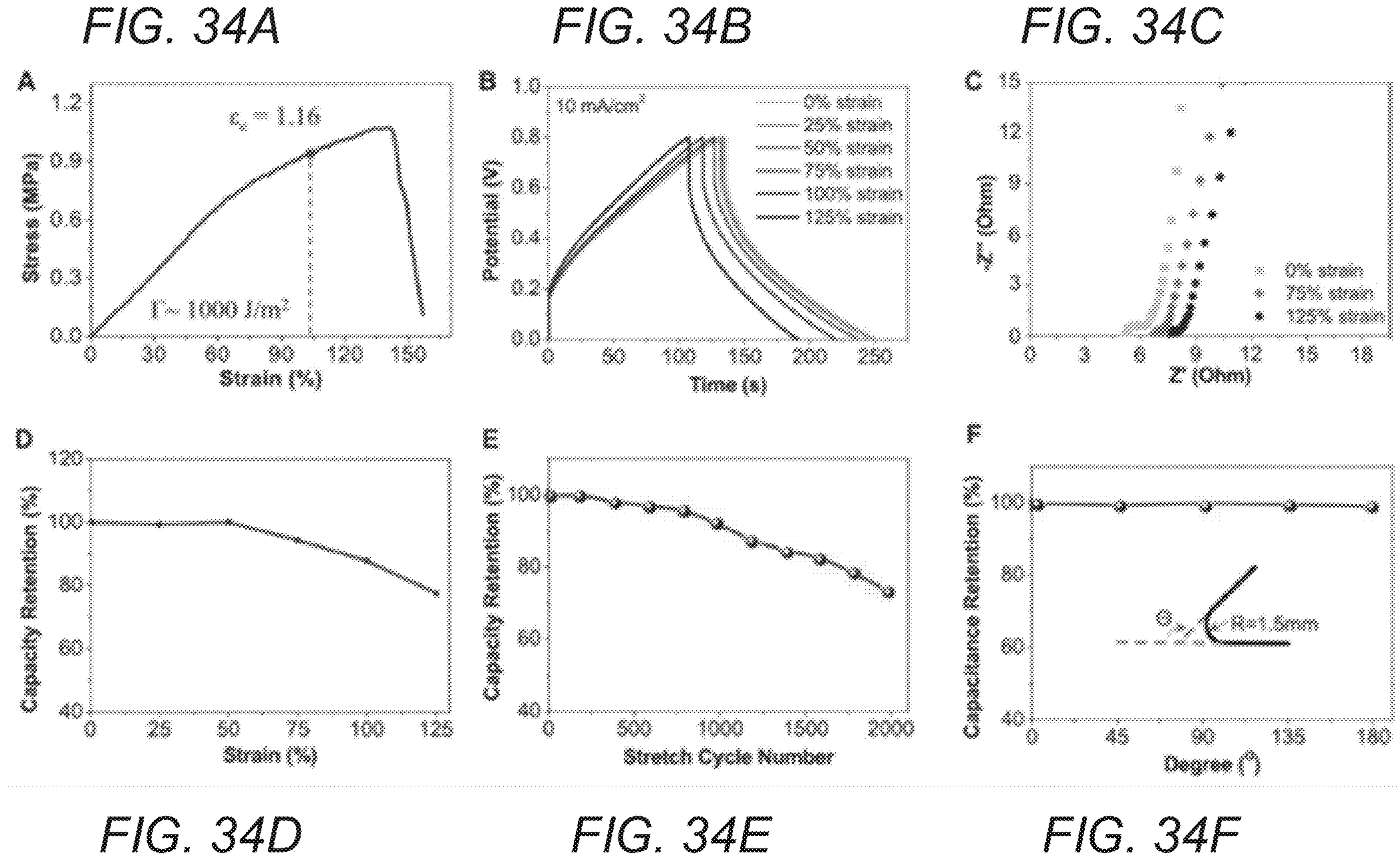
FIGS. 34A-34F illustrate mechanical properties of TROF electrodes in accordance with an embodiment.

Benefiting from the ultra-tough hydrogel reinforcement binder, the TROF electrode infiltrated with 10 wt % PVA and after salting out exhibited a high ultimate strength of ≈1 MPa and ultimate strain of about 140%, which yields a toughness of 800 $kJ/m^3$ and a fracture energy of about 1000 $J/m^2$. In contrast, the un-reinforced foam showed only about 1 kPa strength and about 15% strain, and the PVA infiltrate TROF electrode before salting out only slightly improved to about 4 kPa strength and about 40% strain. Its resistance to fracture is comparable to cartilage and many double-network tough hydrogels. FIGS. 34A-34F illustrate mechanical properties of TROF electrodes in accordance with an embodiment. FIG. 34A shows stress-strain curve of TROF electrode. The dash line marks the critical strain (εc) for onset of propagation of cracks in the material, the corresponding fracture energy is about 1000 $J/m^2$. FIG. 34B shows GCD curves of the TROF supercapacitor at a current density of 10 $mA/cm^2$ when stretched to 0-125% strain. FIG. 34C shows Nyquist plot of the TROF supercapacitor at frequencies from 0.1 MHz to 0.01 Hz when stretched to 0-125% strain. FIG. 34D shows capacitance retention of the TROF supercapacitor during stretching from 0% to 125% strain. FIG. 34E shows capacitance retention of the TROF supercapacitor during 2000 stretching cycles. FIG. 34F shows capacitance retention of the TROF supercapacitor when bending from 0° to 180°.

With a strain range of 0-125%, the internal resistance (IR) at 10 $mA/cm^2$ of the stretched devices increased 1.5 times as tensile strain increased from 0% to 125% (FIG. 34C). As a result, the GCD curves showed an increased IR drop with the increasing strain (FIG. 34B). Normalized to weight, the specific capacitance of the stretched device showed no reduction at up to 50% strain, which indicated an intrinsic stretchability of the device (FIG. 34D). With a strain higher than 50%, the device capacitance started to gradually reduce, ultimately to 76% of the original capacitance at 125% strain. However, the capacitance could be recovered upon releasing the strain, which indicates that the tough hydrogel layer protected the integrity of the microstructure during stretching. The device shows good mechanical stability and maintained 73% of the original capacitance after 2000 mechanical cycles, each cycle was stretched to 125% strain (FIG. 34E). A bending test was also carried out, where no significant capacitance change was observed for bending angle from 0° to 180° (FIG. 34F).

Example 10: Tendon Like Anti-Freezing Tough Gels

Many embodiments fabricate tough polyvinyl alcohol (PVA) hydrogel with a low freezing point by incorporating both salting-out and cononsolvency effects. Directional freezing of PVA precursor generates aligned pores in the polymer matrix, while the introduction of salt ions induces the strong aggregation of polymer chains and further generates nano-structures and micro-structures. The resultant hierarchical structure at multiple length scales endows the PVA gel with superior mechanical properties. Unfortunately, salts that exhibit a strong salting-out effect on polymer chains usually have weak freezing point depression ability in aqueous solutions, and the salting-in salts can depress the freezing point but compromise the mechanical properties. To maintain the superior mechanical performance of the gels, the cononsolvency effect is utilized. The solubility of a macromolecule can decrease in the mixture of two good solvents, and this promotes polymer chain aggregation and crystalline domain formation. Dimethyl sulfoxide (DMSO) and water mixture have cononsolvency effect on PVA. While maintaining the hydrogen bonding and the structures generated by salting out, using mixed solvents can effectively lower the freezing point to −60° C. at 60 wt % DMSO mixing ratio, enabling the anti-freezing property of the presented gel.

At room temperature, this material exhibits Young's modulus of 7.6 MPa, the tensile strength of 13.3 MPa, and toughness of 110.5 MJ/m$^3$, making it 5.5 times tougher than the toughest anti-freezing gel and over 10 times tougher than tendon. The exchange of liquid in gel from salt solution to DMSO/H2O mixture endowed the gel with superior mechanical performances at extremely low temperatures. This PVA gel could remain flexible at −60° C., and its mechanical properties measured at −45° C. are even slightly higher than at room temperature (Young's modulus: 10.1 MPa, tensile strength: 13.5 MPa, and toughness: 127.9 MJ/m3). Apart from being tough, this hydrogel is also tear resistant, enabled by the aligned polymer fibers bridging the cracks. A hydraulic actuator was then made from this material by molding, which demonstrated high loading weight (100 g) at both room temperature and −45° C. Furthermore, this material exhibits anisotropic ionic conductivity after adding sulfuric acid into the liquid. This anti-freezing tough gel opens up new possibilities for the application of hydrogels as actuators, soft robotics, and flexible electronics under subzero temperatures.

Figures 35A, 35B, 35C:
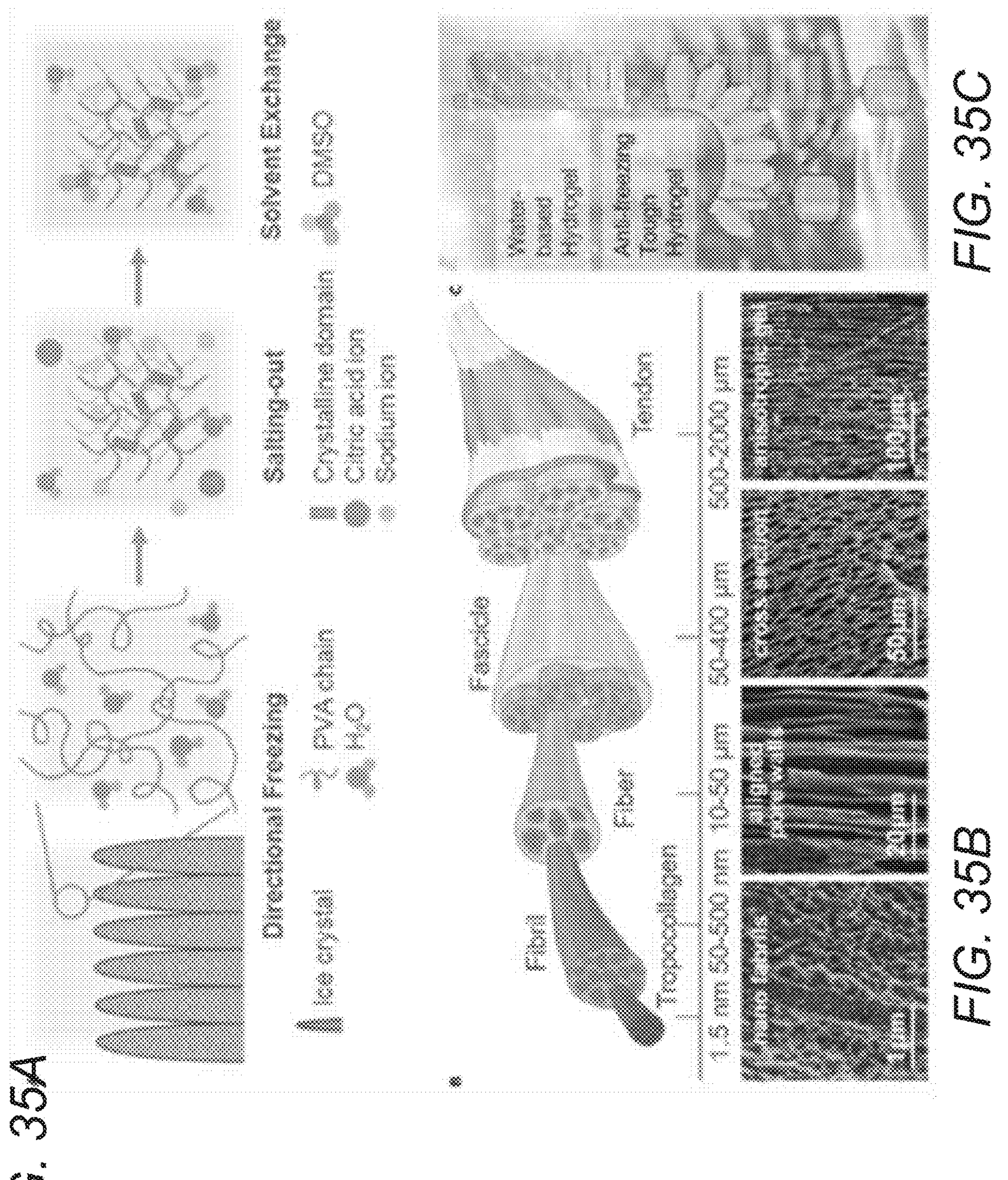
FIGS. 35A-35C illustrate the schematic of fabrication steps and hierarchical structures of tendon and anti-freezing tough gel in accordance with an embodiment.

Tendons are strong cords of fibrous material that transmit force from muscles to bones, and they are capable of withstanding high stress in the loading direction. The hierarchical and anisotropic structures contribute to the remarkable mechanical properties. Inspired by such complex anisotropic structures, the comparable complex structures in the anti-freezing PVA gel can be fabricated by utilizing the salting-out effect and cononsolvency effect. FIGS. 35A-35C illustrate the schematic of fabrication steps and hierarchical structures of tendon and anti-freezing tough gel in accordance with an embodiment. FIG. 35A shows a schematic of the fabrication steps of the tendon-inspired anti-freezing tough gel. FIG. 35B shows illustration of tendon structures and SEM images of the anti-freezing tough gel. FIG. 35C shows illustration indicating the high mechanical performance and freeze resistance of our material. As shown in FIG. 35A, the PVA precursor first goes through directional freezing, during which the ice crystals expel the polymer chains to areas between ice columns. In this way, these PVA chains are condensed into a through-height honeycomb structure. The scanning electron microscopy (SEM) images in FIG. 35B show the aligned pore walls and cross-sectional view of this structure. Next, the frozen gel is placed into a 1.5 M sodium citrate (SC) solution, which has a strong salting-out effect where the high ionic strength of salt ions reduces the solubility of polymers. The introduction of ions induced more hydrogen bonds between PVA chains, which increases the degree of crystallinity and further aggregated the PVA chains. The PVA hydrogel was then soaked into a 60 wt % DMSO/40 wt % H2O (DMSO/H2O, DH) mixture. This mixture of solvents well maintained the mechanical properties and made the gels freeze tolerant by lowering the freezing point. The resultant anisotropic anti-freezing tough gel is denoted as a SC-DH gel. The final structure of the PVA gel resembles the aligned hierarchical structure of tendon. FIG. 35B depicts the structures of tendon on multiple length scales and also shows the SEM images of our PVA gel under different magnification. Tendon has nanometer-scale collagen strands and fibrils and micron-scale fibers and fascicles. Similarly, the PVA gel has nano-fibrils and aligned walls with pore diameter of around 10 microns. The resemblance between this artificial hydrogel and natural tendon material indicates the versatility of hydrogel materials.

Figures 36A, 36B, 36C, 36D, 36E:
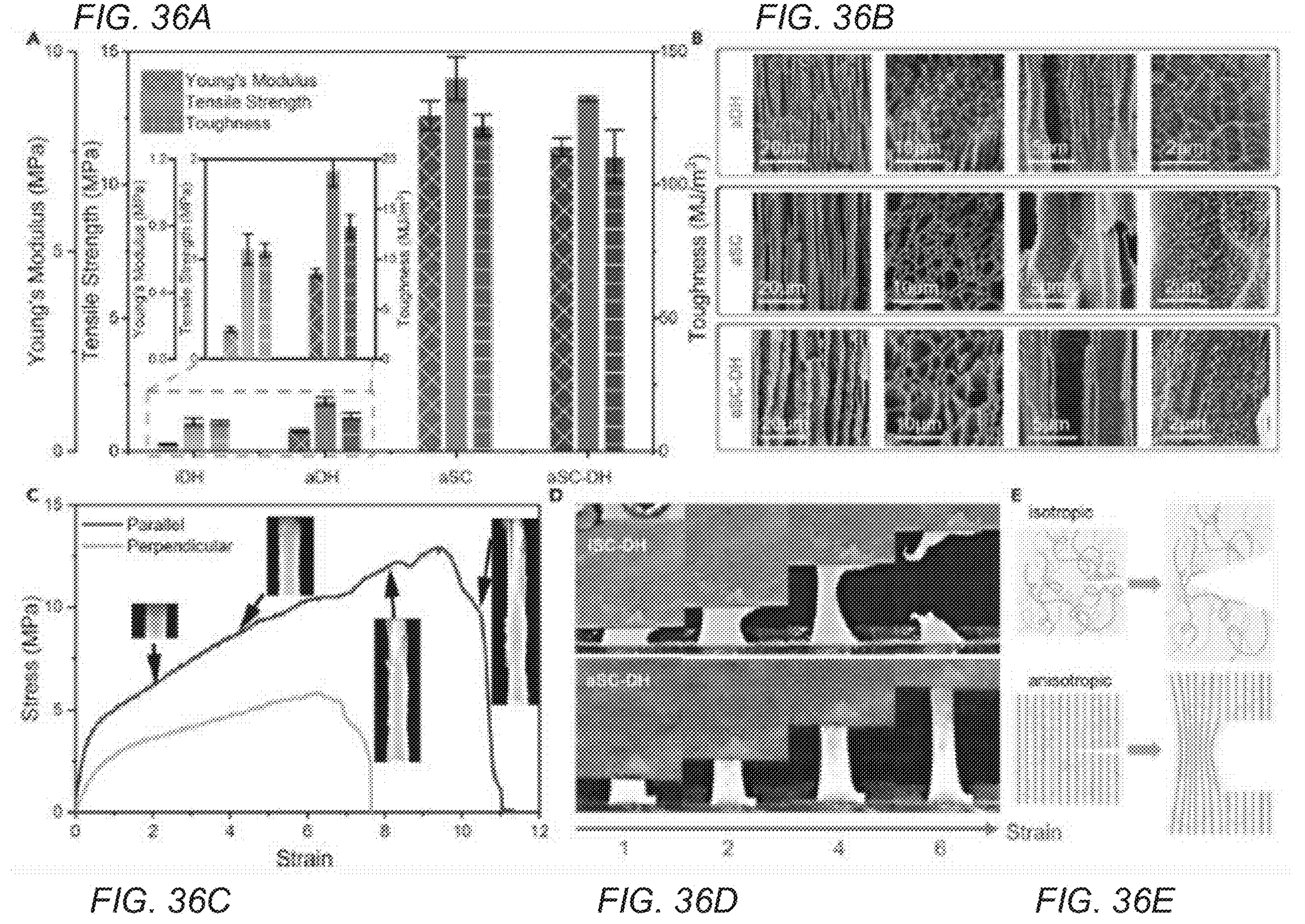
FIGS. 36A-36E illustrate mechanical properties and morphologies of PVA gels went through different fabrication steps in accordance with an embodiment.

FIGS. 36A-36E illustrate mechanical properties and morphologies of PVA gels went through different fabrication steps in accordance with an embodiment. FIG. 36A shows comparison of Young's modulus, tensile strength, and toughness of isotropic DMSO/H2O (iDH), anisotropic DMSO/H2O (aDH), anisotropic sodium citrate (aSC), and anisotropic sodium citrate>DMSO/H2O (aSC-DH) gels. FIG. 36B shows SEM images of aDH, aSC, and aSC-DH gels. FIG. 36C shows stress-strain curves for aSC-DH gels in parallel and perpendicular directions. The insets are photos showing the samples with different strains. FIG. 36D shows photos taken during the notched tensile tests of isotropic SC-DH gel and anisotropic SC-DH gel in parallel direction. FIG. 36E shows illustrations of crack propagation in isotropic and anisotropic samples.

FIG. 36A shows Young's modulus, tensile strength, and toughness of four different gels prepared differently, including the isotropic DMSO/H2O (iDH) gel (gelation by the solvent mixture following homogeneous freezing), the anisotropic DMSO/H2O (aDH) gel (mixture of solvents following directional freezing), the anisotropic sodium citrate (aSC) gel (salting out following directional freezing), and the anisotropic sodium citrate>DMSO/H2O (aSC-DH) gel (mixture of solvents following salting out after directional freezing). If not stated otherwise, all PVA precursors contain 10 wt % PVA powder of Mw. 89,000-98,000 and 99% degree of hydrolysis. The iDH gel is fabricated by simple mixing of PVA solutions in DMSO and H2O. The aDH gel is obtained by directionally freezing the PVA precursor and then soaking the frozen gel in DMSO/H2O mixture. The comparison between iDH and aDH gels indicates the effectiveness of the directional freezing process in enhancing mechanical properties. The Young's modulus has a 3-time increase (from 0.18 MPa to 0.52 MPa), tensile strength was nearly doubled (from 1.1 MPa to 1.9 MPa), and toughness is slightly increased from 10.9 MJ/m3 to 13.3 MJ/m3 (FIG. 36A). Meanwhile, the salting-out effect of sodium citrate solution also greatly improved the mechanical performance. The aSC gels, which goes through the salting-out process in sodium citrate solution, had Young's modulus, tensile strength, and toughness of 8.4 MPa, 14.0 MPa, and 122.3 MJ/m3 (FIG. 36A), respectively. These values increase 10 times over the aDH gels without salting-out treatment, which showed that sodium citrate solution has a strong capability of strengthening PVA hydrogels. Subsequently, these aSC gels, after soaking in water for two days, suffered a drastic drop in mechanical properties. Specifically, Young's modulus, ultimate tensile strength, and toughness decreased by 82%, 63%, and 78%, respectively. By contrast, if soaking the aSC gels in DMSO/H2O mixed solvents instead of pure water as above, the resulting aSC-DH gels has only a 10% drop in properties after the solvent exchange (FIG. 36A). This indicates that the exchange of liquid in the gel to DMSO/H2O does not pose much effect on the structures (FIG. 36B). Specifically, Young's modulus drops from 8.4 MPa to 7.6 MPa, tensile strength changes from 14.0 MPa to 13.2 MPa, while toughness decreases from 122.3 MJ/m3 to 110.5 MJ/m3. This property contrast between the results of soaking with water vs. DMSO/H2O mixed solvents indicates the effectiveness of cononsolvency effect in preserving the mechanical properties of salting-out-toughened PVA gels.

The morphology shown in FIG. 36B corroborate the mechanical testing results. When the PVA aqueous solution first went through directional freezing, PVA chains are condensed into a through-height honeycomb structure. When the frozen precursor is directly soaked in the DMSO/H2O mixture, the cononsolvency effect took charge in aggregating polymer chains in the regions between ice crystals. The resulting aDH gel has nanometer-sized holes on the pore walls (FIG. 36B). When the frozen gel is placed into sodium citrate solution instead of DMSO/H2O, these ions caused the polymer walls to become more condensed with no visible hole on the walls and created nanofibril patterns on the walls of aSC gels. It indicates that the cononsolvency effect is weaker than the salting-out effect in aggregating PVA. The PVA hydrogel is then soaked into DMSO/H2O mixture for 7 days for a complete solvent exchange. After that, the hierarchical structure across multiple length scales is still well preserved (FIG. 36B). Although DMSO/H2O mixture could not induce an as dense structure or nanofibrils as the sodium citrate solution could, this solvent mixture would not disassemble the tight polymer aggregates and dense polymer walls formed through the salting-out process. These results agree with the solid content measurement, where the a DH gel has the lowest solid content of 12%, the a SC gel has the highest solid content of 34%, and the solid content of a SC-DH gel is 28%. Combining the results from the mechanical tests and the SEM images, the superior mechanical performance can be attributed to both the aligned structures and strong aggregation between polymer chains, which resulted from directional freezing and salting out, respectively. Meanwhile, cononsolvency effect could largely maintain the mechanical properties during the solvent exchange. Hierarchically, the salt ions greatly strengthened the material at molecular and nanometer scale, while the ice crystals created an aligned structure that strengthen the material at the micrometer level.

The stress-strain curves of tensile tests for a SC-DH gels in the directions parallel and perpendicular to the freezing direction are shown in FIG. 36C. The gradual fracture mode and fiber pull out are both commonly observed behaviors in anisotropic polymer systems. The alignment not only enhances strength in the parallel direction but also ensured the resistance to crack propagation in the polymer matrix. FIG. 36D shows the distinct fracturing processes of two different gels during the tensile tests. The isotropic PVA gel (iSC-DH-freeze-thaw) sample is made by the homogeneous freeze-thaw method, with a horizontal cut in the middle from the right side. When this sample is elongated, this initial crack readily propagated through the left half of the gel, and the sample failed at around 500% strain. By contrast, the a SC-DH gel with aligned structures does not exhibit any sign of crack propagation, instead, the right half with the initial crack separated, while the left unnotched half elongated as if there was no crack. This indicates that the condensed aligned fibers can pin and bridge the crack due to their high strength, and the subsequent stretching will cause fiber pull out (FIG. 36C). Crack propagation will begin when the fibers start to fracture, which requires much higher stress than isotropic gels since the fibers are denser and better aligned.

Figures 37A, 37B, 37C, 37D, 37E:
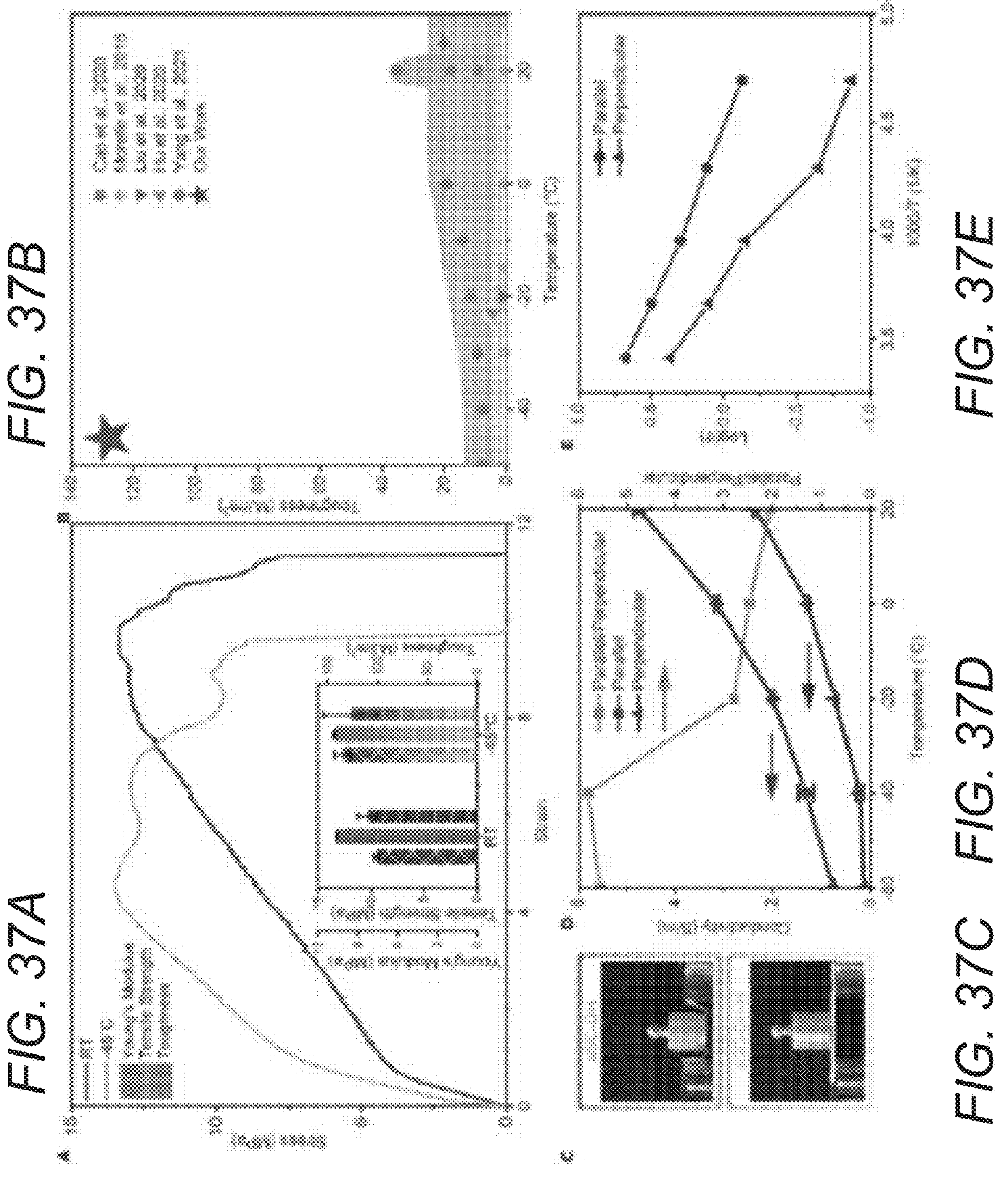
FIGS. 37A-37E illustrate low-temperature performances of a SC-DH hydrogel in accordance with an embodiment.

FIGS. 37A-37E illustrate low-temperature performances of a SC-DH hydrogel in accordance with an embodiment. FIG. 37A shows stress-strain curves for tensile tests of aSC-DH hydrogel at room temperature and −45° C. Inset is the comparison of Young's modulus, tensile strength, and toughness between aSC-DH gels at room temperature and −45° C. FIG. 37B shows comparison of lowest operation temperature and toughness under these temperatures with other works. FIG. 37C shows (Top) Photo showing aSC-DH hydrogel remained flexible under −60° C. (Bottom) Photo showing aSC-DH-H gel became rigid under −60° C. FIG. 37D shows a plot of conductivities of aSC-DS gels in parallel and perpendicular directions under various temperatures, and plot of the ratio of parallel conductivity over perpendicular conductivity. FIG. 37E shows Arrhenius plot of conductivities of aSC-DS gels in parallel and perpendicular directions under various temperatures.

The anti-freezing performance of a SC-DH gel is examined by several tests at subzero temperatures. The tensile test is conducted in a −45° C. cooling chamber, and the result is compared with the results at room temperature (RT) (FIG. 37A). The cooled samples exhibited higher Young's modulus (10.1 MPa), similar tensile strength (13.4 MPa), and slightly higher toughness (127.9 MJ/m3) compared to samples at RT (7.6 MPa, 13.2 MPa, and 110.5 MJ/m3). Hydrogel matrixes contain a large amount of covalent and hydrogen bonds, and during deformation, polymer chains are straightened while hydrogen bonds go through dissociation and reassociation. At low temperatures, polymer chains are harder to slide past each other, and this results in higher Young's modulus. Moreover, the freeze resistance of DMSO/H2O ensured large fracture strain. Both the high modulus and large strain contribute to the exceptional toughness at low temperatures. The photos in FIG. 37C more intuitively show the anti-freezing capability of our material. The aSC-DH-H gel went through the same fabrication steps as the anti-freezing aSC-DH gel, but it was soaked in water at last. Shortly after this sample was taken out of a −60° C. bath, a 50 g weight cooled to the same temperature was placed on top. This photo demonstrates the rigidity of the frozen gel, and it indicates that any conventional water-based hydrogel would be rendered useless under such conditions. On the contrary, aSC-DH gel retained its flexibility after being cooled to −60° C. Compared to other works on freeze resistant tough hydrogels shown in FIG. 37B, the material has superior mechanical performances at low temperature. This aSC-DH gel has over 10-time higher toughness than other works at low temperature (−45° C.).

Moreover, high conductivity at low temperatures is realized by incorporating 2 M sulfuric acid in the DMSO/H2O mixture. Like the anisotropic mechanical properties, the conductivities of this aSC-DS gel in the directions parallel and perpendicular to the pore alignment, respectively, are also different. FIG. 37D shows the conductivities in these two directions under various temperatures. In parallel direction, the aligned pores served as channels for ions to transport with low resistance, while in the perpendicular direction, ions have to pass through dense pore walls. Such a structural anisotropy led to conductivity anisotropy. At different temperatures, the difference ranged from 2 to 6 times. Variation of ionic conductivity of liquids with the temperature usually follows Arrhenius relation. The Arrhenius plot indicates that the activation energy for the two directions are different and will lead to a greater difference in conductivity at lower temperatures. Apart from the difference in conductivity in the two directions, the anisotropic structure can also enhance the conductivity of PVA gel compared to the isotropic PVA gel. To demonstrate the higher conductivity, a circuit with LED lights is built and connected the anisotropic or isotropic gels with the same sizes in the circuit. The experiment is conducted at room temperature and −20° C. A cyclic voltage scan from −5 V to 5V is applied on the circuit, and the brightness of light with anisotropic gel and isotropic gel as conductors was compared. The LED lights with anisotropic gels as conductors at both room temperature and −20° C. are brighter than the LED lights with isotropic gels as conductors. The higher electrical conductivity of anisotropic gel can be confirmed by the C-V curve, which shows the higher current for anisotropic gels than the isotropic ones under the same voltage. The addition of sulfuric acid will not affect the mechanical properties of the conductive gel. The exceptional electrical properties bring potential utilization of this material in, for instance, subzero temperature electronics and sensors capable of withstanding harsh environments both mechanically and temperature wise.

Figures 38A, 38B, 38C, 38D:
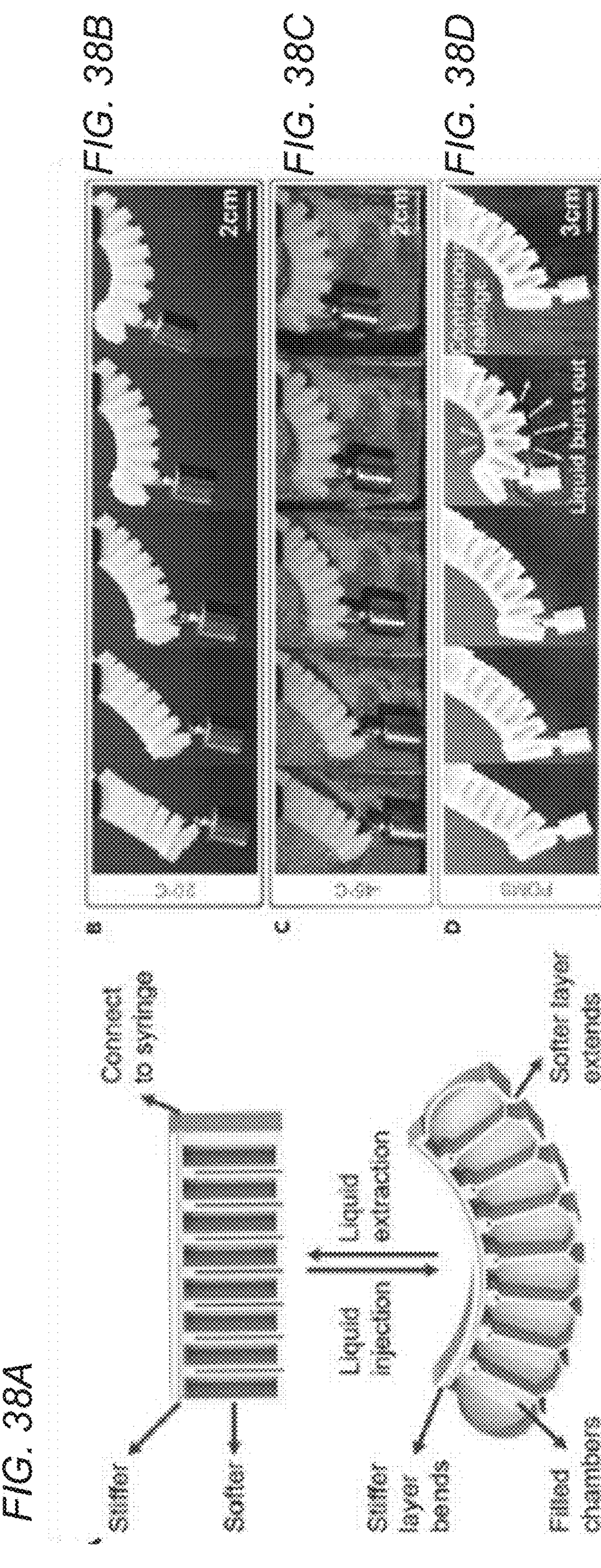
FIGS. 38A-38D illustrate PVA hydraulic actuator in accordance with an embodiment.

FIGS. 38A-38D illustrate PVA hydraulic actuator in accordance with an embodiment. FIG. 38A shows schematic cross-sectional view of the hydraulic actuator at unpressurized and pressurized states. FIG. 38B shows photos of the PVA hydraulic actuator lifting a 100 g weight in air upon liquid injection at 20° C. FIG. 38C shows photos of the PVA hydraulic actuator lifting a 100 g weight in air upon liquid injection at −45° C. FIG. 38D shows photos of a PDMS actuator lifting a 100 g weight in air upon liquid injection at 20° C. The PDMS actuator broke at the fourth frame and was no longer active in the fifth frame.

Compared to stimuli-responsive actuators and actuators incorporating active elements, hydraulic actuators' advantages lie in fast response rate and high actuation force. In fact, the actuating force has a linear relationship with applied pressure, which means that the strength of material directly determines the maximum force the actuator can provide. Based on the presented high load-bearing ability, tear resistance, and low freezing point, the material is made into hydraulic actuators that can lift heavy weight at both room temperature and sub-zero temperatures. In order for the actuator to bend effectively, the material on the back of the actuator should have higher stiffness than the other parts (FIG. 38A) because the stiffer back strip will then bend without extending while the softer chamber walls bulge. To achieve this difference in stiffness, a 10 wt % PVA precursor is used to build the softer part of this actuator, and a 15 wt % PVA precursor is used for the stiffer part. This actuator structure is fabricated by freeze-thaw molding. First, the 10 wt % PVA went through 5 freeze-thaw cycles; then, the 15 wt % PVA was poured on top of the bottom softer part before going through another 2 freeze-thaw cycles. The seamless and strong adhesion between the two parts was realized by molecular topology adhesion, where the PVA chains penetrated into the bottom part, formed physical entanglement, and stitched the two parts together. The actuator can bend upwards upon liquid injection in air and liquid, with a 100 g weight tied to the end of the actuator. To demonstrate low-temperature performance both in air and in solution, the actuator was then placed in a −45° C. cooling chamber and a −60° C. cooling bath, respectively. Results show that with the same amount of DMSO/H2O solution injected, the actuator could lift the weight to the same height as at room temperature (FIG. 38C); in other words, the material was as robust at low temperatures as at room temperature. For comparison, an actuator of a similar design was fabricated with polydimethylsiloxane (PDMS), a commonly used elastomer for most reported hydraulic actuators. In weight-lifting tests, upon injection of liquid, the PDMS actuator bent but broke and leaked before reaching the same degree of deformation as the PVA actuator did. The photo in FIG. 38D captures this process when the PDMS actuator fractured because of large deformation and pressure, and the liquid inside burst out. This PDMS actuator could no longer lift the weight after the leakage. Furthermore, to quantitatively demonstrate the actuation ability, the actuation force is tested, which reaches over 20 N before failure. These results proved that PVA hydrogels could be strengthened to produce high actuation force without failure. Moreover, the actuator can be further strengthened in specific directions by directionally freezing the PVA precursor before salt solution treatment instead of freeze-thawing the precursor. Since the weakest direction in the anisotropic gel (aSC-DH-perpendicular) is still stronger than the isotropic material fabricated for the actuator (iSC-DH-freeze-thaw), the pressure enduring ability of the actuator will not be compromised after this anisotropic strengthening. Based on specific application situations, the anisotropic structure can be introduced to enhance load-bearing and tear-resistant abilities in the desired direction. Apart from PVA, it is anticipated that other types of hydrogels made of broad choices of polymers, including biopolymers alginate and gelatin, may be created and toughened by this method.

Doctrine of Equivalents

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the terms "approximately" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

What is claimed is:

1. A method for fabricating hydrogel comprising:

providing a solution with a solute in a solvent, wherein the solute is capable of aggregation or crystallization by forming hydrogen bonds or via hydrophobic interaction;

concentrating the solution, wherein the concentrated solution forms a first structure with a dimension in micrometer size; and salting out the concentrated solution in a salt solution to form a hydrogel, wherein the salting out process forms a second structure on the first structure and the second structure has a dimension in nanometer size;

wherein the hydrogel has a hierarchical structure.

2. The method of claim 1, wherein the concentrating process is selected from the group consisting of: freezing, freeze-casting, crosslinking, covalent bond-based crosslinking, thermal annealing, phase separation, and polymerization.

3. The method of claim 2, wherein the freezing is directional freezing.

4. The method of claim 3, wherein the directional freezing forms an anisotropic first structure.

5. The method of claim 1, wherein the solute is selected from the group consisting of: a monomer, an oligomer, and a polymer.

6. The method of claim 1, wherein the solute is selected from a group consisting of poly(vinyl alcohol) (PVA), poly(2-hydroxylethyl acrylate) (PHEA), gelatin, alginate, and cellulose.

7. The method of claim 1, wherein the solute comprises PVA and the salt solution comprises an anion selected from the group consisting of: citrate$^-$, $SO_4^{2-}$, $CO_3^{2-}$, $Ac^-$, $Cl^-$, $NO_3^-$, and $I^-$.

8. The method of claim 1, wherein the solute comprises PVA and the salt solution comprises a cation selected from the group consisting of: $K^+$, $Na^+$, $Cs^+$, $Li^+$, $Ca^{2+}$, $Mg^{2+}$, and $Fe^{3+}$.

9. The method of claim 1, wherein the solvent is water or a water-based solution.

10. The method of claim 1, wherein a toughness of the hydrogel is between 0.017 $MJ/m^3$ and 210 $MJ/m^3$.

11. The method of claim 1, wherein a strength of the hydrogel is between 50 KPa and 23.5 MPa.

12. The method of claim 1, wherein a strain of the hydrogel is between 300% and 2900%.

13. The method of claim 1, wherein a water content of the hydrogel is from 70% to 95% weight percent.

* * * * *